United States Patent
Martin

(10) Patent No.: US 9,974,243 B2
(45) Date of Patent: May 22, 2018

(54) SYSTEMS, METHODS, AND DEVICES FOR AEROPONIC PLANT GROWTH

(71) Applicant: GROWX INC., Oakland, CA (US)

(72) Inventor: John-Paul Armand Martin, San Rafael, CA (US)

(73) Assignee: GROWX INC., Oakland, CA (US)

( * ) Notice: Subject to any disclaimer, the term of this patent is extended or adjusted under 35 U.S.C. 154(b) by 0 days. days.

(21) Appl. No.: 15/662,137

(22) Filed: Jul. 27, 2017

(65) Prior Publication Data

US 2018/0007845 A1     Jan. 11, 2018

Related U.S. Application Data

(63) Continuation of application No. PCT/US2016/026538, filed on Apr. 7, 2016.

(60) Provisional application No. 62/188,538, filed on Jul. 3, 2015, provisional application No. 62/145,409, filed on Apr. 9, 2015.

(51) Int. Cl.
| | |
|---|---|
| A01G 31/00 | (2018.01) |
| A01G 31/06 | (2006.01) |
| A01G 9/24 | (2006.01) |
| A01G 9/26 | (2006.01) |
| A01G 7/04 | (2006.01) |

(52) U.S. Cl.
CPC ............ *A01G 9/246* (2013.01); *A01G 7/045* (2013.01); *A01G 9/26* (2013.01); *A01G 31/00* (2013.01); *A01G 31/06* (2013.01)

(58) Field of Classification Search
CPC ......... A01G 31/00; A01G 31/02; A01G 31/06
USPC ............................ 47/59 R, 60, 62 A, 62 R, 63
See application file for complete search history.

(56) References Cited

U.S. PATENT DOCUMENTS

| | | | |
|---|---|---|---|
| 5,224,291 A | | 7/1993 | Sherfield |
| 5,937,575 A | * | 8/1999 | Zobel ................ A01G 31/02 |
| | | | 250/339.13 |

(Continued)

FOREIGN PATENT DOCUMENTS

| | | |
|---|---|---|
| EP | 0108362 | 5/1984 |
| JP | 2013165706 | 8/2013 |

OTHER PUBLICATIONS

International Search Report and Written Opinion for PCT application No. PCT/US2016/026538, dated Jul. 25, 2016, in 15 pages.

*Primary Examiner* — David J Parsley
(74) *Attorney, Agent, or Firm* — Knobbe Martens Olson & Bear LLP

(57) ABSTRACT

An aeroponic system for supporting efficient low-resource-usage plant growth comprises a housing comprising one or more openings and one or more root chambers; one or more sealing members configured to substantially conform to a stalk of a plant and to substantially isolate a canopy of the plant from the one or more root chambers; one or more root chamber sensors; one or more nutrient storage reservoirs for storage of plant nutrients; one or more air-assisted nozzles configured to introduce atomized nutrient solution into the one or more root chambers; a temperature control system configured to control a temperature of the one or more root chambers; and a control system configured to control the temperature control apparatus and the one or more air-assisted nozzles to maintain environmental parameters associated with the one or more root chambers within desired parameter ranges.

20 Claims, 61 Drawing Sheets

(56) References Cited

U.S. PATENT DOCUMENTS

| | | | |
|---|---|---|---|
| 8,365,466 B1 | 2/2013 | Storey | |
| 9,526,215 B2 | 12/2016 | Suntych | |
| 9,560,837 B1 | 2/2017 | Suntych | |
| 2007/0113472 A1 | 5/2007 | Plowman | |
| 2014/0144078 A1* | 5/2014 | Gonyer | A01G 31/02 47/62 A |
| 2014/0318012 A1* | 10/2014 | Fujiyama | F24F 11/0001 47/62 R |
| 2014/0352211 A1 | 12/2014 | Liotta | |
| 2016/0183488 A1* | 6/2016 | Yano | A01G 7/045 47/62 A |
| 2017/0094911 A1 | 4/2017 | Suntych | |

* cited by examiner

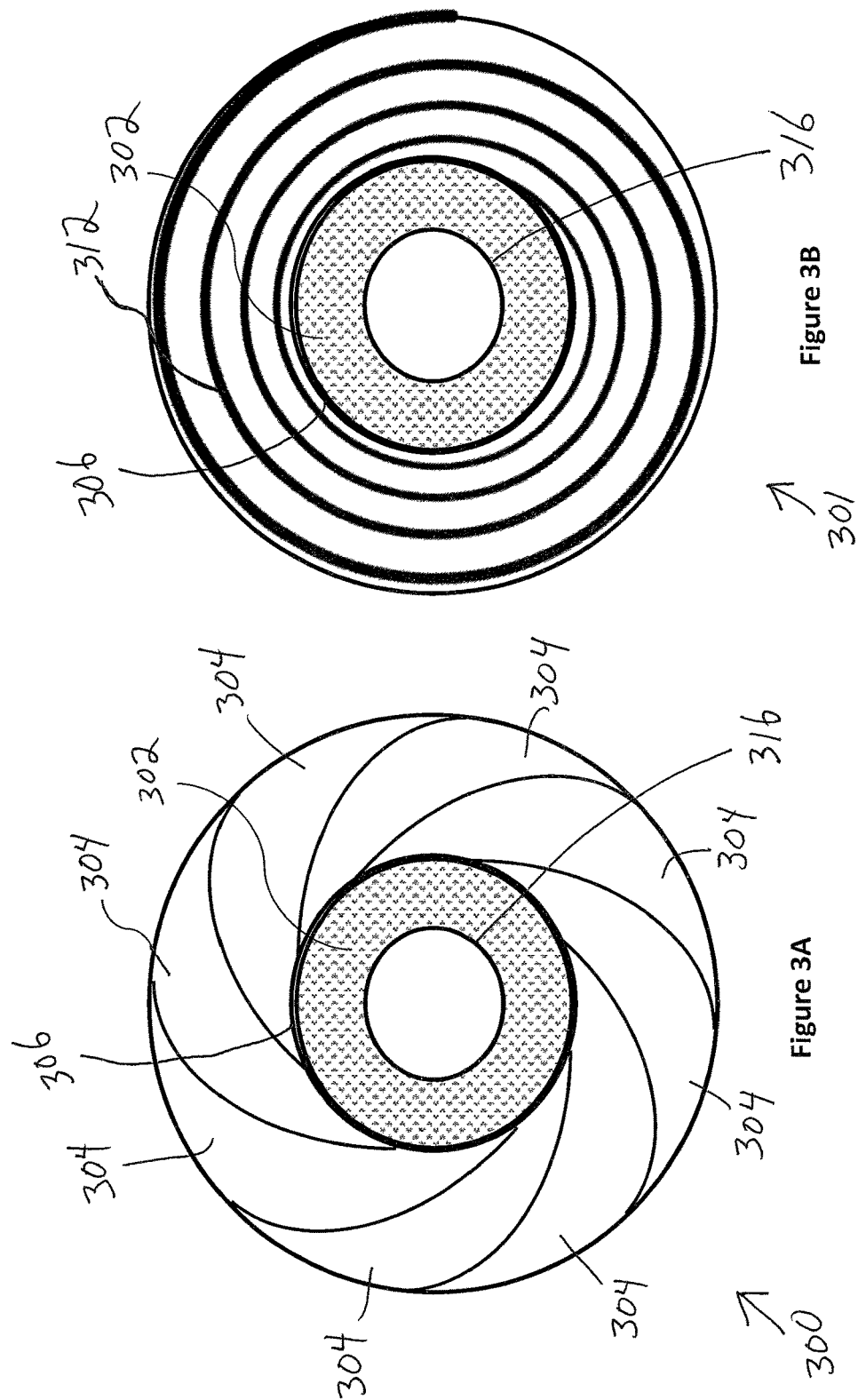

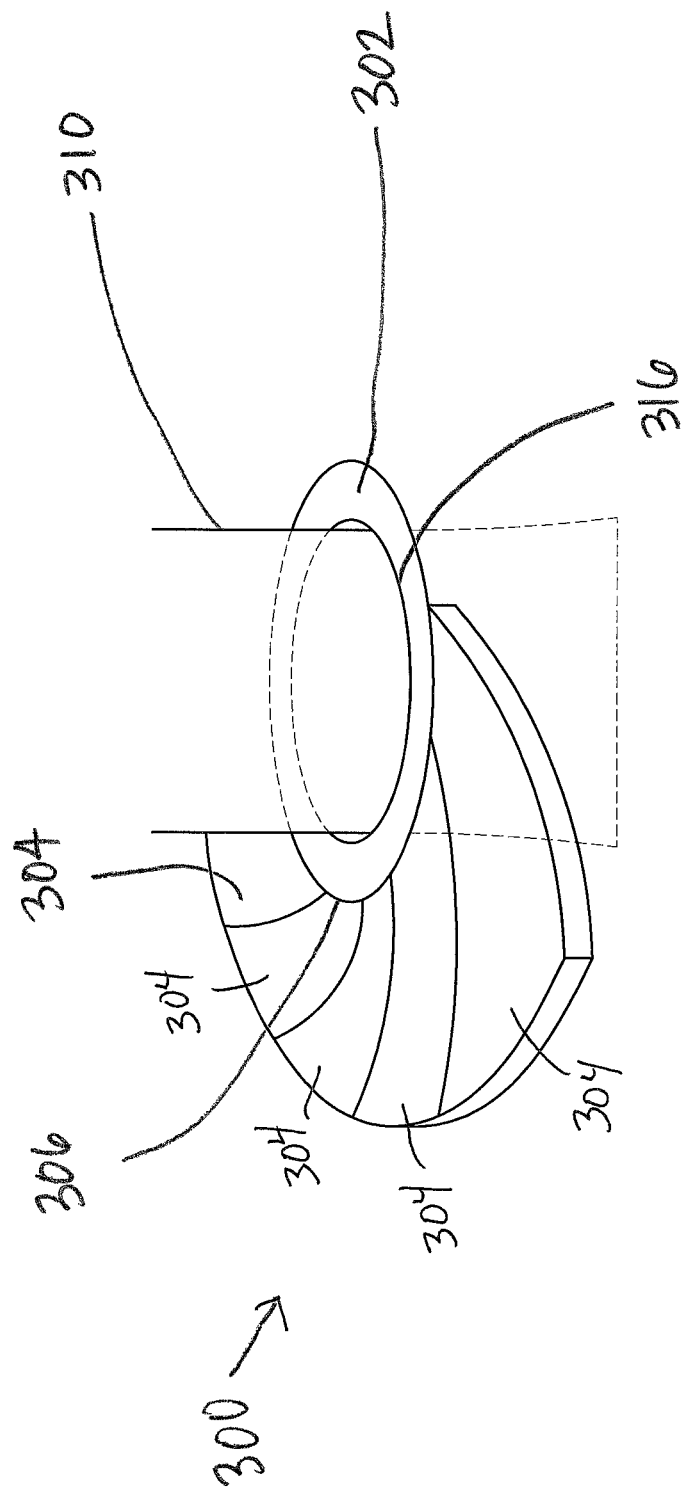

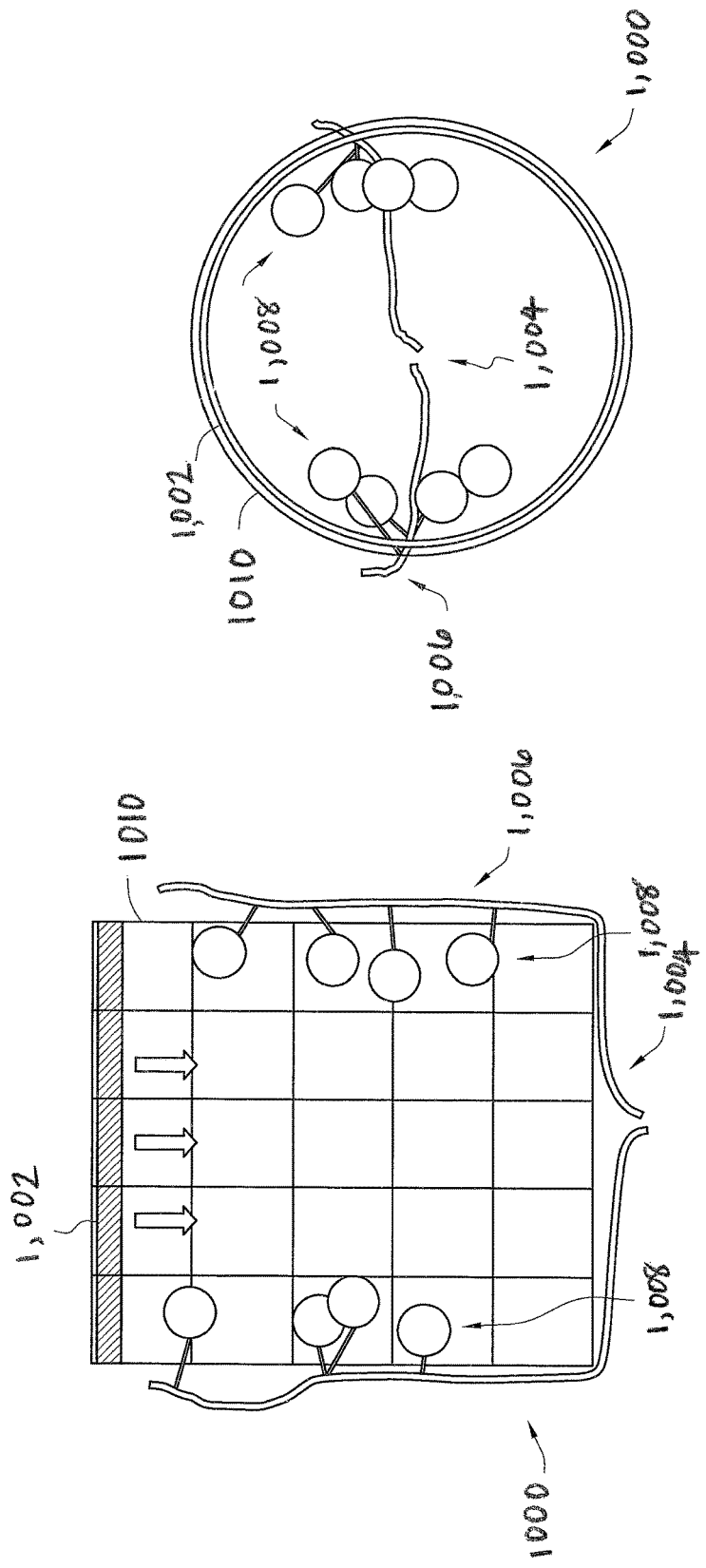

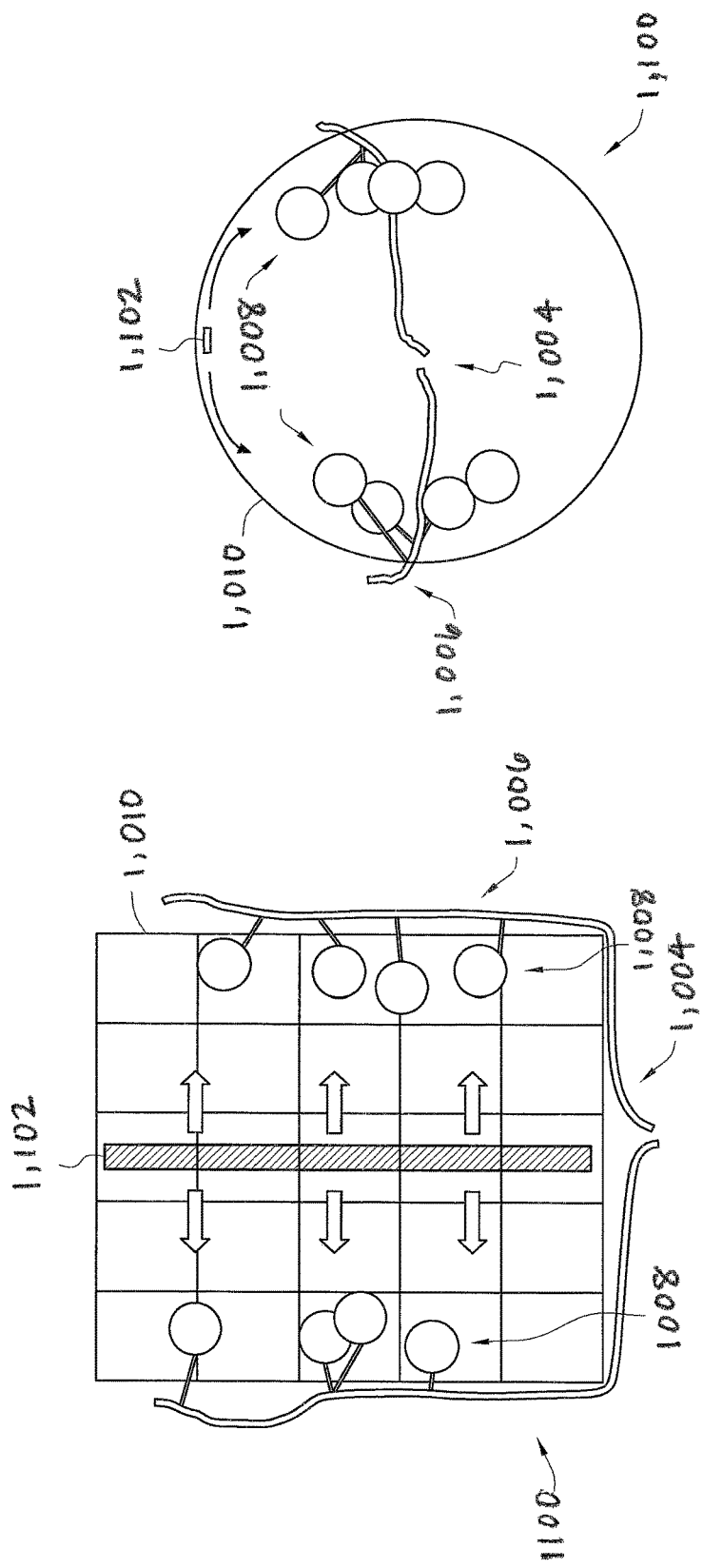

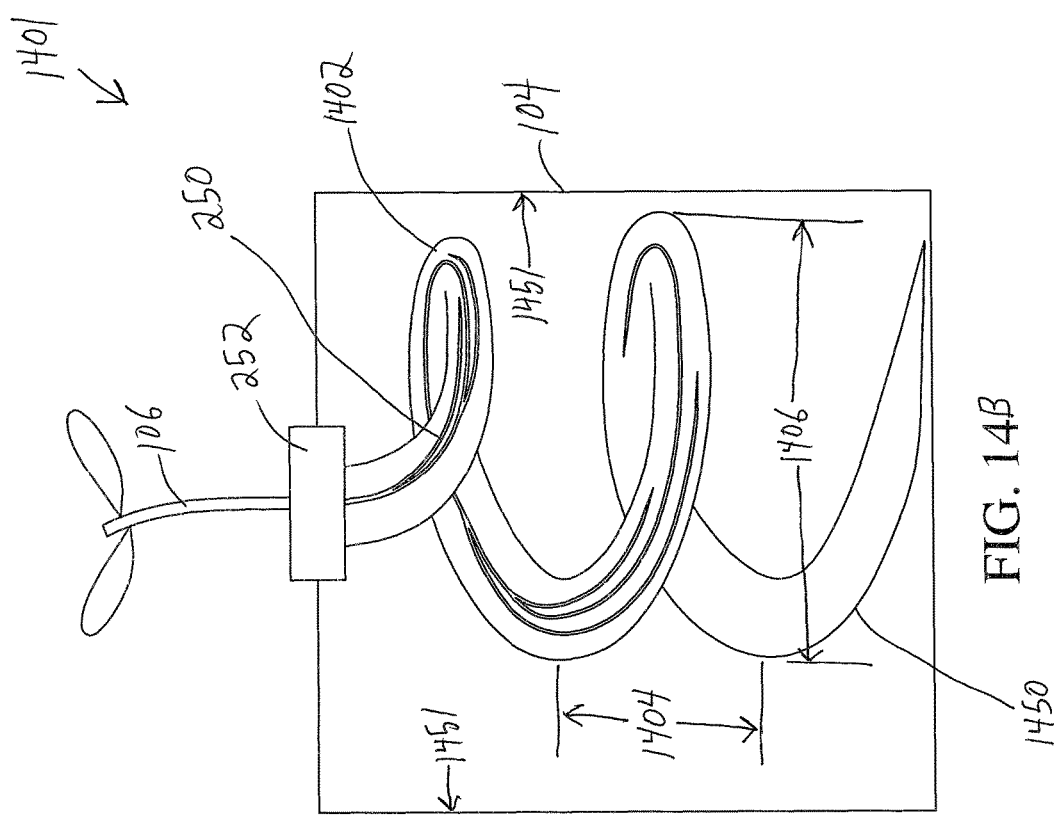

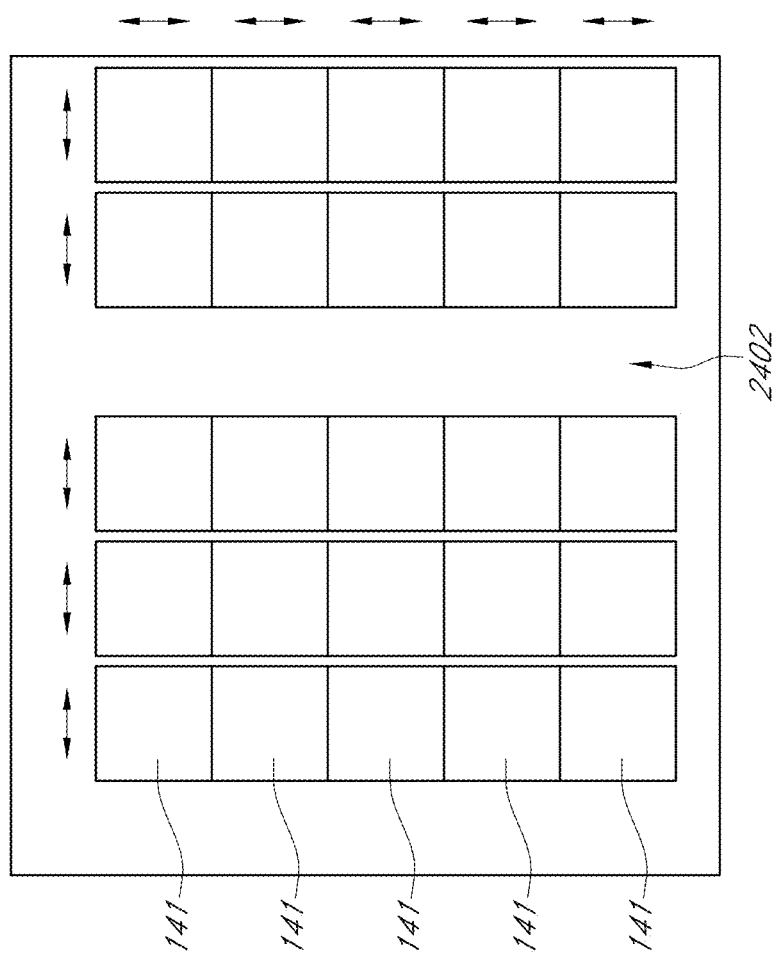

SYSTEMS, METHODS, AND DEVICES FOR AEROPONIC PLANT GROWTH

CROSS-REFERENCE TO RELATED APPLICATIONS

This application is a continuation of PCT Application No. PCT/US2016/026538, filed Apr. 7, 2016, which claims the benefit of U.S. Provisional Application No. 62/188,538, filed Jul. 3, 2015, and U.S. Provisional Application No. 62/145,409, filed Apr. 9, 2015. Each of the foregoing applications is hereby incorporated by reference herein in its entirety.

BACKGROUND

Field

The disclosure relates generally to the field of horticulture, and more specifically to systems, methods, and devices for a light emitting diode array and/or a horticulture apparatus.

Description

Aeroponics has been a niche technology since the 1980's when NASA developed it for growing food on the international space station. Before now, there has not been a strong motivation for a technology that can reduce water consumption by 98%. There are currently a few other companies in the US and abroad that are trying to commercialize this technology.

Persistent drought conditions, such as in California and in other parts of the world, have made water a limited resource for agricultural purposes. Accordingly, farmers now face challenges in determining how to maintain their livelihoods. Some farmers are choosing to move away from water-intensive crops such as rice, alfalfa and almonds, and some are abandoning farming altogether, selling off plots of land that have been in their families for generations.

SUMMARY

In response to these needs, disclosed herein are systems, methods, and devices that enable growing of plants, such as tomatoes, almonds, grapes, and/or various other plants significantly more efficiently than with current agricultural techniques. In some embodiments, systems disclosed herein comprise a self-contained plant growth system that generates a controlled environment ideal for efficient and/or accelerated growth of the plant. In some embodiments, the system acts essentially as a plant life support system that could be used to support plant growth anywhere, not just at locations having fertile farmland. For example, some embodiments of plant growth systems disclosed herein may be used inside of a building, warehouse, residence, and/or the like.

According to some embodiments, a system for supporting plant growth comprises: a canopy chamber for positioning therein of a canopy of a plant, the canopy chamber having an outer wall comprising a material that allows light from an external light source to pass therethrough into the canopy chamber; a light deprivation mechanism configured to selectively limit passage of light from the external light source into the canopy chamber; an internal light source positioned within a space defined by an outer boundary of the canopy chamber; a root chamber for positioning therein of roots of the plant; and a sealing mechanism having an opening configured to substantially conform to a stalk of the plant, the sealing mechanism configured to substantially isolate the canopy chamber from the root chamber.

In some embodiments, the root chamber is an aeroponic chamber. In some embodiments, the system further comprises at least one nozzle fluidly coupled to a nutrient source, the at least one nozzle positioned to inject a liquid or gas from the nutrient source into the root chamber. In some embodiments, the at least one nozzle comprises an air assisted nozzle. In some embodiments, the system further comprises at least one additional root chamber for positioning therein of roots of a second plant. In some embodiments, the internal light source is centrally positioned within the canopy chamber. In some embodiments, the internal light source is rotatable with respect to the canopy chamber. In some embodiments, at least one barrier separates the internal light source from the canopy chamber. In some embodiments, the at least one barrier comprises a transparent cylindrical tube. In some embodiments, the light depravation mechanism comprises at least one of: a curtain, a shade, and a substantially transparent material configured to become less transparent upon application of an electrical charge. In some embodiments, the internal light source comprises an adjustable light spectrum output. In some embodiments, the opening of the sealing mechanism is expandable to account for plant stalk growth. In some embodiments, the opening of the sealing mechanism is formed by a compressible material that can conform to a non-circular shape. In some embodiments, the system further comprises a trellis positioned within the canopy chamber. In some embodiments, the trellis comprises a hollow tube configured for a fluid to pass therethrough. In some embodiments, the system further comprises a heat exchanger fluidly coupled to the hollow tube of the trellis. In some embodiments, the canopy chamber is isolated from an external environment by at least one air-tight seal. In some embodiments, the system further comprises at least one hingedly or slidably attached door positioned to enable access into the canopy chamber.

According to some embodiments, a system for supporting plant growth comprises: an environmentally controlled canopy chamber for positioning therein of a canopy of a plant; an internal light source positioned within a space defined by an outer boundary of the canopy chamber; an aeroponic root chamber for positioning therein of roots of the plant; and a sealing mechanism having an opening configured to substantially conform to a stalk of the plant, the sealing mechanism configured to substantially isolate the canopy chamber from the root chamber.

According to some embodiments, a method of drying a plant grown in a plant growth system comprising an aeroponic root chamber having roots of the plant positioned therein and an environmentally isolated canopy chamber having a canopy of the plant positioned therein comprises: reducing introduction of moisture into the aeroponic root chamber; monitoring a temperature of an internal environment of the canopy chamber; maintaining the temperature of the internal environment of the canopy chamber to within a predetermined drying temperature range; monitoring a relative humidity level of the internal environment of the canopy chamber; maintaining the relative humidity level of the internal environment of the canopy chamber to within a predetermined drying humidity level range; and detecting when the canopy of the plant is no longer introducing moisture into the environment of the canopy chamber, wherein the method is at least partially automatically controlled by a computer system.

In some embodiments, the reducing introduction of moisture into the aeroponic root chamber comprises ceasing introduction of new moisture into the aeroponic root chamber. In some embodiments, the method further comprises reducing a relative humidity of the aeroponic root chamber using a dehumidifier. In some embodiments, the method further comprising activating an automatic harvesting mechanism in response to detecting that the canopy of the plant is no longer introducing moisture into the environment of the canopy chamber.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The drawings comprise the following figures in which:

FIGS. 3A through 3C illustrate example embodiments of mechanical apertures that may be used to seal against a plant stalk in one or more plant growth systems disclosed herein.

FIGS. 10A and 10B illustrates an example embodiment of an automatic harvesting mechanism for use with plant growth systems disclosed herein.

FIGS. 11A and 11B illustrate another example embodiment of an automatic harvesting mechanism for use with plant growth systems disclosed herein.

FIGS. 14A and 14B illustrate example embodiments of root training systems for use with plant growth systems disclosed herein.

FIGS. 24A and 24B illustrate example embodiments of plant growth system mobility systems for enabling movement of plant growth systems.

DETAILED DESCRIPTION

Figure 1A:
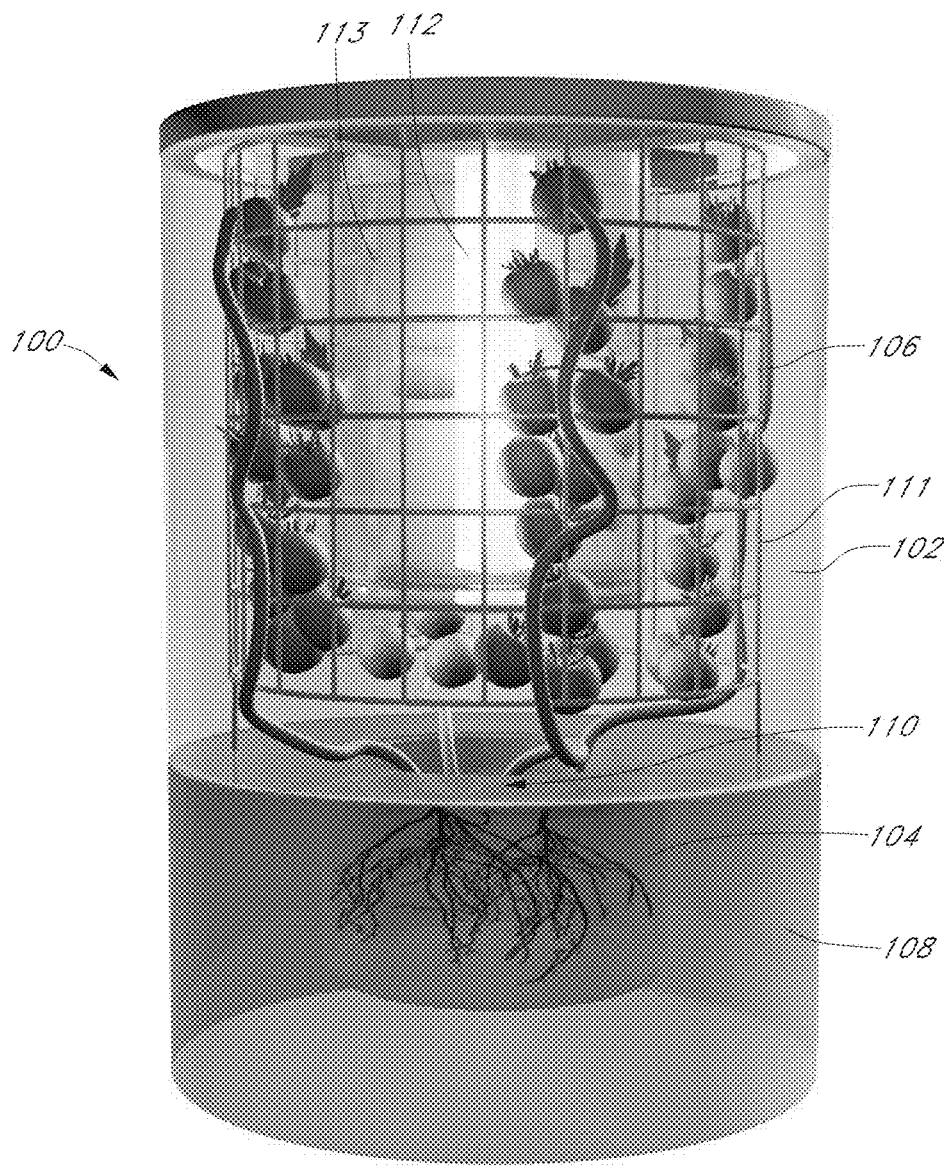
FIG. 1A illustrates an embodiment of a plant growth system configured to support growth of a single plant.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

Agriculture is a necessary part of sustaining human life. Specifically, growing of plants, such as corn, wheat, tomatoes, and/or the like, provides a source of food for the human population. As the human population has increased over the years, technological improvements have been made in the agricultural industry. For example, farmers moved from slow and labor-intensive cultivation methods (for example, horse and cattle-drawn equipment) to industrialized methods, such as using gasoline powered tractors, combines, and/or the like to more efficiently farm the land. Further, much science and research has enabled generation of genetically modified plants that are more efficient to farm, and/or yield more crops than traditional plants.

Although there have been many advances over the last couple hundred years in agriculture, the basic concept of agriculture has not changed. Namely, crops are primarily grown now and have been grown for hundreds of years by finding a plot of arable land, working that land, planting crops in the land, and then largely depending on mother nature to generate the conditions required for the crops to grow and flourish. Some techniques have been developed that help crops along, particularly in areas of the earth that are not as conducive to crop growth. For example, irrigation is used in areas where there is insufficient rainfall. Further, genetic modifications and/or chemicals have been developed that help to reduce the effect of pests on crops. All of these techniques, however, are merely incremental improvements on traditional farming and, while helpful in generating higher yields, often come at the price of using vastly more resources, such as water. Further, the introduction of chemical pesticides and the like can lead to runoff that contaminates water elsewhere that would otherwise be used for drinking water and other uses. Accordingly, there is a need for revolutionary changes in agriculture that enable increases in efficiency of crop production while also reducing agriculture's impact on the environment and the earth's natural resources.

In response to these needs, disclosed herein are various embodiments of self-contained plant growth systems that use aeroponic technology along with various other technologies to enable crops to grow efficiently with in a controlled environment. Some embodiments comprise a growth chamber or pod that comprises a plurality of sensors and systems for controlling all aspects of plant photosynthesis, such as lighting, atmosphere, nutrient supply, and water supply. In essence, such a system is a plant life-support system that can be used practically anywhere on the planet or even off the planet. For example, in addition to utilizing the technology disclosed herein to grow plants on the earth, systems incorporating the technology disclosed herein may be used by NASA, other governmental organizations, private space exploration companies, and/or the like to develop bioregenerative life-support systems for space exploration and colonization. For example, systems as disclosed herein may be used to grow food to sustain human life during relatively long space journeys, such as multi-year manned missions to other planets, and even after landing on those other planets, to support human life for colonization.

The systems disclosed herein are able to efficiently grow crops using less resources than traditional agricultural methods while also enabling those crops to be grown in many areas that would traditionally not be able to grow crops. For example, plant growth systems disclosed herein may be used within buildings in the inner city, in the desert where there is little rainfall and crops would normally not be able to be grown in the land, in environments that would typically be too hot or too cold to grow particular crops, and/or the like. For example, citrus fruits are typically grown in relatively warm environments. However, with a plant growth system as disclosed herein, those citrus plants could be grown practically anywhere, year-round, in colder climates such as the northern United States and Canada.

In some embodiments, as will be described in greater detail below with reference to the various drawings, a plant growth system comprises a grow chamber or pod configured to control its internal environment for ideal plant growth. In some embodiments, the system comprises a variety of subsystems that work together to support plant growth. For example, a grow pod may comprise one or more canopy chambers for positioning therein of the canopy of one or more plants, and one or more root chambers (for example, aeroponic chambers) for positioning therein of the roots of the plants. The canopy chamber may comprise a trellis to help mechanically support the canopy of the plant. The canopy chamber may further comprise one or more sensors connected to a control system to help control the plant growth system. For example, the sensors may comprise temperature, humidity, $CO_2$, oxygen, radio spectrometer for measuring light spectrum and intensity, digital camera, infrared camera, brix sensors, sensors that detect a specific property of the plant being grown, and/or the like. The root chamber may comprise various components as will be described in more detail below that support aeroponic nutrient and water distribution to the root system of the plants.

In some embodiments, the plant growth system or grow pod comprises an internal light source positioned within the canopy chamber and configured to provide light to the plant canopy to support plant photosynthesis. In some embodiments, the internal light source is positioned directly within the canopy chamber with no barrier between the light source and the plant canopy. However, it can be desirable in some embodiments to have a barrier between the light source and the plant canopy that can, for example, act as an insulator to limit heat transfer from the light source to the plant canopy while enabling light from the light source to pass through the barrier to the plant canopy. In some embodiments, the internal light source is positioned within a transparent tube or cylinder positioned within the canopy chamber. In some embodiments, the light tube comprises a double wall insulated member comprising, for example, acrylic, polycarbonate, glass, and/or the like.

In addition to the canopy chamber and internal light source or light tube, an embodiment of a plant growth system as disclosed herein may also comprise a hollow base or frame that supports the canopy chamber and/or light tube, one or more root chambers, one or more electronics bays, a cooling system, an aeroponic system, a nutrient delivery system, a curing/storage system, and/or the like. In some embodiments, one or more cavities or bays may also or alternatively be positioned above the canopy chamber instead of in a base below the canopy chamber. For example, it may be desirable to position components that generate a significant amount of heat, such as a power supply, in an upper chamber, to enable their generated heat to easily be dispelled upward from the chamber or growth system without adversely affecting the temperature in the canopy chamber. For example, in some embodiments, an electronics bay positioned near a top of a growth system may comprise, for example, high-voltage electrical inputs and command-and-control circuitry, including, for example, power relays, networking components, sensor inputs, lighting control, and/or the like.

The techniques disclosed herein can apply to the growth of crops of various sizes. For example, the size and shape of a grow pod as disclosed herein may be variable based on the type of crop being grown and/or the available space in the facility where the crop is being grown. Further, various designs disclosed herein comprise a three dimensional configuration wherein, for example, the canopy of one or more plants is positioned in a generally circular arrangement around a centrally positioned internal light source. Such a configuration can be a more efficient use of space than a traditional two dimensional crop arrangement, wherein crops are simply arranged in a line and receive light from the sun. For example, a version of a plant growth system configured to efficiently grow high light intensity fruiting and flowering crops may desirably be approximately 4 feet wide by 4 feet deep by 6 feet high. Such an embodiment may comprise, for example, a 1000 W capacity high intensity discharge lighting system. Such an embodiment, in a cylindrical design with the light source centrally located, may provide, for example, approximately 48 ft.$^2$ of plant canopy space within a 16 ft.$^2$ footprint, thereby effectively tripling space utilization over a traditional two dimensional canopy configuration. It should be noted that this is merely one specific example, and other embodiments may comprise different overall sizes and/or canopy space sizes, different types and/or sizes of light sources, and/or the like. For example, in some embodiments, an internal light source may utilize plasma, induction, LED, florescent, laser, fiber optic, and/or the like technology, and/or any combination thereof.

Various embodiments disclosed herein describe a generally cylindrical shaped plant growth system or grow pod. Plant growth systems are not limited to such a configuration, however. For example, a plant growth system may be square or rectangular in shape, octagonal in shape, and/or the like. In some embodiments, the outer walls of the grow pod or of the canopy chamber may comprise double wall insulated transparent materials, such as acrylic, polycarbonate, glass, and or the like. In some embodiments, such as in a cylindrical configuration, the outer walls, or at least a portion of the outer walls, may comprise sliding doors that rotate about the circumference of the assembly for ease of access. In some embodiments, the doors open and rotate about the entire circumference for ease of access to all sides of the pod.

Although it can be desirable in some embodiments to utilize transparent materials for the canopy chamber walls, it may be more efficient in some embodiments to utilize a nontransparent material that may have better insulation properties than a transparent material. For example, in a square or rectangular shaped pod, the pod or canopy chamber may comprise four walls, with three of those external walls comprising an opaque insulating material, similar to a refrigerator or freezer wall. A fourth wall, however, may comprise one or more hinged or otherwise coupled doors that enable access to the interior of the pod. In some embodiments, those doors may also comprise opaque insulating material. However, in some embodiments, those doors comprise transparent material, desirably insulated such as by using a double or triple wall configuration. In a configuration where access to the pod is through a door on one side of the unit, it may be desirable to enable the plants within the pod to be movable to move them closer to or further away from the door. Accordingly, as will be described in more detail below, a turntable or Lazy Susan type system can be used that enables the user to rotate the plants around and access any of them from a door opening.

In some embodiments, the canopy chamber of a plant growth system comprises one or more sensors configured to sense temperature, humidity, oxygen level, carbon dioxide level, and/or other parameters. In some embodiments, it may be desirable to have at least two of each of those sensors, for example with one located near the top of the chamber and one located near the bottom of the chamber, to more accurately measure a gradient between the top and bottom of the chamber. It may also be desirable to comprise one or more of a particular type of sensor for redundancy in the event of a sensor failure. Examples of other sensors that may be desirable to be included in or about the canopy chamber may comprise, for example, a spectroradiometer for measuring light intensity, such as in terms of photosynthetic photon flux density (PPFD) and spectrum (from ultraviolet to infrared, for example), and a wide angle high definition camera for remote monitoring and time-lapse capabilities. In some embodiments, a camera having infrared capabilities may be included, such as to perform automated crop health analysis via software.

Self-Contained Plant Growth Systems

As mentioned above, in some embodiments, systems disclosed herein comprise a self-contained or substantially self-contained plant growth system, sometimes referred to herein as a grow pod, grow unit, or similar. The disclosure below provides more specific details on certain embodiments of plant growth systems, with reference to the drawings. In some embodiments, the systems disclosed herein comprise a plant life-support system that can enable a plant to grow, survive, flower, be harvested, and/or the like in any environment. For example, a system as disclosed herein may comprise one or more chambers for positioning therein of a plant, the chambers being sealed or isolated, or substantially sealed or isolated from an external environment. The one or more chambers can be configured to be a controlled environment that can optimize plant growth efficiency. In some embodiments, for example, a canopy chamber and/or a root chamber may be configured to be substantially or completely airtight and/or watertight. In some embodiments, a canopy chamber and/or root chamber comprises at least one door, hatch, opening, and/or the like that is selectively openable to enable access to an interior of the chamber. In some embodiments, such an opening comprises at least one sealing member, such as a gasket, that helps to create a substantially or completely airtight and/or watertight seal.

In some embodiments, one or more chambers of a self-contained plant growth system have a plurality of configurable parameters that may be monitored and/or controlled. For example, a canopy zone or flowering zone may comprise sensors and/or control features that enable monitoring and/or controlling of temperature, humidity, $CO_2$ level, other air composition parameters, lighting level, and/or the like. As another example, a root zone may comprise sensors and/or control features that enable monitoring and/or controlling of temperature, humidity, oxygen level, nutrient composition, other air composition parameters, lighting level, and/or the like. Temperature, humidity, $CO_2$ level, oxygen level, and lighting level, can be important parameters to control in maximizing or increasing efficiency of plant growth, flowering, and/or the like. It should be noted, however, that various other parameters may also or alternatively be monitored and/or controlled, desirably to increase efficiency of plant growth.

FIG. 1A illustrates one embodiment of a self-contained grow pod 100. The grow pod 100 illustrated in FIG. 1A comprises an upper canopy zone or chamber 102 and a lower root zone or chamber 104. Desirably, the canopy zone 102 is sealed or at least partially sealed from the root zone 104 (e.g., by seal 110), because different ideal environmental conditions or parameters are desirable in each of the two zones. For example, in some embodiments, it may be desirable for the root zone 104 to be dark or pitch black, while it may be desirable to have a certain level and/or wavelength of light introduced into the canopy zone 102 to enable plant growth. In the embodiment illustrated in FIG. 1A, the canopy zone 102, meaning the zone where the plant canopy or plant stalks (e.g., plant canopy 106) grow and receive light, is a cavity that is sealed off from or isolated from the external atmosphere, the lower root zone 104, and the lower cavity 108 adjacent the root zone 104. For example, in some embodiments, and as will be described in more detail below, the canopy and root zones 102, 104 can be sealed or isolated from one another with a seal 110. A light source 112 is centrally positioned in the canopy zone, and is at least partially thermally isolated from the plant or plants by a barrier 113. In some embodiments, however, the internal light source may be positioned directly within the canopy zone or chamber, without a thermal barrier between them. Further, it will be understood that the light source 112 can be positioned at any suitable location within the canopy zone 102 (or outside of the canopy zone 102, as long as the light source's generated light can be directed into the canopy zone 102) and take on any suitable form (e.g., cylindrical, octagonal, elongated, long and thin, short and wide, modular, and/or the like), as will be described in greater detail below. Further, more than one internal light source may be used in some embodiments.

Figure 1B:
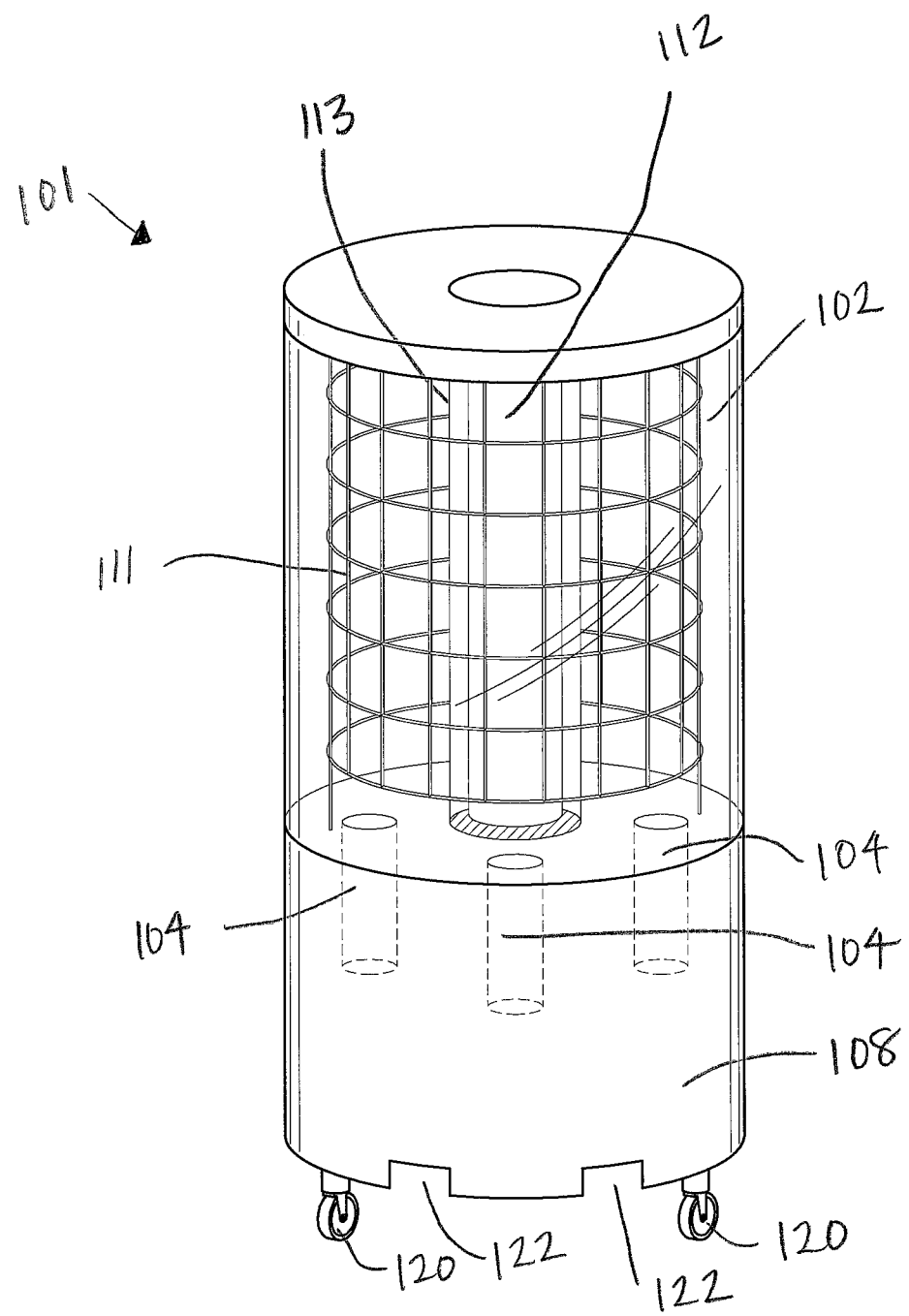
FIG. 1B illustrates an embodiment of a plant growth system configured to support growth of multiple plants.

The plant growth system 100 illustrated in FIG. 1A illustrates an example of a configuration wherein the system comprises a single canopy zone 102 and a centrally located single root zone 104 (e.g., an aeroponic chamber 104). Such a design may be desirable in use with, for example, a plant that can be trained to have its individual plant stalks grow outward and up around the trellis 111. In some cases, however, it may be desirable to grow multiple plants within a single plant growth system. Accordingly, with reference to FIG. 1B, FIG. 1B illustrates another embodiment of a plant growth system or grow pod 101. The grow pod 101 is similar in design to the grow pod 100, except the grow pod 101 comprises a plurality of root zones or root chambers 104 positioned about the light source 112. In this case, the grow pod 101 comprises four root chambers 104, with one not shown in this figure because it is positioned behind the light source 112. Various other embodiments may use more or less root chambers, such as two, three, five, six, seven, eight, nine, 10, or more. The number of root chambers that can be used is dependent on the available space in the grow pod and or the expected size of canopy of each plant.

Another difference in the grow pod 101 as compared to grow pod 100 is that in the grow pod 101 the internal light source 112 and barrier 113 extend completely from the ceiling of the canopy zone 102 to the base of the canopy zone 102. In the grow pod 100 of FIG. 1A, however, the light 112 and barrier 113 are suspended from the ceiling of the canopy zone 102, but do not extend all the way to the base of the canopy zone 102, because the opening into the root zone 104 is centrally located in the floor of the canopy zone 102. It can be desirable in some embodiments to have a full length light source 112 like as shown in FIG. 1B, because, for example, there is more available surface area of the light source 112 and more even lighting of the plant canopies 106 may be achieved.

Another feature shown in FIG. 1B that is not shown in FIG. 1A is that the plant growth system 101 comprises a plurality of wheels or casters 120 that enable the grow pod 101 to be easily moved or repositioned. In some embodiments, the wheels 120 are powered to enable the grow pod 101 to move itself without requiring, for example, a person to push or pull it. Further, in some embodiments, the wheels 120 are attached to the base 108 of the grow pod 101 in a fashion that enables one or more of the wheels to move upward or downward with respect to the base 108. For example, the wheels may be attached at an end of a collapsible post that comprises a linear actuator, such as an Acme screw or ball screw. Such a configuration may enable easy leveling of the grow pod 101, such as on an uneven surface. In some embodiments, leveling is configured to be performed manually by an operator of the system. In other embodiments, the system includes a sensor, such as an accelerometer or digital level, that enables the system to self-level by actuating one or more of the linear actuators.

Another feature illustrated in FIG. 1B that is not shown in FIG. 1A is a set of fork openings 122. The fork openings 122 are configured to enable the tines of a forklift to be positioned therein for easy relocation of the plant growth system 101, for example in an industrial warehouse environment. Although not shown in FIG. 1B, some embodiments, such as the embodiment illustrated in FIG. 1D, described below, may comprise more than one set of fork openings 122. Such a design may make it easier to relocate the grow pod when, for example, only one side of the grow pod is accessible by a forklift, pallet jack, and/or the like.

In some embodiments, the grow pod can comprise one or more access ports or openings to the external atmosphere, such as to enable installation or removal of a plant, harvesting of a plant, and/or the like. For example, in some embodiments, the outer wall of the canopy zone 102 may comprise a hinged door, a removable port, a sliding door, and/or the like. In some embodiments, it may be desirable to utilize a sliding door or a removable port that does not swing outward away from the pod. One advantage of this is that an access door that swings outward would require more open floor space next to the grow pod. If multiple grow pods are being fit into a confined area, such as, for example, a commercial growing operation, floor space may be at a premium, and it may be desirable to minimize the floor space that each grow pod requires.

Figure 1C:
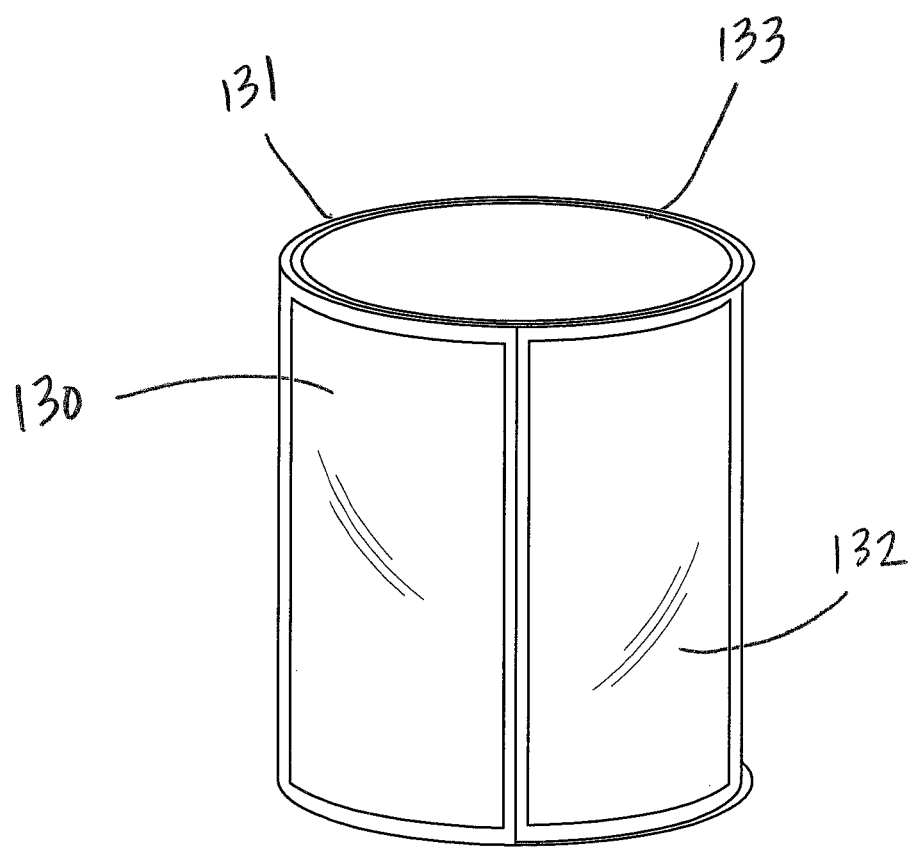
FIG. 1C illustrates one example embodiment of a sliding door arrangement that could be used with, for example, the plant growth systems of FIGS. 1A and 1B.

FIG. 1C illustrates one example embodiment of a sliding door arrangement that may, for example, enable access to the canopy zone area of a cylindrically shaped grow pod, such as grow pods 100 and 101 illustrated in FIGS. 1A and 1B. For simplicity, the grow pods 100 and 101 are illustrated without showing a door or other access method into the canopy zone 102. It can be desirable, however, to have an easy means of access into the canopy zone 102, such as to maintain the plants being grown. The arrangement illustrated in FIG. 1C is one such example access method. In this case, the system comprises two sliding doors, namely an outer door 130 and an inner door 132. Each of the doors 130, 132 engages a respective sliding track, namely outer track 131 and inner track 133. In this case, each of the two doors 130, 132 takes up approximately 90° of the full circular shape of the canopy zone. For simplicity, FIG. 1C illustrates only two doors. However, in some embodiments where the doors each take up approximately 90° of the full circular shape of canopy zone, it may be desirable to have four doors that each comprise approximately 90° of the circular shape of canopy zone and that each ride on their own circular-shaped track. In some embodiments, one or more of the doors may share a track. A design as illustrated in FIG. 1C may be convenient to enable access to the canopy zone at any circumferential location about the canopy zone. Although the embodiment illustrated in FIG. 1C illustrates an embodiment wherein multiple doors can each independently slide about the circumference of the canopy zone, in some embodiments, one or more doors or panels may be able to slide about the canopy zone, while one or more stationary wall portions, transparent or opaque, may not be rotatable or slidable. In such an embodiment, the sliding door or doors may be configured desirably to slide outside of rather than inside of the stationary wall portion or portions, so that the sliding door or doors do not rub against the plants within the canopy zone when being slid. This can help to prevent damage to the plants that are being grown.

Figure 1D:
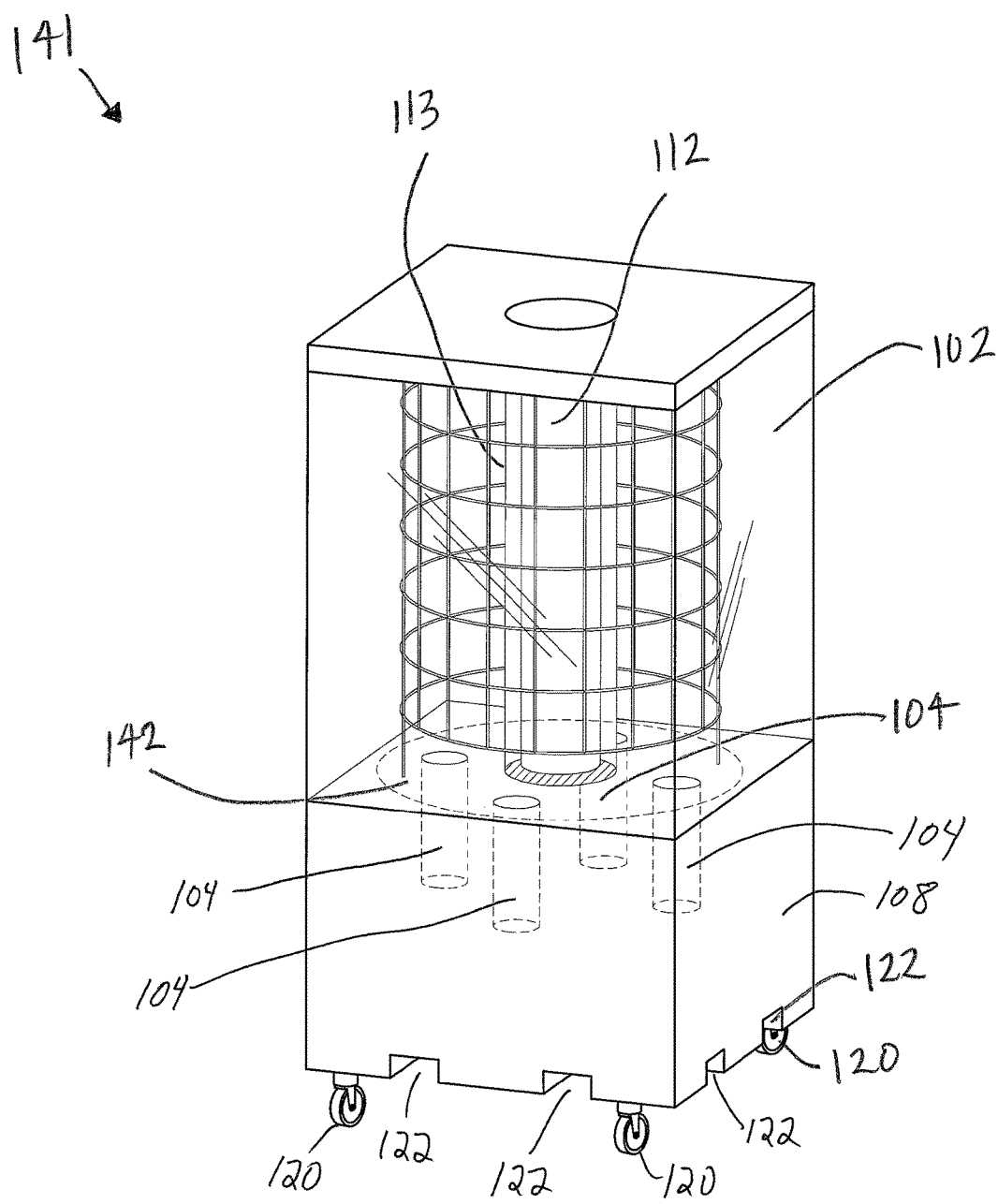
FIG. 1D illustrates another embodiment of a plant growth system configured to support growth of multiple plants.

FIG. 1D illustrates another embodiment of a self-contained plant growth system or grow pod 141. The plant growth system 141 is similar in many respects to the plant growth system 101, and like reference numbers are used to refer to like components. One difference in the plant growth system 141 is that the plant growth system 141 is of a generally rectangular shape instead of a cylindrical or circular shape. One benefit to such a shape is that available canopy zone space can be maximized in a warehouse or commercial situation where multiple grow pods are being stuffed into a confined space. By using a square or rectangular shape, wasted space can be minimized.

Figure 1E:
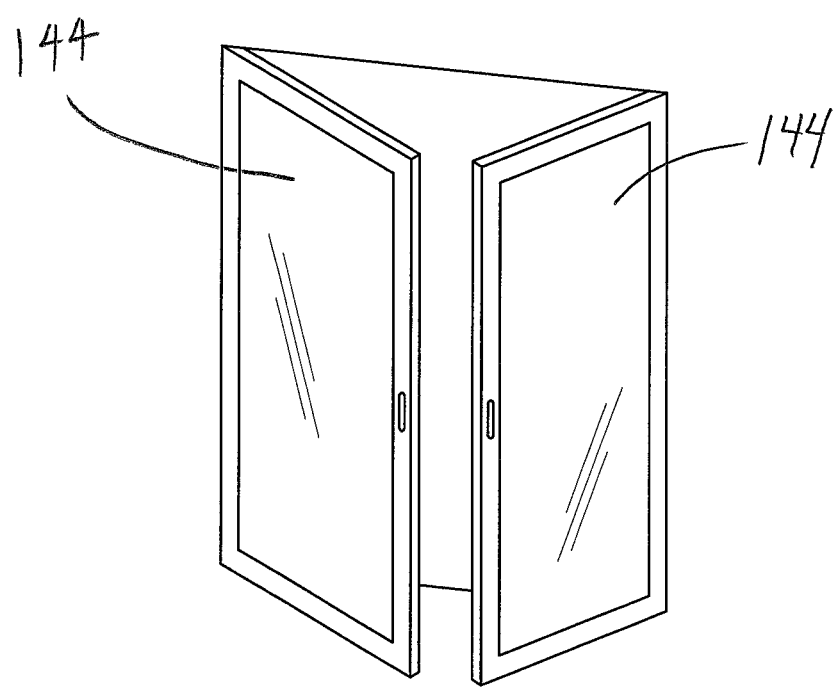
FIG. 1E illustrates an example embodiment of a hinged door arrangement that could be used with one or more of the plant growth systems disclosed herein.

One benefit as described above of a cylindrical shape, such as shown in FIG. 1B, is that sliding doors may be configured to slide about the circumference of the cylindrical shape and enable access at any side or all about the cylindrically shaped grow pod. Such a configuration is more difficult to implement with a square or rectangular shape, as shown in FIG. 1D. One alternative is to include doors on each of the four outer walls of the canopy zone 102. The doors may be configured to hingedly open, as illustrated by doors 144 in FIG. 1E. Another alternative is to include a feature that enables access to any of the plants within the grow pod from a single door opening. For example, as illustrated in FIG. 1D, the grow pod 141 comprises a turntable assembly 142 that is configured to enable the root chambers 104 to be rotated about a central axis of the grow pod, such as the central axis of the light tube 112, to enable a user to access any of the plants from a single wall opening in the canopy chamber 102. In some embodiments, a trellis, similar to trellis 111 shown in FIG. 1A, may be coupled to the turntable 142 and turn along with the turntable 142 and root chambers 104. Additional details are given below of specific embodiments of turntable arrangements.

Figure 4A:
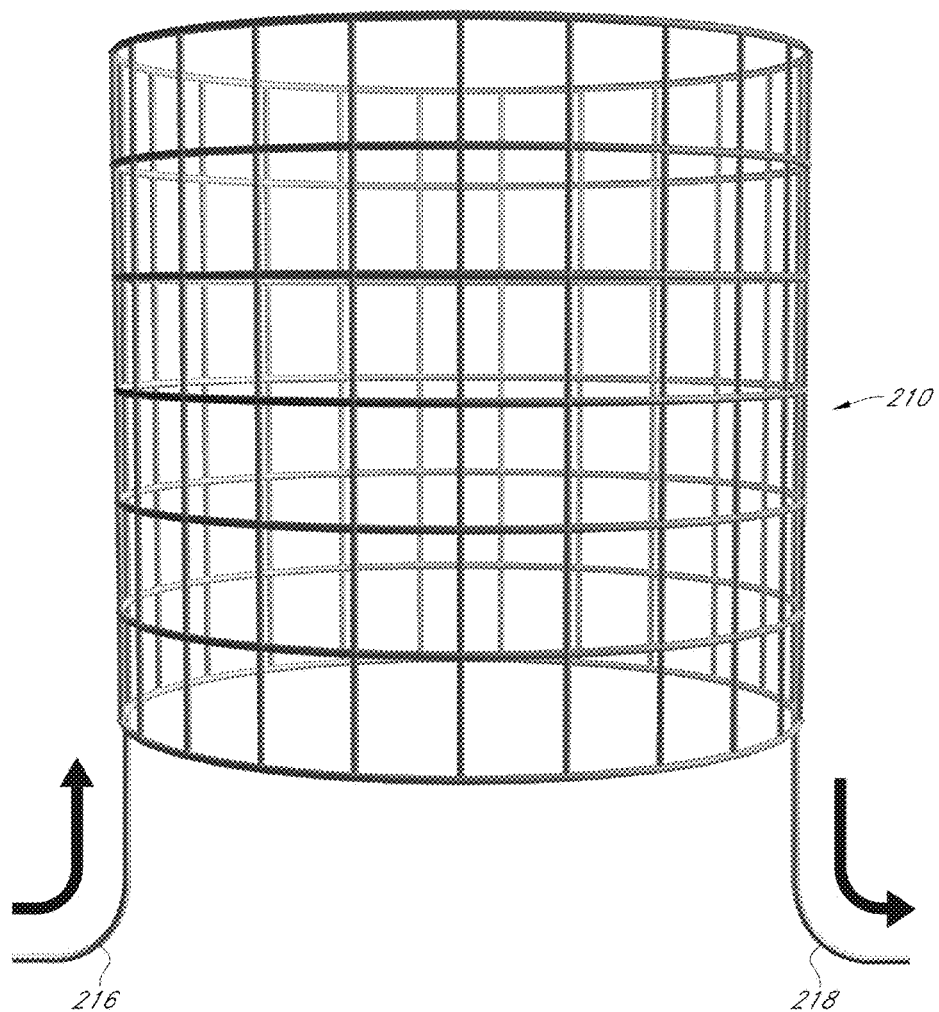
FIGS. 4A through 4F illustrate various embodiments of plant trellises comprising heating and/or cooling functions.
Figure 4B:
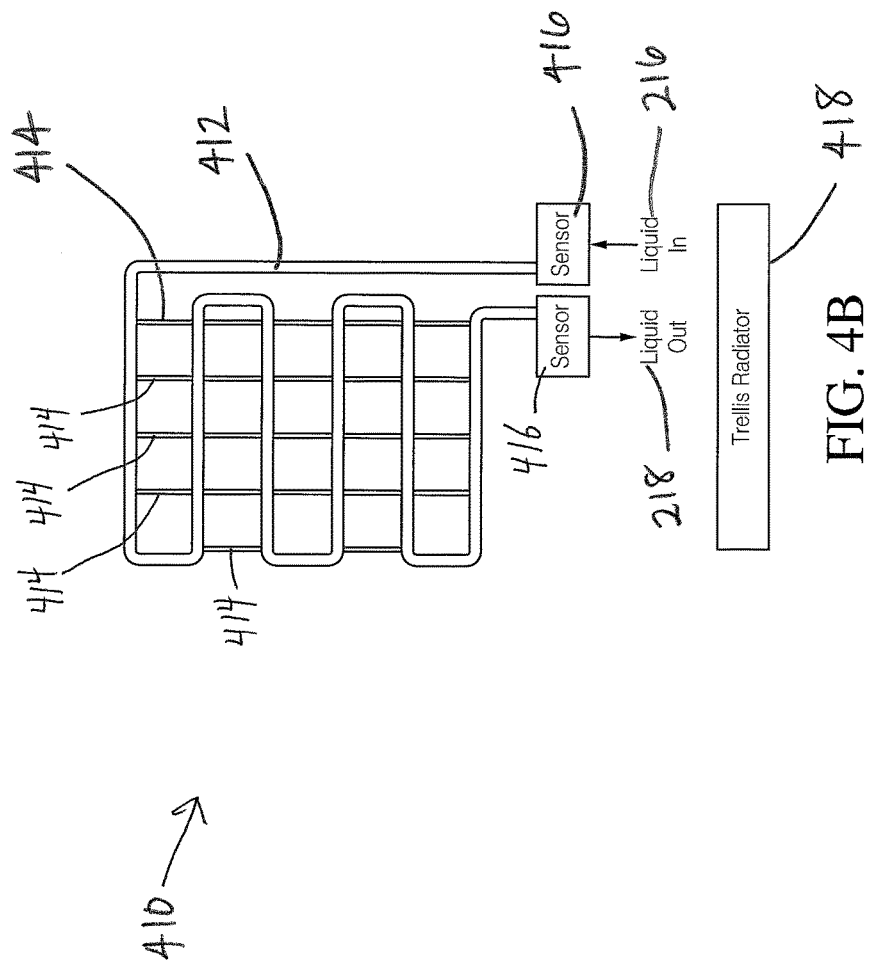

It should be noted that, for simplicity, the grow pods or plant growth systems 101, 100, 141 illustrated in FIGS. 1A, 1B, and 1D are high-level simplified diagrams of such systems. While some embodiments may comprise only the components illustrated in these figures, in many cases, a plant growth system will comprise many more subsystems and/or components than are shown in these high-level schematic diagrams. As will be discussed in greater detail below, FIGS. 2A through 2E illustrate some additional high level schematic diagrams of features of example plant growth systems. Further, various other drawings that will be discussed in greater detail below are focused on one or more individual subsystems or components of plant growth systems disclosed herein. Each of these subsystems may be combined with and/or used by any of the other plant growth systems disclosed herein and/or with each other. For example, FIG. 4B illustrates a heated and/or cooled trellis system that may be used with any plant growth system disclosed herein. As another example, FIGS. 6A through 6E illustrate a lighting system that may be used with any plant growth system disclosed herein. As another example, FIGS. 7A through 7D illustrate light deprivation systems that may be used with any of the plant growth systems disclosed herein. The remaining figures also illustrate specific subsystems or components that may be used with any of the plant growth systems disclosed herein. Accordingly, one of skill in the art will recognize that, although some drawings and descriptions of this disclosure focus on one or more individual subsystems and/or one or more individual components, it is contemplated by this disclosure that any of these subsystems or individual components may be combined into a full plant growth system. One of skill in the art would recognize that combining all of these subsystems and/or individual components into a single drawing would produce a cluttered drawing that may be more difficult to comprehend than the approach taken in this application, wherein various subsystems or components are shown in their own individual drawings. Further, it is also contemplated that any of the individual systems or subsystems disclosed herein, such as the trellis system of FIG. 4B, the lighting system of FIGS. 6A through 6E, the light deprivation systems of FIGS. 7A through 7D, and any other systems disclosed herein, may be used alone and/or combined with one or more other systems disclosed herein in a use that is not necessarily within or associated with a self-contained grow pod. For example, various technologies disclosed herein may be used in open-air environments, such as outdoors, in a residence, in a commercial warehouse or grow room, and/or the like. As one specific example, the heated and/or cooled trellis technology disclosed herein may in some embodiments be used as a stand-alone technology to support growth of plants outside of a grow pod. Even when a trellis is used as a standalone unit not inside of a controlled grow pod environment as disclosed herein, the heating and/or cooling properties of the trellis may still benefit a plant that is attached to or positioned adjacent to the trellis. As another specific example, the various lighting technologies disclosed herein may be used for growing plants in an environment that is not an enclosed grow pod, such as an open air warehouse, grow room, residence, and/or the like.

As mentioned above, another benefit to a self-contained grow pod or system (e.g., systems 100, 101, 141, and/or the like) is that plants may be grown anywhere. As an example, many vegetables utilized at restaurants in New York City are grown hundreds of miles away at agricultural areas where the environment and soil is more suited to growing vegetables, in addition to property being cheaper. However, with the self-contained grow pods disclosed herein, vegetables may be grown anywhere, such as in a skyscraper in New York City, closer to the restaurants where those vegetables will be used. Further, such technology may be utilized in space or on other planets, such as on Mars, the Moon, the International Space Station, other space vessels, and/or the like. Because a self-contained grow system is essentially a plant life-support system that separates the plant growth environment from the external environment, plants may be grown essentially anywhere. Plants could even in some embodiments be grown underwater, or on a boat on the ocean, among other non-land based environments.

In some embodiments, a grow pod as disclosed herein (e.g., grow pod 100, 101, 141, and/or the like) is completely or substantially self-contained, meaning no water, nutrients, or other external elements need be regularly introduced to the system. For example, the system may comprise one or more water, oxygen, carbon dioxide, and/or nutrient storage containers and may comprise a stored power source, such as a battery or other electrical power source (and/or a solar power source that does not require connection to a local power grid). In other embodiments, a grow pod as disclosed herein is configured to be somewhat self-contained, but may have some connections to the outside environment for introduction of things such as water or electrical power. For example, a grow pod may comprise an electrical cable for connecting to an electrical outlet and/or one or more pipe fittings, couplings, tubes, and/or the like for providing water, CO2, compressed air, nutrients, and/or the like to the grow pod. Some embodiments may be configurable to be selectively wholly self-contained or only partially self-contained.

Further, in some embodiments, a self-contained grow pod (e.g., grow pod 100, 101, 141, and/or the like) is configured to not emit any byproducts to the external environment. For example, the system may be configured to capture any heat released from an internal light source and convert that heat into electrical power (e.g., through a thermoelectric generator) or otherwise keep the heat from being expelled into the external environment (such as by redirecting heat from the light source to another component of the system that requires heat). As another example, if a system is configured to release any air into the external environment, it may be configured to scrub that air of any undesirable odors, such as by using filters and/or the like. However, in some embodiments, a grow pod may release some heat or other byproducts into the external environment.

In an embodiment, the system can be configured to advantageously increase plant yields by a minimum of 3× within same square footage of grow area. In an embodiment, the system can be configured to advantageously reduce electricity consumption by 40% over industry-standard high-intensity discharge (HID) lighting systems. In an embodiment, the system can be configured to advantageously reduce water consumption by 95% over soil-based grow mediums. In an embodiment, the system can be configured to advantageously increase plant growth rate by 2×-3×. In an embodiment, the system can be configured to advantageously eliminate the need for pesticides and herbicides.

In an embodiment, as described in more detail below, the system comprises a light emitting diode array, an aeroponic apparatus, and a control system for dynamically controlling the light emitting array and/or the aeroponic apparatus.

For example, in an embodiment, the systems described herein comprise an insulated, actively cooled, self-draining, sensor-enabled, motorized, and robotic aeroponic apparatus. The aeroponic apparatus can comprise wheels and a built-in (or modular) three-dimensional trellis that reduces water consumption by up to 95% over soil farming and allows the plant to be trained to form a vertical canopy around the light source. The robotic wheels (or other mobility mechanism, such as treads) can allow the plant to be moved without disturbing the root zone or canopy. The robotic wheels can enable production in a perpetual harvest scenario where plant light cycles are artificially manipulated to enable multiple harvests per year and the plant must be moved from the vegetative growth area to the fruiting/flowering growth area.

In an embodiment, the systems disclosed herein can be used to grow any trellisable plant including, but not limited to high-vine tomatoes, cucumbers, blueberries, strawberries, grapes, peppers, fruit trees, and cannabis.

In an embodiment, the systems disclosed here can be used in both consumer and commercial agricultural operations, consumer and commercial pharmaceutical operations, underwater and deep sea living habits, vessels, ships, yachts, submarines, airplanes, drones, zero-gravity environments including spacecraft and space stations, planetary habitats (for example, Mars and Moon colonization), bioregenerative life-support systems, mining facilities, and extreme environments (Arctic, Volcanic, Desert, High Pressure, Low Pressure, Vacuum, etc).

Canopy Zone

Figure 2A:
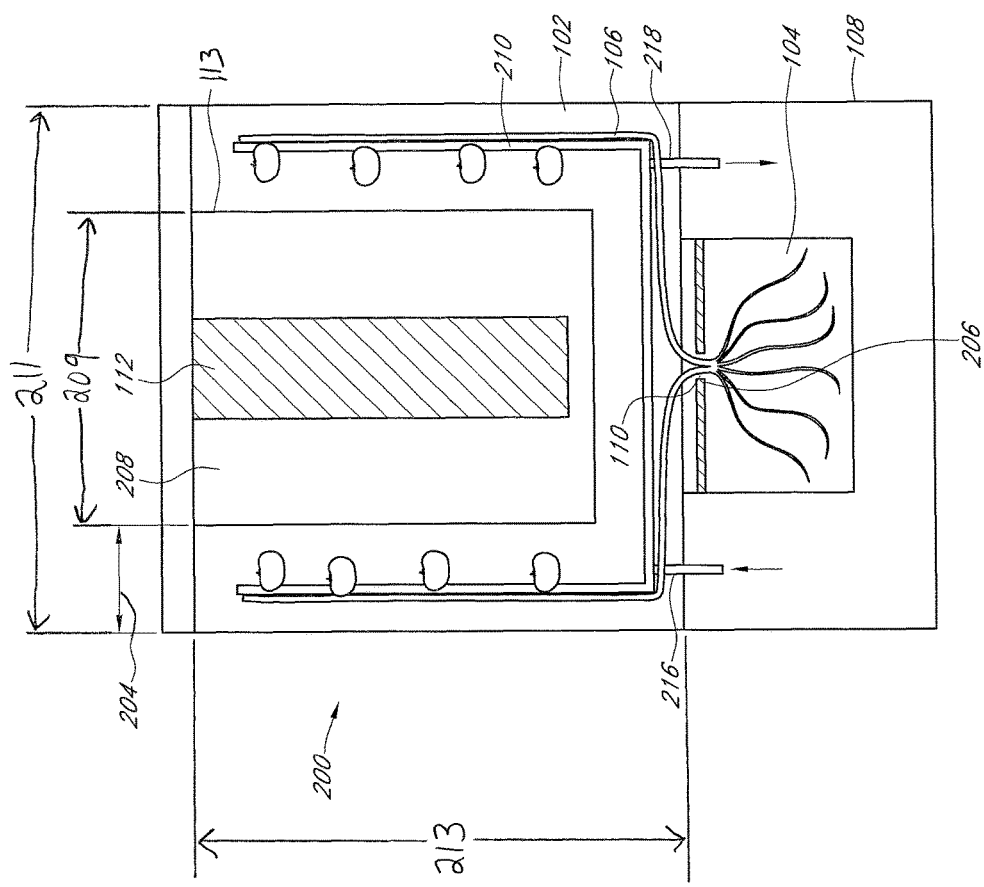
FIGS. 2A and 2B illustrate cross-sectional system diagrams of embodiments of plant growth systems.
Figure 2B:
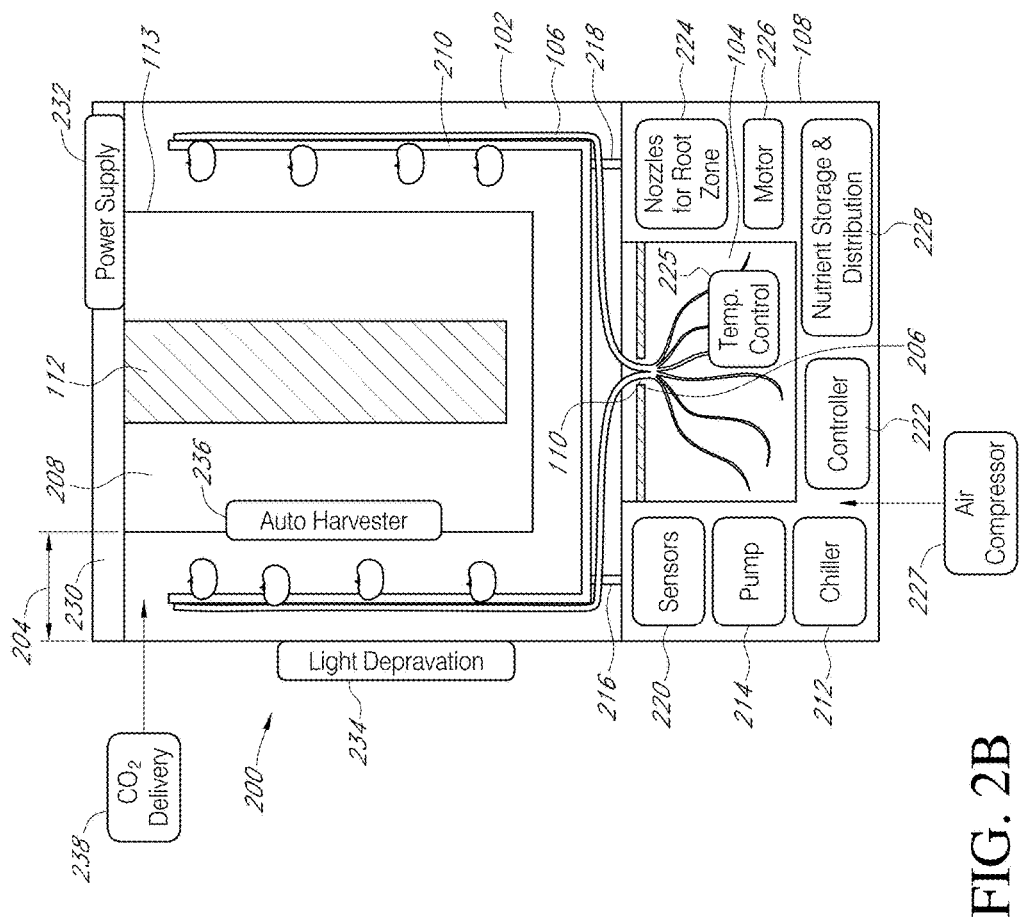

FIGS. 2A and 2B illustrate cross-sections of an embodiment of a self-contained grow pod 200 that comprises a canopy zone 102 that is isolated from or sealed off from the central area (e.g., light zone 208, where the light source 112 is located) of the grow pod 200 by a barrier 113. Although these and other figures are not necessarily drawn to scale, FIG. 2A does depict an embodiment where the light zone 208 is relatively large or wide compared to the embodiment illustrated in FIG. 1A. Accordingly, the width of the canopy zone 204 is relatively small compared to the embodiment shown in FIG. 1A. The configuration shown in FIG. 2A with a narrower canopy zone 102 may be desirable in some embodiments, such as for plants that do not need much room to grow and flourish. In that case, a smaller canopy zone may be desirable, because there is a smaller volume of space that needs to be environmentally controlled.

In some embodiments, the outer diameter 209 of the barrier 113 separating the canopy zone from the light zone is approximately 50% of the outer diameter 211 of the canopy zone 102. The ratio of the diameter 209 of the barrier 113 to the outer diameter 211 of the canopy zone 102 may be different in other embodiments, and may be designed to result in an ideal canopy zone with 204 for a particular growing set up for a particular type of plant. For example, in some embodiments, the outer diameter 209 of the barrier 113 is smaller, such as approximately, no less than, or no greater than 40%, 30%, 25%, 20%, 15%, or 10% of the outer diameter 211 of the canopy zone 102. As another example, in some embodiments, the outer diameter 209 of the barrier 113 is larger, such as approximately, no less than, or no greater than 60%, 70%, 75%, 80%, 85%, or 90% of the outer diameter 211 of the canopy zone 102. In some embodiments, the width of the canopy zone 204 is desirably approximately 16 inches. In other embodiments, the width of the canopy zone 204 may be, for example, approximately, no greater than, or no less than one, two, three, four, five, six, seven, eight, nine, 10, 11, 12, 13, 14, 15, 16, 17, 18, 19, 20, 21, 22, 23, or 24 inches, or three, four, five, six, seven, eight, nine, 10, 11, 12, 13, 14, or 15 feet. It is also contemplated that a grow pod as disclosed herein could potentially be used with relatively large trees that could have, for example, a canopy as wide as 100 feet or more. Accordingly, in some embodiments, the width of the canopy zone, defined either as the width 204 or as the overall outer envelope size, width, or diameter 211, may be approximately, no greater than, or no less than 20, 30, 40, 50, 60, 70, 80, 90, or 100 feet. Further, the height of the canopy zone 213 may vary in different embodiments. For example, the height of the canopy zone 213 may be within a range of, for example, 1-100 feet, depending on the type of plant being grown and/or the available space. For example, in some embodiments, the height of the canopy zone 213 may be approximately, no greater than, or no less than one, two, three, four, five, six, seven, eight, nine, 10, 15, 20, 25, 30, 40, 50, 60, 70, 80, 90, or 100 feet. Further, in various embodiments, a ratio of height of the canopy zone 213 to overall width 211 may vary, depending on the plant being grown, the available space, and/or the desired shape of the canopy zone. For example, in some embodiments, the outer diameter or width 211 may be approximately the same as the height 213. In other embodiments, the outer diameter or width 211 is desirably less than the height 213. For example, the outer diameter or width 211 may be, for example, approximately, no more than, or no less than 90, 80, 70, 60, 50, 40, 30, 20, 10, or less percent of the height 213. In other embodiments, the height 213 is desirably less than the outer diameter or width 211. For example, the height 213 may be, for example, approximately, no more than, or no less than 90, 80, 70, 60, 50, 40, 30, 20, 10, or less percent of the outer diameter or width 211.

In some embodiments, a canopy zone 102 that is sealed off from the light zone 208, the root zone 104, and/or the external environment may be referred to as an airlock. It can be desirable to place the plant canopy or plant stalks 106 in its own isolated cavity to, among other things, reduce energy usage by having a smaller volume of space to environmentally control. For example, the canopy zone 102 (and any other canopy zone disclosed herein) may desirably be temperature controlled, humidity controlled, CO2 controlled, air pressure controlled, and/or the like. In the embodiment illustrated in FIG. 2A, the airlock or canopy zone 102 where the plant canopy is positioned would desirably be one of the only areas that is temperature and/or humidity controlled (with another being the root zone 104). The area on the other side of the barrier 113 separating the canopy zone 102 from the light zone 208 and light source 112 does not necessarily need to be temperature or humidity controlled. Accordingly, less energy may be used than with, for example, an embodiment illustrated that does not include such a barrier 113.

The volume or size of the airlock or sealed canopy zone 102 may be configured to be an ideal size for a particular plant being grown. For example, a width 204 of the canopy zone 102, as shown in FIG. 2A, may be configured to be a size that is wide enough to enable efficient plant growth and flowering, but not too wide that an additional volume of air needs to be temperature controlled without adding adequate benefit with respect to plant growth. In some embodiments, the barrier 113 is movable, expandable, contractible, modular, replaceable, and/or the like to enable adjustment of the canopy zone width 204. In some embodiments, another barrier can be positioned above the plant to reduce a height of the canopy zone. In some embodiments, such a barrier is moveable to gradually increase the height of the canopy zone as the plant grows.

In the embodiment illustrated in FIG. 2A, a single opening 206 between the root zone 104 and canopy zone 102 enables the plant stalks or canopy 106 to extend into the canopy zone 102. In this embodiment, which shows an example of a tomato plant, the stalks can relatively easily navigate the shape of the canopy zone (e.g., a u-shaped cross-section, as shown in FIG. 2A). In other words, the plant stalks begin at the central hole or opening 206 between the root zone 104 and canopy zone 102, travel radially outward toward an outer edge of the grow pod, and then move upward toward a top of the grow pod, attaching to trellis 210. In some embodiments, depending on the type of plant being grown, the plant stalk or trunk may not be as flexible or as able to conform to a shape of the grow pod as a tomato plant. Accordingly, in some embodiments, it may be desirable to have one or more openings 206 between the root zone 104 and canopy zone 102 that are not centrally located, but are rather located further outward in a radial direction, closer to an outer edge of the grow pod. In some embodiments, the system may comprise more than one root zone 104, each positioned at a different location (see, for example, FIG. 1B). For example, in some embodiments, it may be advantageous to grow two or more plants together in the same grow pod (e.g., where two or more different plants have a symbiotic relationship with one another, where a first plant has a high canopy and a second plant has a low canopy, or where the size of the plant canopy is such that the grow pod can accommodate two or more of the same or different types of plants in the canopy zone 102). Advantageously, growing two or more plants together can help maximize the use of the canopy zone 102. In such embodiments, having more than one root zone 104 (and/or multiple openings into a single root zone) can be helpful so that the nutrient needs of the two or more plants can be individually and/or collectively accommodated.

Temperature-Controlled Trellis

Another feature illustrated in FIGS. 2A and 2B is a temperature controlled trellis 210 that enables control of (or helps to control) the temperature within the canopy zone 102. Additional details of such a temperature-controlled trellis may be seen in FIG. 4A, and additional embodiments of temperature-controlled trellises may be seen in FIGS. 4B-4F, as described below. For example, the trellis 210 may comprise a generally cylindrical structure that enables the plant being grown to attach thereto and be positioned or distributed about the central light source 112. In some embodiments, the trellis 210 is designed, configured, and/or positioned such that the stalks of the plant canopy will grow outside of the trellis, such as on or adjacent a radially outer side of the trellis, and the flowers or fruit of the plant will extend inward through the trellis toward the light source 112. Such a configuration may be desirable both for plant growth efficiency and, for example, to enable use of the automatic harvesting systems described below with reference to FIGS. 10A through 11B.

Cooling fluid may be pumped through at least a portion of the trellis 210 to enable the trellis to cool the canopy zone. For example, with reference to FIG. 2B, various functional modules such as a chiller or heat exchanger 212, a pump 214, and/or the like may be positioned in the lower cavity 108 of the grow pod 200 (or positioned elsewhere, such as within the canopy zone 102, light zone 208, and/or cavity 230 positioned above the canopy zone) and be configured to reduce the temperature of a cooling fluid to a desirable temperature (although it should be appreciated that one or more chillers, heat exchangers, pumps, and the like can be positioned in the lower cavity 108 or elsewhere to reduce the temperature of the one or more cooling fluids). The system may then be configured to pump that fluid into and out of the trellis 210 in the canopy zone 102 via one or more trellis inlets 216 and one or more trellis outlets 218, where the cooling fluid can circulate within the trellis 210 and cause heat to be removed from the canopy zone 102 through conduction, convection, and/or radiation. The heat being removed from the canopy zone 102 causes the fluid to heat up, and such heated fluid can then be transferred back out of the trellis 210 and back to the chiller 212 for recirculation. In some embodiments, the system also comprises one or more fans to circulate air within the canopy zone 102. In some embodiments, the system comprises a heat exchanger (in addition to or in lei of the temperature-controlled trellis 210) that cools or heats the circulating air. Further, although various embodiments disclosed herein are described with reference to cooling the canopy zone, similar concepts may be used to heat the canopy zone when needed. For example, when a grow pod is being used in a cold environment, it may be desirable to heat the canopy zone instead of cool the canopy zone. In such a case, similar concepts may be used, except the fluid passing through the trellis may be heated instead of cooled. In some embodiments, to save energy, heat from the light source 112 is used to heat the fluid passing through the trellis.

Various types of fluid may be used with a temperature controlled trellis 210. For example, water may be used, optionally with an anti-corrosion substance added to it. In some embodiments, refrigerant may be used (e.g., R-134a, R-744, R717, and/or the like) and/or glycol.

In some embodiments, the temperature controlled trellis 210 may further comprise protrusions, fins, and/or the like that act to increase the surface area of the trellis within the canopy zone 102, increasing an efficiency of heat transfer. In some embodiments, as further described below with reference to FIG. 4B, a temperature controlled trellis may be a generally composite structure comprising tubing for passing therethrough of the cooling fluid and separate support structures or rods that help the tubing to retain its shape.

As mentioned above, although the embodiments described herein have been generally described as utilizing a temperature controlled trellis 210 to cool a canopy zone 102, in some embodiments, it may be desirable to heat the canopy zone 102 above its ambient temperature. Accordingly, a similar or the same temperature controlled trellis 210 may be used to heat or to help heat the canopy zone 102, such as by passing a heated fluid, such as water or other fluids through the trellis 210. The light source 112 may also be used in some embodiments to introduce heat into the canopy and/or root zones.

The temperature controlled trellises disclosed herein (e.g., trellis 210) may be used alone as the sole method of temperature control of the canopy zone 102, or may be used in addition to other temperature control features, such as forced air heating or cooling, introduction of heat by the central light source 112 and/or one or more extra light sources, such as the sun, and/or the like.

Grow Pod Subsystems

As described above, FIG. 2B illustrates a block diagram of examples of various functional modules or subsystems that may be included in a grow pod as disclosed herein (e.g., grow pod 200). In this embodiment, a majority of the functional modules are positioned in the cavity 108 below the canopy zone 102. However, in various other embodiments, one or more of these functional modules, or other additional functional modules, may be positioned elsewhere in the grow pod. For example, some components may be positioned within a cavity of the central light source (e.g., light zone cavity 208), at a top of the grow pod (e.g., cavity 230), at a side of the grow pod, within the canopy and/or root zones 102, 104, and/or the like. Various sections of the present disclosure will go into additional detail on these subsystems and also additional subsystems not shown in FIG. 2B but that could be used with any of the grow pod embodiments disclosed herein.

The functional modules illustrated in FIG. 2B comprise sensors 220, a pump 214, a chiller 212, a controller 222, one or more nozzles 224, a motor 226, nutrient storage and distribution components 228, a root zone temperature control system 225, an air compressor 227, a power supply 232, a light deprivation system 234, an auto-harvesting system 236, and a CO2 delivery system 238. The sensors 220 may be used to, for example, detect the various environmental parameters present in the canopy zone 102 and/or root zone 104, and/or outside the grow pod 200 (e.g., sun intensity). Although the sensors block 220 is illustrated in the cavity 108, the sensors block 220 is merely indicating that the grow pod 200 comprises a plurality of sensors. Those sensors may be distributed throughout the grow pod 200 in various locations and do not need to be grouped together in a single module or subsystem. For example, sensors for sensing things occurring in the canopy zone may be positioned in the canopy zone and even at different locations in the canopy zone such as at the top at the bottom in the middle, and/or the like. Sensors sensing things occurring in the root zone may be positioned anywhere in or about the root zone, such as within the root zone, embedded in a wall of the root zone, and or the like. Further, grow pods as disclosed herein may comprise one or more methods of running cables, supply lines, and the like from one area of the pod to another. For example, a conduit or other tube or shaft may enable passage of electrical cables, water supply lines, carbon dioxide supply lines, nutrient supply lines, compressed air supply lines, and/or the like between the base cavity 108 and upper cavity 230, from the upper cavity 230 or base cavity 108 into the canopy zone 102, and/or the like. In some embodiments, such as the embodiment illustrated in FIG. 1B where the light tube 112 goes completely from the ceiling of the canopy zone to the base of the canopy zone, one or more conduits, tubes, shafts, electrical cables, supply lines, and/or the like may pass through an internal area of the light tube 112 to enable such items to pass between the upper cavity 230 and lower cavity 108 without being visible from the outside of the grow pod or from the canopy zone.

The pump 214 may be used to, for example, pump fluid into and/or out of the temperature controlled trellis 210, pump water and/or air through the one or more root zone nozzles 224, and/or distribute nutrients from the nutrient distribution system 228, and/or the like. The chiller 212 may be used to, for example, control a temperature of the fluid passed through the temperature controlled trellis 210. The one or more nozzles 224 may be used to, for example, introduce water, nutrients, and/or the like into the root zone 104 and/or canopy zone 102. In some embodiments, the one or more nozzles 224 are air-assisted (for example, using compressed air from the air compressor 227 or another compressed air source), which may reduce clogging of the nozzles. This may be desirable, because, to increase efficiency of nutrient and moisture absorption by the roots, the ideal pore size of the nozzles may be small enough that it would tend to easily clog using standard non-air-assisted nozzles. The motor 226 may be used to, for example, actuate an expandable seal 110 between the root and canopy zones, move or rotate a harvesting blade, open or close an access port, open or close shades used for light deprivation, move wheels or tracks on the bottom of the unit to enable the unit to move around, and/or the like. An embodiment of a nutrient storage and distribution system 228 will be described in greater detail below. The controller 222 can be used to, for example, control the various functions of the grow pod 200. The temperature control system 225 may be used to, for example, control the temperature within the root zone 104.

The power supply 232 may be used to, for example, supply electrical power to the various modules and subsystems of the grow pod 200. In some embodiments, it can be desirable to position the power supply 232 in the upper cavity 230, because the power supply 232 may generate heat. In a case where it is desirable to keep that heat from being introduced into the canopy zone, it may be desirable to position the power supply 232 at the top cavity 230, where the power supply's generated heat can be easily vented upward out of the cavity 230. Further, in an industrial or commercial setting, such as in a warehouse, electrical power is often supplied by electrical power lines which drop down from the ceiling. Accordingly, it can be desirable in such a setting to have the power supply 232 located at the top of the grow pod 200, such as for easy connection to a power line descending from the ceiling. Likewise, in a grow pod intended more for a consumer environment, it may be desirable to position the power supply lower on the unit, such as in or about the lower cavity 108, since power will likely be supplied by a residential outlet, which is often near the floor. In some embodiments, the power supply 232 may comprise an external power supply, such as a "wall wart" or laptop computer type AC to DC power supply "brick" that keeps of the main heat producing components away from the grow pod.

The light deprivation system 234 may be used to, for example, selectively deprive the canopy zone 102 of light from an external light source. Example embodiments of such light deprivation systems will be described below with reference to FIGS. 7A through 7D. In some embodiments, the exterior wall of the grow pod is generally opaque, and thus a light deprivation system is not necessarily used. In an embodiment where at least one transparent window into the canopy zone 102 is present, however, it may be desirable to have at least some form of a light deprivation system. In some embodiments, the light deprivation system 234 may be relatively simple, such as a curtain or shade that can be manually put in place by an operator. It can be desirable, however, to utilize an automated light deprivation system 234 that can automatically and dynamically, without requiring action by an operator, deprive the canopy zone 102 of light from an external light source when needed.

The auto harvesting system 236 may be used to, for example, harvest the crops when they are ready to be harvested. Additional details of an example auto harvesting equipment will be given below with reference to FIGS. 10A through 11B. The carbon dioxide delivery system 238 may be, for example, positioned at least partially within the canopy zone 102 and configured to introduce CO2 into the canopy zone 102 as needed by the plant 106. In some embodiments, the grow pod 200 can be configured to continually monitor the makeup of the air within the canopy zone 102 and to automatically and dynamically introduce additional CO2 using the CO2 delivery system 238 as needed to enable efficient and/or accelerated growth of the plant 106. In some embodiments, it can be desirable to position one or more output members, such as nozzles, of the CO2 delivery system 238 near a top of the canopy zone 102, because carbon dioxide is generally heavier than other molecules in the air, and thus the CO2 will fall through the canopy zone 102 after being expelled from a nozzle or similar near the top of the canopy zone 102. FIG. 2B illustrates the CO2 delivery system 238 and air compressor 227 as outside of the main body of the grow pod. However, the arrows attached to those components are meant to indicate that, for example, the CO2 delivery system 238 may be positioned within the canopy chamber 102, and the air compressor 227 may be positioned within the lower cavity 108. Accordingly, an alternate version of FIG. 2B which illustrates the CO2 delivery box 238 positioned within the canopy chamber 102 and which illustrates the air compressor box 227 within the lower cavity 108 is considered to be part of the present disclosure. As with other components, these components or at least portions of their mechanisms may be positioned elsewhere.

Root Zone Environmental Control

Figure 2C:
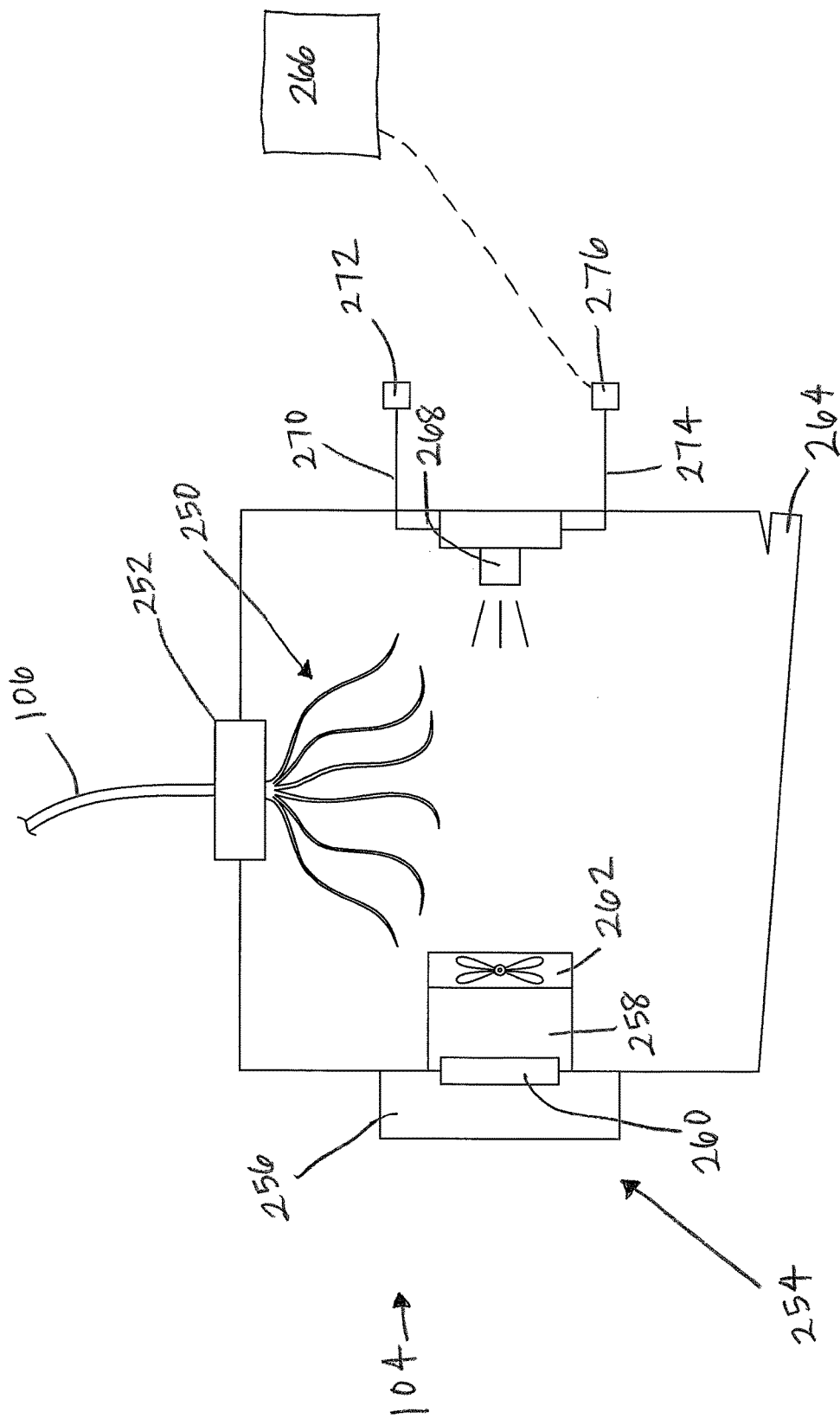
FIGS. 2C through 2E illustrate example embodiments of root chambers that can be used with plant growth systems disclosed herein.
Figure 2D:
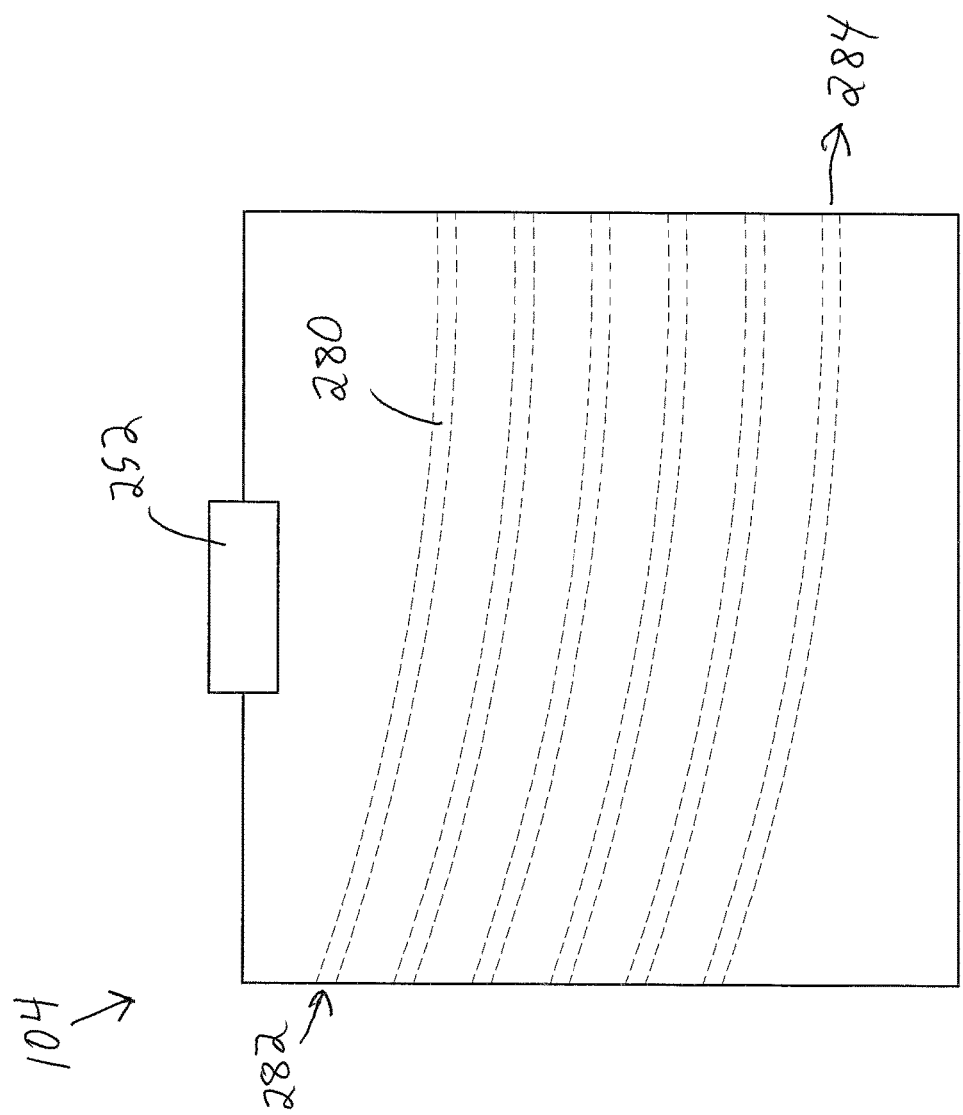
Figure 2E:
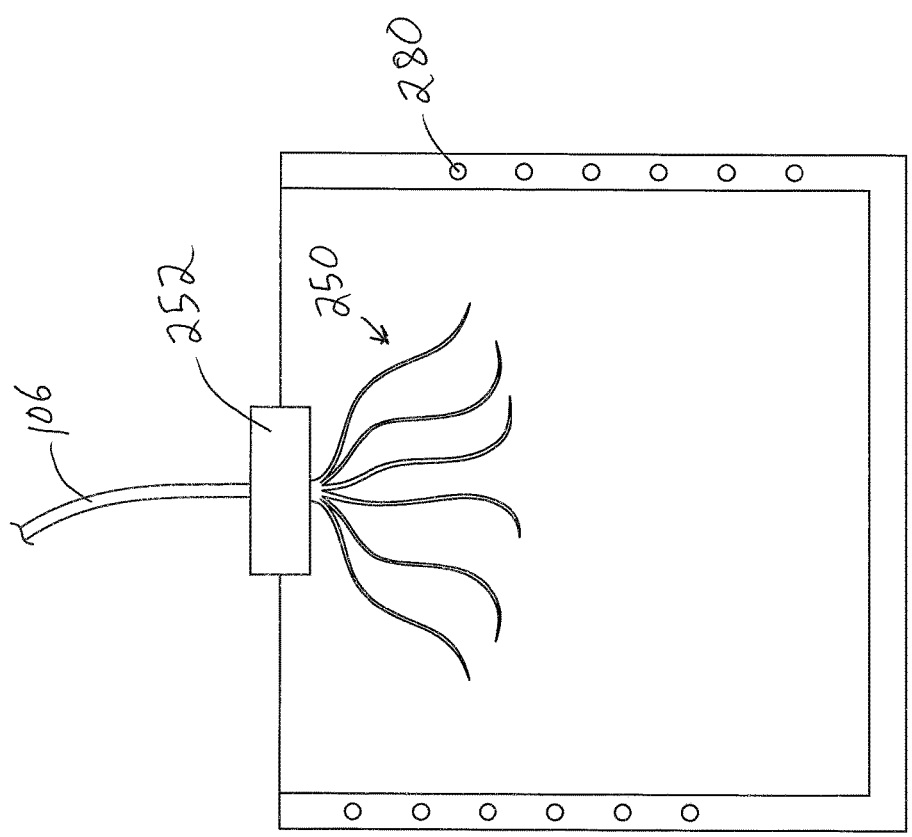

FIGS. 2C through 2E illustrate additional components of an example embodiment of a root zone or aeroponic chamber 104, such as the root zone 104 shown in FIGS. 2A and 2B. FIG. 2C illustrates a schematic diagram of the root chamber 104 with a plant 106 having roots 250 protruding into it. The plant 106 and its root system 250 are supported by a grow medium or plant support mechanism 252. Additional details of such a plant support mechanism will be given below with respect to, for example, FIGS. 15A through 15B. FIG. 2C illustrates two types of environmental controls of the root chamber 104. The first is a thermal control system 254, which is embedded in the left side of the wall of the root chamber 104. In this embodiment, the thermal control system 254 is a thermoelectric control system. Accordingly, the system comprises an outer heatsink 256, an inner heatsink 258, and a thermoelectric device, such as a Peltier mechanism 260 sandwiched between the two heatsinks 256, 258. By using a thermoelectric device 260, the root chamber 104 can be selectively heated or cooled, depending on the direction of the current passing through the thermoelectric device 260. In this embodiment, the thermal control system 254 further comprises a circulation fan 262 configured to help circulate air within the root chamber 104, thus maintaining a more even temperature throughout the root chamber 104.

Although not shown in FIG. 2C, the thermal control system 254 may also comprise a temperature sensor, potentially more than one temperature sensor positioned at different places of the root chamber, to monitor the temperature of the root chamber 104 and provide feedback to the thermal control system 254. Further, the thermal control system 254 may be positioned in various areas of the root chamber 104, such as in the top wall, at another place in the sidewall, or in the floor or base of the root chamber 104. However, it can be desirable to place the thermal control system 254 in the sidewall, because condensation may form on the floor, and such moisture could cause damage to the thermal control system 254. As can be seen in FIG. 2C, the root chamber 104 further comprises a drain 264 near or at a low point of the sloped floor, such as to enable draining of any moisture that collects in the bottom of the root chamber 104.

The other main subsystem illustrated in FIG. 2C is a nutrient and water introduction system 266. The nutrient and water introduction system 266 is configured to efficiently inject the appropriate nutrients and/or water into the root chamber 104 to enable feeding of the root system 250 for efficient and/or accelerated growth of the plant. The nutrient and water introduction system 266 comprises an air assisted nozzle 268 embedded in or connected to the side wall of the root chamber 104. The air assisted nozzle 268 comprises or connects to an air line 270 which is connected to a valve 272, which is connected to a pressurized air source. The air assisted nozzle 268 is also connected via a nutrient line 274 and valve 276 to a nutrient system, such as the nutrient distribution systems illustrated in FIGS. 8A through 8D, which will be described in greater detail below. Although an air assisted nozzle is not the only type of nozzle that could be used to introduce nutrients and/or moisture to the root zone, in some embodiments it is desirable to use an air assisted nozzle, such as to help avoid clogging of the nozzle.

FIGS. 2D and 2E illustrate an alternative thermal control system to control the temperature within the root chamber 104. In this embodiment, the root chamber 104 comprises tubes 280 embedded in the wall of the root chamber 104 (or alternatively placed adjacent an interior or exterior surface of the wall). In this embodiment, cooling or heating liquid is introduced at one end 282 of the tubing, and the heating or cooling liquid exits at another end 284 of the tubing. By passing a heated or cooled liquid through the tubing 280, the interior wall of the root chamber 104 can be cause to be warmed or cooled, thus also affecting the temperature of the environment within the cavity of the root chamber 104. The liquid that passes through the tubing 280 may be heated or cooled by a chiller, heat exchanger, and/or the like, similarly to as used with a heated or cooled trellis. In some embodiments, the same chiller and/or heat exchanger may be used to heat and/or cool fluid for passing through a temperature controlled trellis and a temperature controlled root chamber tube.

Atmospheric Separation (e.g., Root Barrier System)

As mentioned above, it can be desirable to isolate the canopy zone 102 from the root zone 104. This can be desirable for several reasons, including that different environmental parameters may be desirable in the root and canopy zones 104, 102. One way to achieve such separation is to, for example, include a net or other porous fabric or container at or near the junction (e.g., at opening 206, with reference to FIGS. 2A and 2B) between the canopy and root zones 102, 104. The net or other container can be configured to enable roots to grow therethrough but not the plant stalks. The net or other container can then be filled or at least partially filled with a media, such as crushed glass, glass beads, ceramic, and/or the like which will act as at least a partial environmental barrier between the canopy and root zones 102, 104.

In some embodiments, a mechanically adjustable seal or opening or collar is provided between the canopy zone 102 and root zone 104. It can be desirable to have the size of the opening be adjustable and/or expandable, because as a plant grows it will increase in size, and the opening will often need to increase in size as the plant grows. FIGS. 3A-3C depict two examples of mechanically adjustable or expandable openings 300, 301 for use between the canopy zone 102 and root zone 104. In some embodiments, such an adjustable opening is referred to as an aperture. The embodiment illustrated in FIGS. 3A and 3C comprises an iris style mechanical aperture 300 that enables adjustment of a central opening size. The aperture 300 comprises a plurality of leaves or arms 304 that form an opening 306. When the arms 304 are rotated, the opening 306 changes in diameter. This is similar to the function of a camera aperture. In some embodiments, the arms 304 are spring-loaded, such that the opening 306 is biased to a smaller size, and such that as the plant stalk 310 grows, the plant stalk 310 will force the opening 306 to increase in size.

The embodiment illustrated in FIG. 3B comprises a spiral or clock spring style adjustable opening 301. This embodiment comprises a clockspring 312 which forms a central opening 306 that is expandable. In some embodiments, the mechanically adjustable openings can be passive, meaning they can be biased against the plant stalk under, for example, a light spring pressure, but be able to be forced open to a larger size by the plant as the plant grows. In other embodiments, the mechanical aperture may be actively controlled, such as by a motor, actuator, and/or the like.

The embodiments illustrated in FIGS. 3A-3C also comprise a compressible material 302 at the inner opening 306 of the mechanical aperture. The compressible material 302 forms a central opening 316 that can conform to the shape of the plant stalk 310. The compressible material may be, for example, foam, rubber, and/or the like. It may be desirable to comprise an at least partially compressible material, such as to enable the opening 316 to conform to or substantially conform to a shape of the plant passing therethrough (which may not be perfectly round) without constricting, injuring, damaging, and/or otherwise deleteriously affecting the plant. Although in these embodiments the compressible material 302 is illustrated as a unitary piece of material shaped in an annular or doughnut shape, various other embodiments may comprise one or more separate pieces of compressible material, a compressible material with slits or cuts in it that enable it to at least partially expand along with the mechanical aperture, and/or the like. As another example, the compressible material 302 may be removable and/or replaceable, so that when the opening 316 needs to increase beyond a certain point, the original compressible material 302 can be removed and replaced with a new piece of compressible material 302 that is configured to provide a larger central opening 316 and/or mate with a larger mechanical opening 306. In some embodiments, instead of the compressible material being a continuous circle of material, the compressible material 302 may be a strip of material that can be wrapped around the plant stalk 310. It should be noted that various other methods may be used to form an adjustable opening, and the embodiments illustrated in FIGS. 3A-3C are merely two examples.

Modular and/or Thermally Controlled Trellis

As mentioned above, some embodiments of plant growth systems as disclosed herein comprise a trellis system comprising temperature control functions. For example, FIG. 4A illustrates one embodiment of a temperature controlled trellis 210 comprising an inlet tube 216 and outlet tube 218, as described above. Cooling or heating liquid can be introduced into tube 216, pass through one or more tubes of the main body of the trellis 210, and then exit through tube 218 for re-cooling or heating by, for example, a heat exchanger.

In some embodiments, however, instead of having a unitary cylindrical temperature controlled trellis, as illustrated in FIG. 4A, it can be more desirable to have a more distributed or modular system. For example, it may be desirable to be able to interchange the trellis used in a particular grow pod to match a particular plant being grown. A complete cylinder as shown in FIG. 4A may be more difficult to remove and/or replace than if a modular system is used, such as a system that positions two or more trellis modules about the central light source of the grow pod.

FIG. 4B illustrates an example of such a temperature controlled trellis 410. In the embodiment illustrated in FIG. 4B, the temperature controlled trellis 410 comprises a hollow tubing 412 that is shaped into an arrangement conducive to spreading the tubing 412 out within the canopy zone. In this case, the tubing 412 is arranged in a generally S-shaped or zigzag shaped arrangement. Further, in this embodiment, the trellis 410 comprises a plurality of plant supports 414 running vertically and coupled to the tubing 412. The combination of the vertical plant supports 414 and primarily horizontal tubing 412 creates a grid configuration which can be relatively stable and can also be a good configuration for attachment thereto of the plant. The embodiment illustrated in FIG. 4B further comprises sensors 416 located at the fluid inlets and outlets 216, 218. The sensors 416 may be, for example, temperature sensors, flow rate sensors, and/or the like.

Figures 4C, 4D:
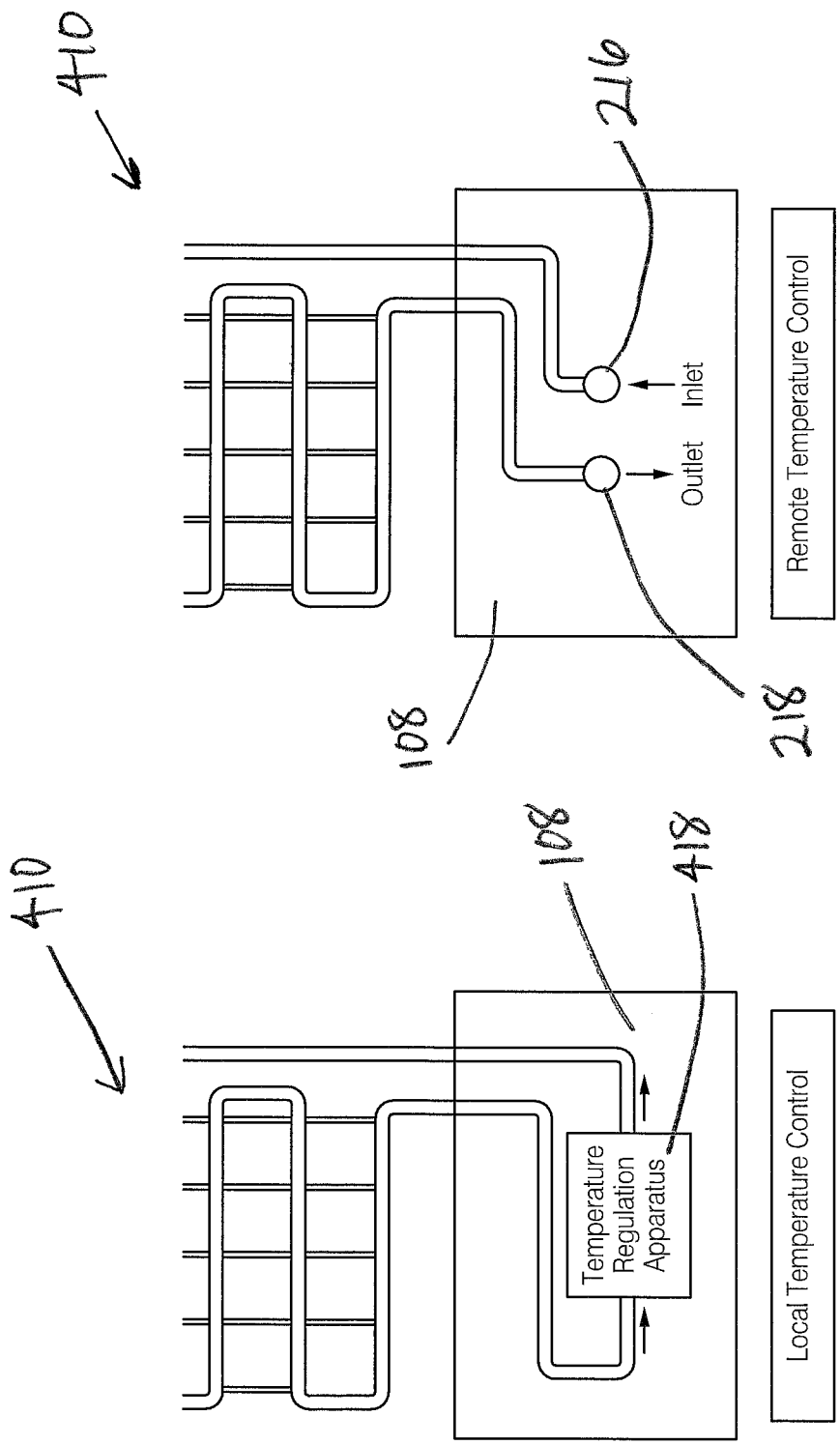
Figures 4E, 4F:
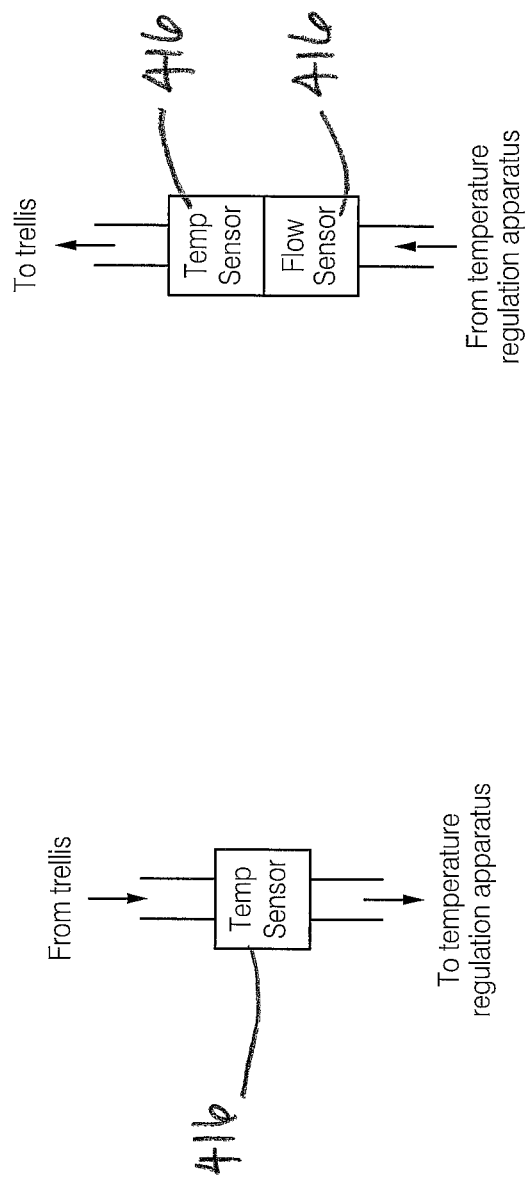

FIGS. 4E and 4F illustrate one example configuration of how the sensors 416 may be configured. In this case, a temperature sensor 416 is located at each of the fluid outlets and inlets, such as to be able to measure the temperature of the fluid going into the trellis and coming out of the trellis, and a flow sensor is also positioned at the inlet to the trellis and/or at the exit from the temperature regulation apparatus. This is merely one example, and other configurations may be used, such as positioning the flow sensor at the inlet to the temperature regulation apparatus or elsewhere.

The inlets and outlets 216, 218 may be fluidly coupled to a trellis radiator 418, which may be, for example, a chiller, heat exchanger, and/or the like. With reference to FIGS. 4C and 4D, in some embodiments, the temperature regulation apparatus 418, such as a chiller, heat exchanger, radiator, and/or the like, may in some embodiments be located within the base 108 of the grow pod, as shown in FIG. 4C. In other embodiments, the grow pod may comprise fluid inlets and outlets 216, 218 configured to connect to a remote temperature regulation apparatus, as shown in FIG. 4D. It may be desirable, for example in a consumer environment, to have local temperature control within the base of the pod 108. It may, however, be desirable in a more commercial or industrial setting that is using a plurality of growing units, to use remote temperature control, as illustrated in FIG. 4D. This is because it may be more efficient to have a centralized heat exchanger, chiller, radiator, and/or the like, which supports the heating and cooling functions of more than one grow pod.

In some embodiments, a temperature controlled trellis is heated or cooled via liquid that passes through hollow, thermally conductive tubing. The tubing may, for example, comprise copper, aluminum, titanium, plastic, glass, and/or the like. The tubing may be of various diameters and be filled with a thermally conductive liquid, such as, for example, water, glycol (e.g., propylene glycol or other glycol), and/or the like. In some embodiments, the trellis is modular so that it can be configured or reconfigured (or replaced with a trellis module having a different configuration) based on the number of plants inside the chamber, the size of the plants with inside the chamber, and/or the like. In some embodiments, the trellis, such as the trellis 410 illustrated in FIG. 4B, can be configured to be installed or removed easily. For example, the trellis 410 may comprise protrusions or rods at the bottom and top that fit into mating holes or cavities in the body of the grow pod, such as the grow pod 100 illustrated in FIG. 1A.

In some embodiments, the tubing 412 comprises a wall thickness that is optimized for maximizing heat transfer while also maintaining sufficient structural rigidity of the tubing. This is because, in some embodiments, the hollow tubing 412 through which heating or cooling fluid passes may form part of the structure of the trellis 410 (as opposed to being a non-structural member that merely attaches to the plant supports 414). Accordingly, the hollow tubing 412 may desirably be a structural member of the trellis 410. In that case, it may be desirable to have a sufficient wall thickness of the hollow tubing to provide sufficient structural rigidity. This wall thickness may vary depending on, for example, the type of material used for the tubing, the size of the trellis, the amount and/or structural rigidity of ancillary supports, such as plant supports 414, the anticipated weight of the plants being grown, and/or the like. In some embodiments, thinner walled tubing may be used in situations where a relatively light plant is being grown and thicker walled tubing may be used in situations where a relatively heavy plant is being grown. For example, a trellis module having relatively thin-walled tubing may be inserted into the grow pod for the small plants, and that modular trellis may be removed and replaced with a second modular trellis using tubing having a thicker wall thickness when the heavier plant is intended to be grown.

Further, the pattern of the hollow tubing 412 and/or plant supports 414 can be different for different plants and/or to support differing amounts of weight. For example, the pattern illustrated in FIG. 4B is a grid pattern having square or rectangular grids formed by the hollow tubing 412 and plant supports 414. It may be desirable in some embodiments, however, to use different patterns, such as triangular grids or the like.

In some embodiments, the wall thickness of the hollow tubing 412 and/or the thickness of the plant supports 414 may be thicker near the bottom of the trellis module 410 and thinner toward the top of the trellis module 410, for example, for both support reasons and heat transfer reasons. For example, the lower portion of a trellis module 410 may need to support more weight than the upper portion of a trellis module, and thus may desirably have thicker walled tubing 412 and/or thicker plant supports 414. Further, thicker walls in the hollow tubing toward the bottom of the modular trellis may reduce the efficiency of heat transfer in that portion of the trellis with respect to the upper portion of the trellis, which may be desirable in some embodiments. This is because, for example, the liquid closest to the source (e.g., the heat exchanger or the like, which may be in the base of the grow pod) may have a higher temperature differential (with respect to the canopy zone temperature) than the liquid further from the source, and it may be desirable to save more of the heat or cold for the top portion of the trellis. Further, thinner walls in the tubing near the top of the trellis may be desirable because they can potentially transfer heat more efficiently and when the heating or cooling fluid is further from the chiller, heat exchanger, and/or the like, the heating or cooling fluid may have less of a temperature differential (with respect to the canopy zone temperature). As an example, the wall thickness of tubing used with temperature controlled trellises as disclosed herein, such as hollow tubing 412, may be approximately $1/1000$ of an inch to one quarter of an inch thick. The thickness desirable in any particular embodiment may depend on various factors, such as desired heat transfer rate, structural integrity required, weight, cost, and/or the like. In some embodiments, it may be desirable to use thicker walled tubing for a trellis that is relatively tall, and thinner walled tubing for a trellis that is relatively short. One reason for this is that, for a trellis that is relatively tall, the lower portion of the trellis may see more stress (e.g., from the weight of the trellis itself, the weight of the attached plant, and/or any bending moments introduced by the upper portions of the trellis) than if the trellis were shorter.

Further, although various embodiments disclosed herein utilize a trellis that incorporates hollow tubing for passage therethrough of heating or cooling liquid, various other embodiments of grow pods may heat or cool the canopy zone differently. For example, a trellis may comprise an electric heating coil and/or thermoelectric features. As another example, a trellis may be used primarily for supporting the plant and not have heating or cooling functions. In that case, if heating or cooling functions are still desired, hot or cold air may be, for example, pumped into the canopy chamber using a forced air heating or cooling system. As another example, the canopy chamber may comprise heated or cooled walls, similar to the heated or cooled walls of the root chambers illustrated in FIGS. 2C through 2E. In some embodiments, the tubing used for a temperature controlled trellis is desirably transparent or includes at least some transparent portions, such as to enable an operator to easily see that fluid flow through the tubing is working and the tubing is not clogged.

Although various embodiments of heated and cooled trellises as disclosed herein include a single liquid inlet port 216 and single liquid output port 218, various embodiments may comprise more than one fluid inlet or outlet. For example, it may be desirable to have multiple inlet and/or outlet ports for redundancy, such as in case one port gets clogged. Further, it may be desirable to have multiple fluid circuits in a single trellis, with one pair of fluid inlets and outlets connected to each circuit. Accordingly, if one fluid flow circuit is clogged, springs a leak, and/or the like, the other fluid flow circuit can still be used, and potentially be used with hotter or cooler fluid than before and/or with a faster flow rate, to compensate for the cooling circuit that is out of commission.

In some embodiments, various modular trellises may comprise different grid sizes. For example, the trellis 410 shown in FIG. 4B comprises a plurality of square or rectangular grids formed by the hollow tubing 412 and plant supports 414. In various embodiments, the grid size can vary based on the crop being grown. For example, the grid size may desirable be 1×1, 2×2, 3×3, 4×4, 5×5, 6×6 inches, and/or the like. Further, although the embodiment illustrated in FIG. 4B comprises a composite structure of hollow tubing 412 coupled to plant supports 414, some embodiments may utilize hollow tubing that cooling fluid passes therethrough for the only or the primary structural member of a trellis.

Heating or cooling liquid may be moved through the tubing 412 of the trellis 410 by a hydraulic pump, such as, for example, a magnetic pump, a centrifugal pump, a diaphragm pump, and/or the like. In some embodiments, the liquid flow path, within the tubing 412 of the trellis 410, and/or at other areas of the flow path, may comprise a variety of sensors, such as temperature sensors, flow rate sensors, blockage detection sensors, leakage sensors, pump failure sensors, and/or the like. In some embodiments, the liquid flow path is reversible, for example, depending on whether the system is in a cooling or heating mode. For example, based on thermal dynamics and the law of convection, it may be desirable in some cases to introduce fluid from the heat exchanger at the top of the trellis and cause the fluid to flow downward through the trellis, and in other situations it may be desirable to introduce the fluid from the heat exchanger at the bottom of the trellis and cause the fluid to flow upward through the trellis.

In some embodiments, in addition to or in lieu of a traditional heat exchanger, liquid for heating or cooling the trellis may be heated or cooled by passing it over or through a thermoelectric heating or cooling element, the lighting system, the power supply, the other electronics, and/or the like. Such a configuration may increase efficiency and/or reduce energy consumption of the grow pod, because excess heat generated by one component of the grow pod may be harnessed and used to, for example, heat the canopy zone and/or root zone.

Lighting

Various embodiments of plant growth systems disclosed herein comprise one or more internal light sources. The term "internal light source" is intended to mean a system or mechanism that produces light and that is positioned within an outer envelope of a grow pod. For example, an internal light source may comprise a generally cylindrical assembly having a plurality of LED and/or HID lighting units, with the internal light source being centrally positioned in the middle of the canopy chamber. In other embodiments, an internal light source may, for example, be positioned in a ceiling of the canopy chamber, the floor of the canopy chamber, exterior walls of the canopy chamber, and/or the like. Accordingly, although many of the embodiments described herein with respect to the various figures comprise a single internal light source assembly that is centrally positioned with respect to the canopy chamber, the disclosure herein is not intended to be limited to such an embodiment. Further, although many embodiments discussed herein comprise an internal light source that uses electricity to generate light via, for example, an LED or HID light source, various other types of internal light sources may be used.

One benefit to using an internal light source in a grow pod as disclosed herein is that the system can control the amount of light reaching the plant canopy, when the light reaches the plant canopy, the timing of when the light is turned on, off, dimmed, brightened, and/or the like, the wavelength of the light reaching the plant canopy, the type of light reaching the plant canopy, and/or the like. By being able to precisely control the type, quality, and amount of light reaching the plant canopy, the system can be configured to promote efficient and/or accelerated plant growth. In some embodiments, the plant growth can be significantly more efficient and/or faster than if natural light from the sun were used.

It should be noted that controlling an internal light source is not necessarily the only way to control the amount, type, and/or timing of light being introduced onto the plant canopy. For example, as will be described in more detail below, some plant growth systems disclosed herein comprise a light deprivation system that is configured to selectively control the amount, if any, of external light that is able to be introduced to the plant canopy. As used herein, the term "external light" or "external light source" is intended to mean any light source that is outside of the outer envelope of a grow pod or plant growth system as disclosed herein. For example, an external light source may be natural light, such as coming from the sun, whether that light is coming directly from the sun or is redirected, such as by bouncing off of walls within a building, and/or the like. As another example, an external light source may comprise man-made lighting that is external to a particular grow pod. For example, overhead lighting fixtures in a warehouse or other building may produce light that could be introduced into the canopy zone, assuming the canopy zone comprises at least one transparent wall or window and a light deprivation system is not being used to block transmission of light through that wall or window.

Figure 5:
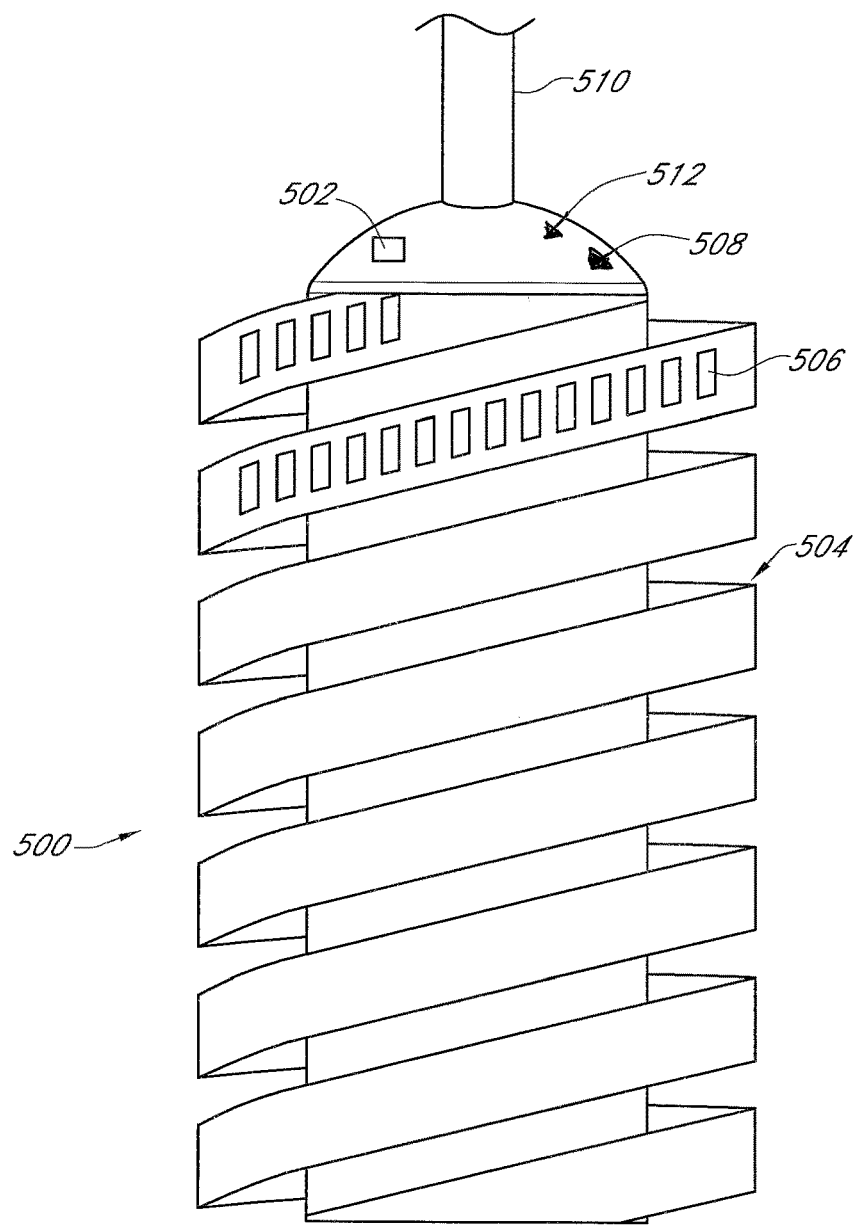
FIG. 5 illustrates an example embodiment of a light source for use with plant growth systems disclosed herein.

Various embodiments of specific internal light source configurations are described below with reference to the figures. The first embodiment, shown in FIG. 5, is an embodiment that would be desirable to use with the light source positioned directly within the canopy chamber, with no barrier separating the light source from the canopy chamber. Accordingly, the embodiment illustrated in FIG. 5 incorporates various features that may not be desirable or necessary in an internal light source that is isolated from the main canopy chamber, such as by the barrier 113 illustrated in FIG. 2A.

The embodiment of an internal light source shown in FIG. 5 comprises a rotating, actively cooled, light-emitting diode (LED) array horticulture light fixture 500 with one or more sensors 502 configured for measuring air temperature, humidity, $CO_2$ concentration, sunlight photosynthetic photon flux density (PPFD), and/or spectral output. The light fixture 500 (also referred to as a light or light source) can be configured to output approximately 1200 micromoles/meter squared/sec of photosynthetically active radiation (PAR) when measured 12" away at the center of the fixture, although other embodiments may be configured to output more or less, depending on the requirements. In other embodiments, a light fixture or internal light source can be configured to output a different amount, such as, for example, 100-2000 micromoles/meter squared/sec. The light 500 can also be configured to have mesh-networking capability and connectivity to the cloud. The light 500 can also comprise built-in carbon dioxide ($CO_2$) dispersion, similar to as described below with reference to FIGS. 9A and 9B. In high-performance growth scenarios, $CO_2$ levels can be desirably kept at approximately 1500 parts per million (ppm) (compared to the average concentration of approximately 400 ppm). In some embodiments, a system as disclosed herein can be configured to enable the CO2 level in the canopy chamber to be anywhere from, for example, the average ambient level of 400 ppm up to the maximum amount that any particular plant can use for photosynthesis. In some embodiments, the system can be configured to increase the CO2 level in the canopy chamber to as high as, for example, 2000 ppm. The light 500 can be configured to increase plant yields by 3× within the same amount of square footage while reducing electricity consumption by 40% over traditional high-intensity discharge (HID) lighting (for example, high-pressure sodium or metal-halide).

In an embodiment, the systems described herein can comprise a light fixture having a water resistant (IP66) fixture 500 as shown in FIG. 5, comprising a cylindrical helix housing 504 with a plurality of light emitting diodes (LEDs) 506 (also referred to as an LED array) mounted along the entire exterior surface (or at least a portion of the exterior surface), facing out in all directions with the exception of the top and bottom of the cylindrical helix housing (although in some embodiments LED's may be positioned at the top and/or bottom). In an embodiment, the unique cylindrical configuration of the LED lights 506 enables the system increase plant yields while reducing electricity consumption. The LED array 506 can be configured to be dimmable so that, in an outdoor/greenhouse setting, the fixture 500 is providing enough light to supplement what is available from the sun. In an embodiment, the light system can comprise wireless connectivity via WiFi and/or Bluetooth Low-Energy (BLE) and/or cellular connection (for example, via a cellular chip or the like) and/or other communication protocols, as well as mesh networking capability. Any of the foregoing communications channels can serve as a backup communication process. In an embodiment, the light system can be fully-programmable for on/off time, Daily Light Integral (DLI), and/or sunrise/sunset time. In an embodiment, the LEDs 506 can all be individually dimmable so that the system can turn control the light spectrum available to the plant based on the type of plant or the stage of growth. The specific LED wavelengths can range from Ultraviolet (UV), through the visible light spectrum (~400 nm-~700 nm) and the Infrared (IR) spectrum, although any wavelength or combination of wavelengths is appreciated. Most plants are capable of using all or almost all of the visible light spectrum in photosynthesis. Some plants also react to ultraviolet and/or infrared light in particular ways. In some embodiments, it can be desirable to introduce full-spectrum light (e.g., as produced by the sun), because that is the type of light that plants have evolved with. In some embodiments, however, it may be desirable to use a limited spectrum of light, such as due to technological limitations of artificial light sources and/or to balance the efficiency of plant growth versus energy required to generate artificial light.

In an embodiment, the systems described herein comprise a light fixture (e.g., light fixture 500) that is designed to be hung vertically or horizontally and/or contains a variable speed electric motor 508 that rotates the fixture 500 about a shaft 510 which reduces shadowing of the lower leaves thereby improving plant yields. The electric motor can be affixed with a slip-clutch for safety purposes in case something comes into contact with the light system while it is in motion. The slip-clutch can disengage the motor which causes the light to stop spinning when it encounters resistance—thereby protecting the motor 508, the fixture 500, and whatever was impeding the lights motion. The fixture can utilize a slip-ring with a decoder to provide a rotating electrical connection and to also allow a user and/or control system to detect the light's position in its rotation.

In an embodiment, the rotation of the fixture 500 combined with the helix exterior shape 504 of the fixture and the impeller-like internal shape can cause air to pass along the exterior and interior of the fixture along its long axis, providing both active cooling for all electrical components 512 in and/or on the fixture (e.g., LEDs, power supplies, LED drivers, sensors, PCBs, wireless antennas, motors, fans, etc.) as well as drawing air through the plant canopy and facilitating constant air movement throughout the grow system. Standard HID lighting reflectors require ducting and powerful inline fans to cool the HID bulbs sufficiently to allow them to be placed close enough to the plant canopy (~24" above) to provide optimum PAR—this adds complexity and cost to the facility construction and increases electricity consumption. The movement of air through the canopy can be critical to improving branch strength, inhibiting pathogen growth, and/or ensuring a fresh supply of $CO_2$ to the leaf stomata for photosynthesis.

In addition to the electrical components 512 for the light output (e.g., LEDs, drivers, power supply, etc.) and the motor 508 for rotation, the light system 500 can contain a number of sensors 502 configured to measure air temperature, humidity, $CO_2$ concentration, light, sunlight photosynthetic photon flux density (PPFD) and/or spectral output, air-flow through the fixture, and/or a multi-spectral imager for performing plant nutrient analysis in real time. In an embodiment, the light system 500 can comprise a video camera for monitoring plant growth remotely. All of the data can be transmitted to a cloud based system via the system's wireless network connection. Although the embodiment illustrated in FIG. 5 has been described as including a plurality of sensors, airflow management features, and the like, in various embodiments, any of these features may be positioned elsewhere in the grow pod, such as elsewhere in the canopy chamber, within a base of the grow pod, within a ceiling cavity of the grow pod, and/or the like. For example, with reference to the discussion above regarding FIG. 2B, the power supply 232 may be in a ceiling cavity 230, sensors 220 may be in the lower cavity 108 or elsewhere in the grow pod, and/or the like.

Figure 6A:
FIG. 6A through 6G illustrate additional embodiments of light sources for use with plant growth systems disclosed herein.
Figure 6B:
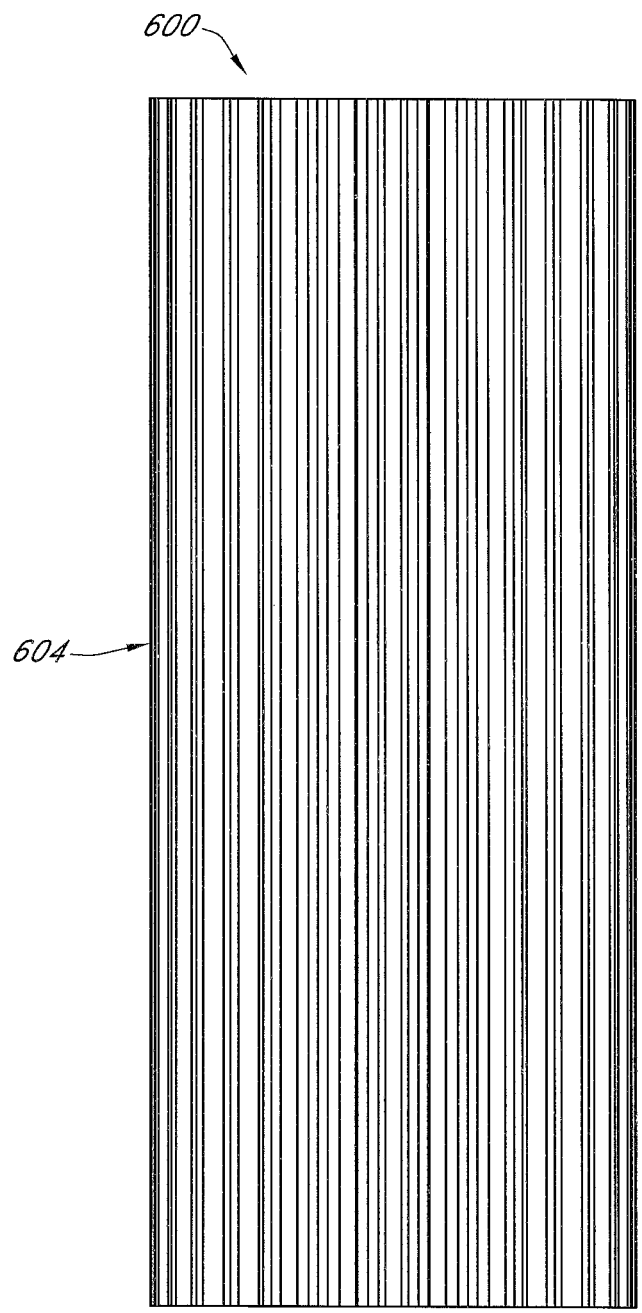
Figure 6C:
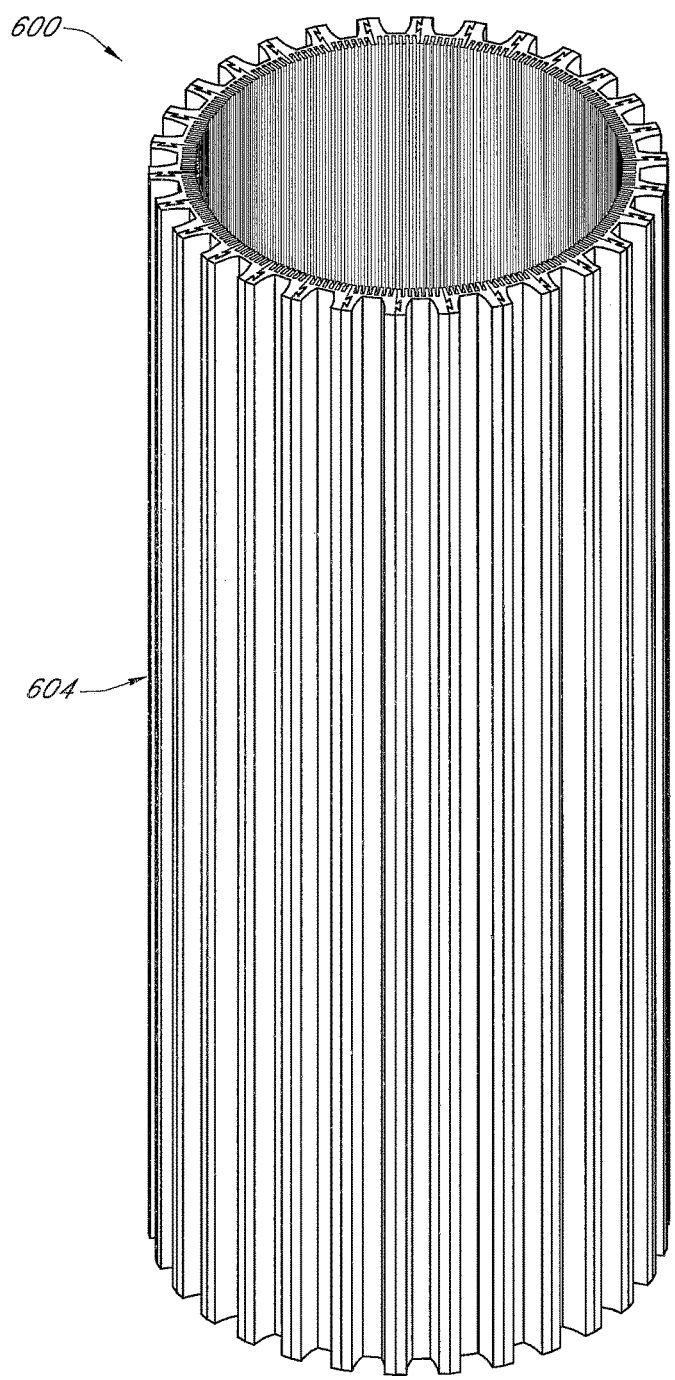
Figure 6D:
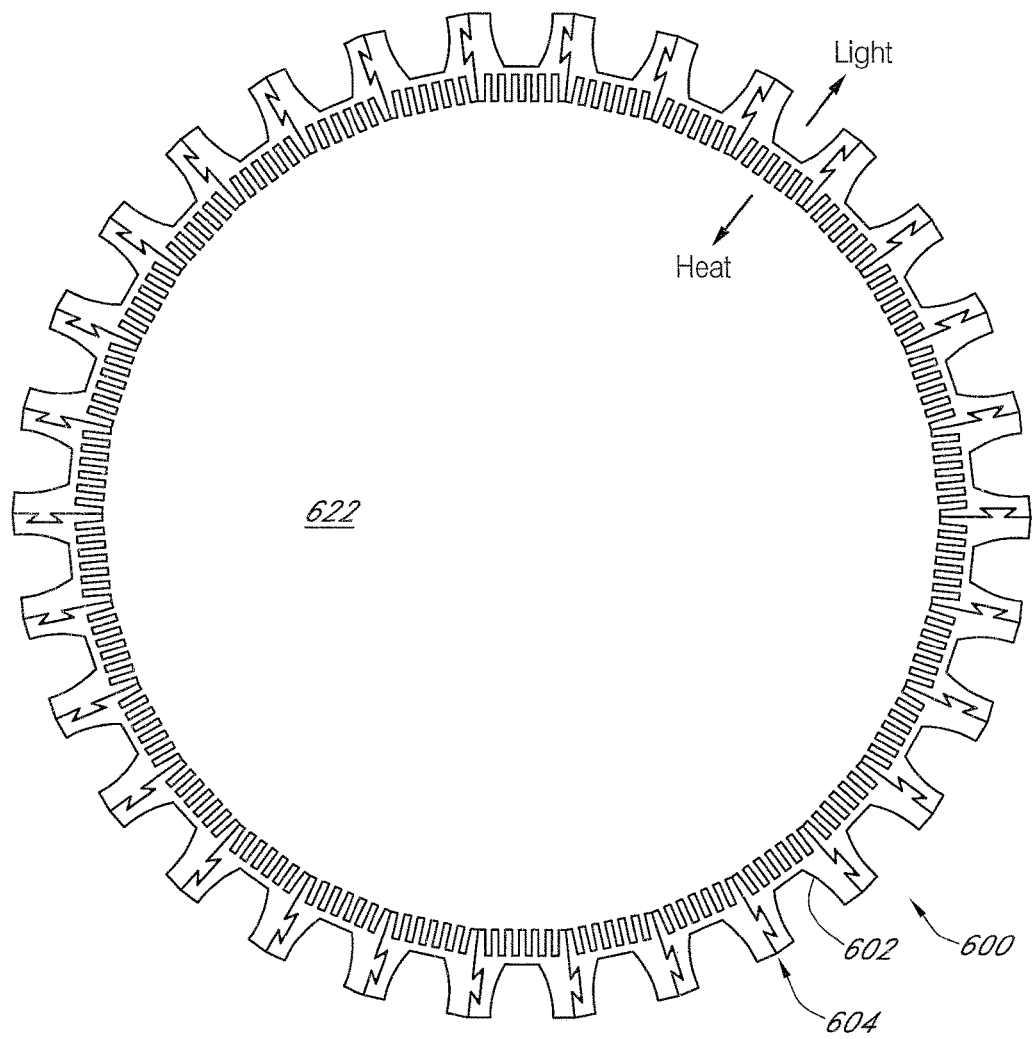
Figure 6E:
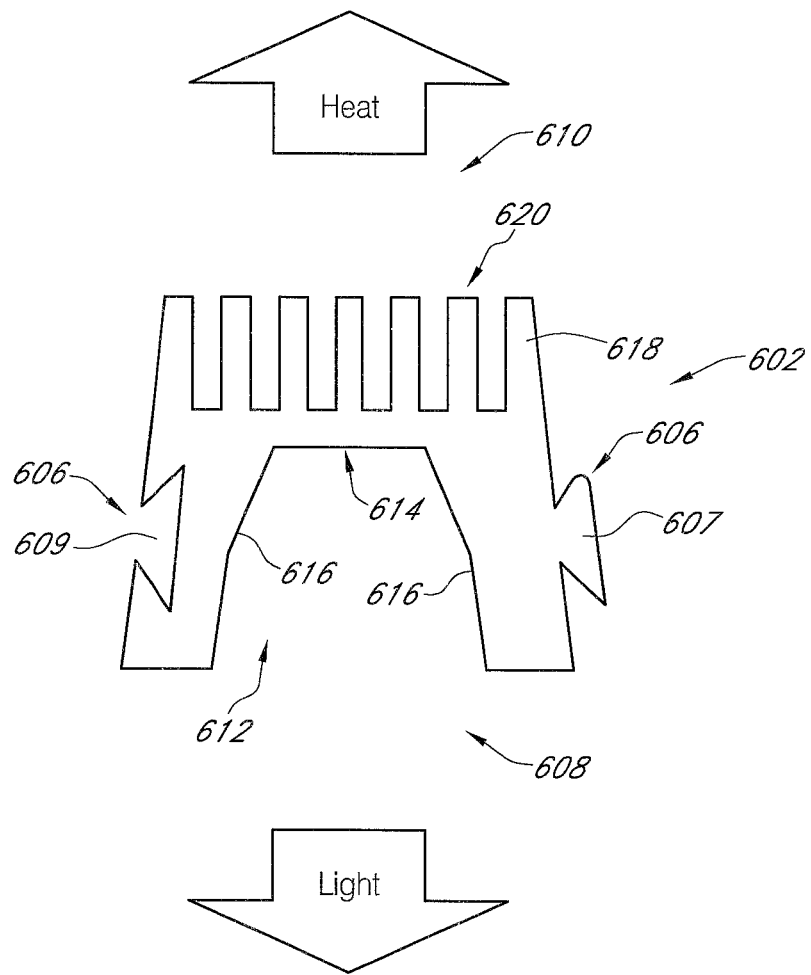

FIGS. 6A through 6E illustrate another embodiment of a light source 600, such as the centrally located internal light source 112 utilized in the grow pods of FIGS. 1A, 1B, 1D, 2A, and 2B. In this embodiment, the light source 600 comprises a plurality of individual light source modules 602, shown in FIGS. 6A and 6E, which combine together to form a unitary structure 604, shown in FIGS. 6B-6D. FIG. 6A is a side view of an individual module 602, and FIG. 6E is an end view of a module 602. Regarding the assembled unit 604, FIG. 6B is a side view, FIG. 6C is a perspective view, and FIG. 6D is an end view As mentioned above, the internal light source 600 is an example of an internal light source that may desirably be used in a grow pod that includes a barrier between the light source and the canopy zone. Accordingly, the lighting unit 600 comprises features mainly focused on production of light and management of the heat generated by that light. Unlike the embodiment of FIG. 5, the internal light source 600 does not in this embodiment comprise sensors that would more ideally be positioned within the canopy zone, since the internal light source 600 in some embodiments is not intended to be positioned directly within the canopy zone. It should be noted, however, that the internal light source 600 may in some embodiments be used in a grow pod that does not have a barrier between the light zone in the canopy zone, and thus is positioned directly within the canopy zone along with the plant canopy. In such a case, it may be desirable, but not necessary, to include some of the additional features of the embodiment of FIG. 5.

In the embodiment of FIGS. 6A-6E, each individual light source module 602 desirably comprises an extruded aluminum structure. An extruded aluminum structure can be desirable for, for example, ease and cost of manufacturing and also for aluminum's relatively good thermal transfer properties. However, in other embodiments, various other materials and/or manufacturing methods may be used. For example, the light source modules 602 may comprise a plastic, another type of metal, and/or the like.

With reference to FIG. 6E, the light source modules 602 comprise coupling features 606 that enable them to connect to other light source modules to form the generally cylindrical structure shown in FIG. 6D. In this embodiment, the light source modules 602 comprise a tongue 607 and groove 609 configuration that enables them to be slid together lengthwise. However, in various other embodiments, various other coupling features may be used. For example, magnets may be used and may be configured to enable the individual light source modules to be put into place and removed both lengthwise from the ends and radially outward. Such a configuration may make it more convenient and/or easier to assemble, disassemble, and/or replace the light modules 602. Further, in some embodiments, the light modules 602 may be configured to attach to a central structure or frame, instead of or in addition to attaching to other light modules. In some embodiments, one or more of the light modules 602 may be configured to attach to one or more locations in addition to or in lieu of a central structure or frame, such as, for example, at one or more peripheral and/or perimeter (e.g., circumferential) positions within or around the canopy zones 102 described herein. Further, in some embodiments, the light modules 602 may be configured to connect to each other and/or to an internal structure or subframe using fasteners, such as screws, bolts, snap fittings, and/or the like. In some embodiments, holes in the modules 602 for placement therethrough of a fastener, such as a screw or bolt, may take away from the available space to mount LEDs 614. However, in some embodiments, the effect of this is relatively negligible, because it is only a small area and/or the lighting fixture 600 may be configured to rotate within the grow pod to minimize any effect of such fasteners.

Figure 6G:
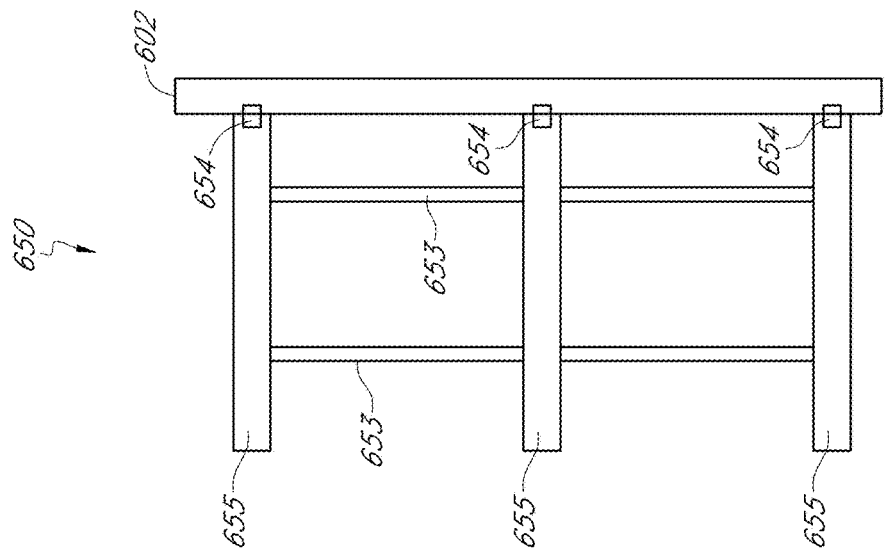
Figure 6F:
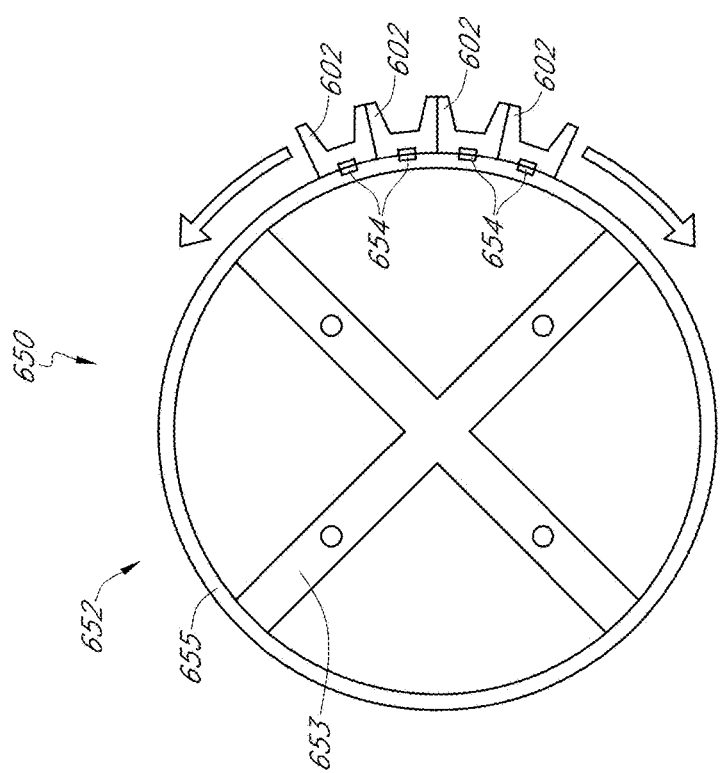

FIGS. 6F and 6G illustrate an embodiment of a light source or lighting assembly 650 which is similar to the embodiment of FIGS. 6A through 6E, except an internal frame or subframe 652 is utilized. FIG. 6F is an end view similar to FIG. 6D, and FIG. 6G is a side view, similar in orientation to FIG. 6B. The lighting assembly 650 comprises a frame 652 that in this embodiment comprises three rings 655 for the plurality of lighting module 602 to attach to, and an internal support structure 653 that couples the rings 655 together. The lighting modules 602 are each connected to the rings 655 using fasteners 654. The fasteners 654 may be, for example, screws, bolts, nuts, magnets, snap fit components, and/or the like. In some embodiments, the lighting modules 602 may simply hang from the rings 655, and may be able to be removed by simply lifting them upward.

For simplicity, FIG. 6F shows only four lighting modules 602, and FIG. 6G shows only one lighting module 602. The lighting modules 602 may be positioned all the way around the frame 652, however, similarly to as shown in FIG. 6D. In some embodiments, the frame 652 further comprises one or more electrical connectors that are configured to mate with mating electrical connectors on the lighting modules 602 when the lighting modules are attached to the frame 652. Accordingly, such a design can make it relatively easy to remove and/or install or replace lighting modules 602, with their electrical connections being automatically connected when the module 602 is connected to the frame 652. These electrical connections may, for example, enable power to be transmitted to the lighting module 602, sensor data from the lighting module 602 to be passed back to an electrical controller, and/or the like. It should be noted that the embodiment illustrated in FIGS. 6F and 6G illustrates merely one embodiment of a lighting assembly having an internal frame used to mount the individual lighting modules 602. One of skill in the art will recognize that various other arrangements of a frame or internal structure may be utilized to achieve the benefits disclosed herein.

With further reference to FIG. 6E, the individual light source modules 602 comprise a light emitting side 608 and a heat management side 610. In the orientation shown in FIG. 6E, light is emitted downward and heat is emitted upward. In use, such as in the orientation illustrated in FIG. 1A, light would be emitted radially outward and heat could be emitted radially inward. On the light emitting side 608, the light modules 602 comprise a cavity 612 with one or more positions 614 to mount one or more LEDs at a base of that cavity. Further, sidewalls of the cavity 612 are shaped and configured to reflect the light emitted from the LEDs in a desirable direction. The reflective surfaces 616 may in some embodiments be of a parabolic shape or any other shape capable of producing the desired light pattern. In some embodiments, the emitted light from the one or more LEDs can define one or more corresponding light cones or wedges directed radially outward that may or may not overlap with light cones or wedges from one or more nearby LEDs.

The heat management side 610 of the light modules 602 comprises fins 618 or other features that act as a heat sink 620 to increase the surface area to enable heat generated by the LEDs to be expelled into a central cavity 622 of the light source assembly 600 shown in FIG. 6D. In some embodiments, the central cavity 622 of the light source assembly 600 may be used to position one or more functional modules of the grow pod therein. For example, power supplies, LED drivers, and/or other hardware may be positioned within the central cavity of the light source assembly. Further, in some embodiments, one or more fans may be utilized in the central cavity to direct heat out of the light source assembly and/or out of the grow pod.

In some embodiments, the light source is configured to use LEDs or any other suitable light source. Various plants react differently to different wavelengths of light. Accordingly, in some embodiments it can be desirable to tune the light output of the light source to only emit the most appropriate wavelengths of light for the particular plant being grown. If the light output is limited to only the most appropriate wavelengths of light, energy consumption may be reduced, because energy may not need to be spent emitting light at wavelengths that are not beneficial (or not sufficiently beneficial) to the plant and/or that are less efficient as used with that specific plant. In some embodiments, configuring the wavelength output comprises using particular LEDs that emit light over a particular range of wavelengths. In some embodiments, the system is configured to use tunable LEDs that are able to emit light in a configurable range of wavelengths, based on an input from an electronic controller. Such a design may be desirable to enable the grow pod to be reconfigured automatically or in real time based on the needs of the current plant being grown.

In some embodiments, the light modules (e.g., light modules 602) are individually controllable. For example, the system may be configured to detect that there are plant leaves clustered around the 3 o'clock and 9 o'clock positions (for example, using a camera and image processing, using ultrasonic sensors, and/or the like). The system may be configured to thus increase light output around those two positions and decrease light output at other locations, to increase electrical efficiency. Further, in some embodiments, the lights are configured to come on (or to increase in brightness, and/or the like) sequentially from bottom to top as the plant grows upward, thus conserving energy by not using upper lights that are not needed or that would not be an efficient use of light when the plant is shorter. This can be possible because the LED mounting surface 614 shown in FIG. 6E may have a plurality of LEDs attached to it similarly to the LEDs 506 illustrated in FIG. 5, wherein a plurality of LEDs are sequentially attached to the helix structure 504. Further, although the embodiment illustrated in FIGS. 6A-6E comprises a cylindrical shape with LEDs only on radially outer surfaces (e.g., surface 614), in some embodiments LEDs may also or alternatively be positioned elsewhere. For example, LEDs may be positioned at a bottom of the light source to direct light downward. This may be particularly advantageous when the plant is in a seedling and/or clone stage, such as before the plant has grown outward beyond the radially outer edge of the light source. In some embodiments, these bottom-facing lights would desirably be on during the "vegetative" stage of plant growth, and would be turned off (for example, to save electricity) once the plant has grown outwards far enough that the light from the outer light bars can reach the plant.

In some embodiments, a lighting apparatus for use with plant growth systems disclosed herein comprises a cylindrical luminary designed to put out light in a desirably 360° pattern around the luminary to uniformly (in terms of PPFD) cover the entire plant canopy as defined by the shape and/or dimensions of the pod or canopy chamber. The lighting elements themselves may comprise HID, plasma, induction, florescent, LEDs, laser, and/or any combination thereof. The lighting apparatus may in some embodiments be supported from above and/or below and may be mounted using bearings to enable the lighting apparatus to rotate, partially or fully, such as via a slip ring, which may help to reduce leaf shadowing. Accordingly, although the embodiments illustrated in FIGS. 6A through 6G do not show a motor, bearings, or other rotational features, such embodiments may be configured to rotate within a grow pod. Another desirable benefit of enabling a lighting apparatus to rotate within a grow pod is for applications that have a particular segment of the luminary that contains a lighting element of a specific spectrum for special-purpose use. For example, one or more of the lighting modules 602, or one or more portions of one or more of the lighting modules 602 may comprise lighting elements configured to emit a different type of light than the others. For example, such lighting elements may be configured to emit ultraviolet light for integrated pest management and increased oil production, and/or far red light for photochromic manipulation. Even if such special-purpose lighting elements are positioned at only a portion of the light source or luminary, enabling the light source to rotate would allow that special-purpose emission to cover the entire plant canopy as needed.

A test was performed growing a plant using a lighting setup similar to as shown in FIGS. 6A-6E, and a trellis setup that arranged the plant around the light source. The results of this test versus a typical growing setup were approximately 21% larger average flower bud size, and similar results for maximum flower bud size. This test did not incorporate many of the other features disclosed herein, such as the aeroponic root zone or environmental isolation. Rather, this test utilized soil for the root zone and an environmentally open canopy zone. Significant increases to these test results are therefore expected for similar tests that incorporate one or more of the other features disclosed herein.

Light Deprivation

In some embodiments, a grow pod may be configured to selectively control an amount of external light admitted into the canopy zone 102. For example, the grow pods described herein may comprise movable shades, a glass or plastic wall comprising a substance that can selectively blackout the normally transparent wall, and/or other features that selectively restrict the amount of external light that can be introduced into the pod. This is in addition to the ability to control the light introduced by the internal light source (e.g., light source 112), such as by adjusting an amount of light output from the internal light source, and/or adjusting light frequency outputs of the internal light source. Accordingly, in some embodiments, the canopy chamber desirably comprises or is positioned adjacent a mechanism or system that selectively deprives the plant or plants from external light during, for example, the dark or night cycle, to ensure metabolic activities during that time go on uninterrupted. This may be achieved, for example, with one or more of the following types of mechanisms: a curtain, such as a plasticized accordion or fabric curtain on a roller, electronic glass that is selectively transparent or opaque based on the electrical current applied (e.g., electrochromic, photochromic, thermochromic, suspended particle, micro blind, and/or polymer dispersed liquid crystal devices), electronic tint, electronic gas (e.g., double pane glass with a gas in the middle that goes opaque when a current is applied), and/or the like.

Some plants are capable of growing with a continuous light source 24 hours a day. Other plants may grow more efficiently with a light source that at least partially simulates a natural environment, such as by having light and dark cycles during the day. Further, some plants adjust their growth cycle depending on the length of the day. For example, some plants may be triggered to move into their flowering stage when the days become shorter, such as in the Fall. Accordingly, it can be desirable to include features in a grow pod as disclosed herein that can simulate such environmental changes. For example, as discussed above, the grow pod may comprise shades, an outer wall that is selectively transparent or opaque, and/or the like that enable the system to automatically control an amount of external light that is introduced to the plant. Further, the internal light source or sources may be selectively dimmed, brightened, turned off, turned on, and/or the like to simulate environmental changes or similar.

In some embodiments, a light deprivation system may be used in conjunction with an internal light source to conserve energy. For example, if a certain amount of light is desirable at a particular time for a particular plant, the system may be configured to disable the light deprivation system to allow external light to be introduced into the canopy zone, and the system may be configured to sense the amount and/or type of light that is being introduced from the external light source, and supplement that external light source using the internal light source. By operating in such a fashion, the minimum or a relatively lower amount of energy may be required by the internal light source, because the internal light source is simply supplementing the light coming from the external light source, as opposed to the internal light source being the only light source. In some embodiments, however, it may be desirable to control as many aspects of the lighting as possible, and it may thus be desirable to block out any external light source and use an internally controllable light source as the primary or only source of light for the plants. In such a case, a light deprivation system as disclosed herein may be configured to be activated the majority of the time, and merely deactivated when an operator of the system wants to look into the canopy zone without opening the canopy zone to an external environment. In some embodiments, looking into the canopy zone without opening the canopy zone to the external environment may be accomplished by a digital camera pointed into the canopy zone, and in that case the light deprivation system may not need to be disabled.

Figure 7A:
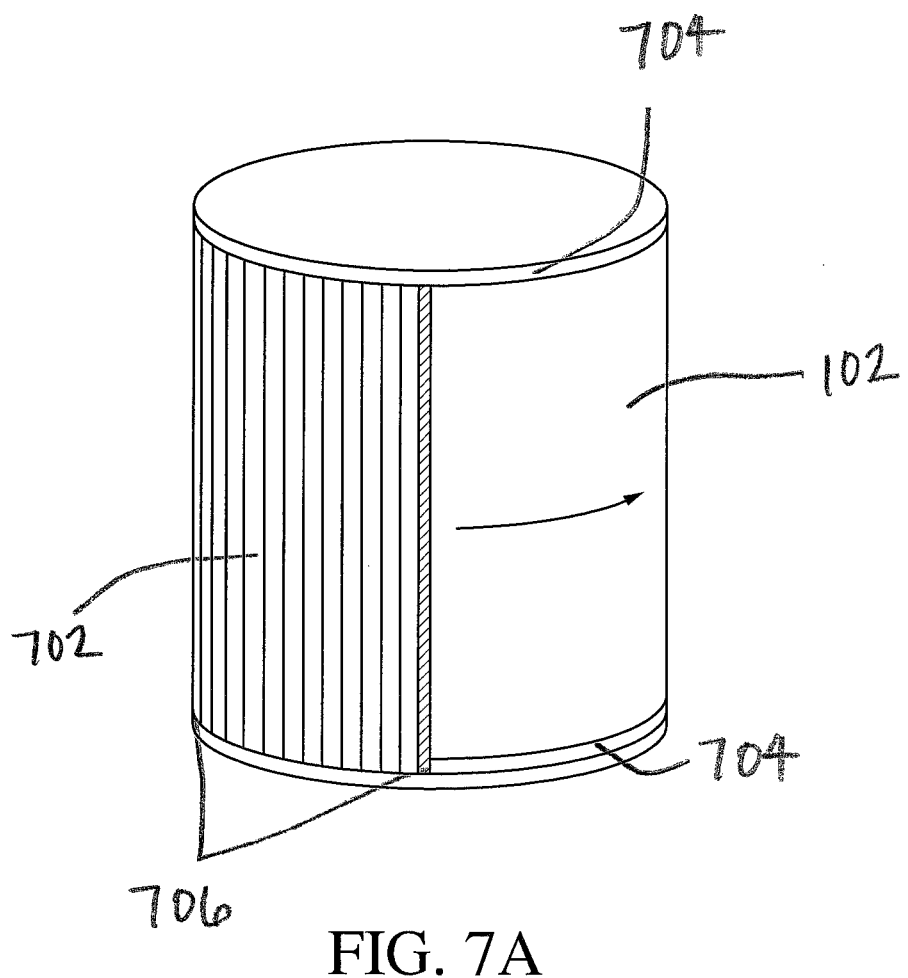
FIG. 7A through 7D illustrate example embodiments of light deprivation systems for use with plant growth systems disclosed herein.

FIGS. 7A through 7D illustrate three example embodiments of light deprivation systems that may be used with plant growth systems disclosed herein. FIG. 7A illustrates a light deprivation system 700 that comprises an accordion type curtain 702 that can expand along upper and lower tracks 704 to selectively block an external light source from entering the canopy zone 102. In this embodiment, the curtain is attached to supporting bars 706 at either end to help stabilize the curtain 702 and/or to help retain the shape of the curtain 702. In some embodiments, the curtain 702 can be configured to be manually pulled across the outer window of the canopy chamber 102. In some embodiments, the curtain 702 can be motorized to automatically open or close. Further, in some embodiments the curtain 702 can be on an external portion of the system, or in some embodiments the curtain 702 can be positioned between two panes of glass or other transparent material.

Figure 7B:
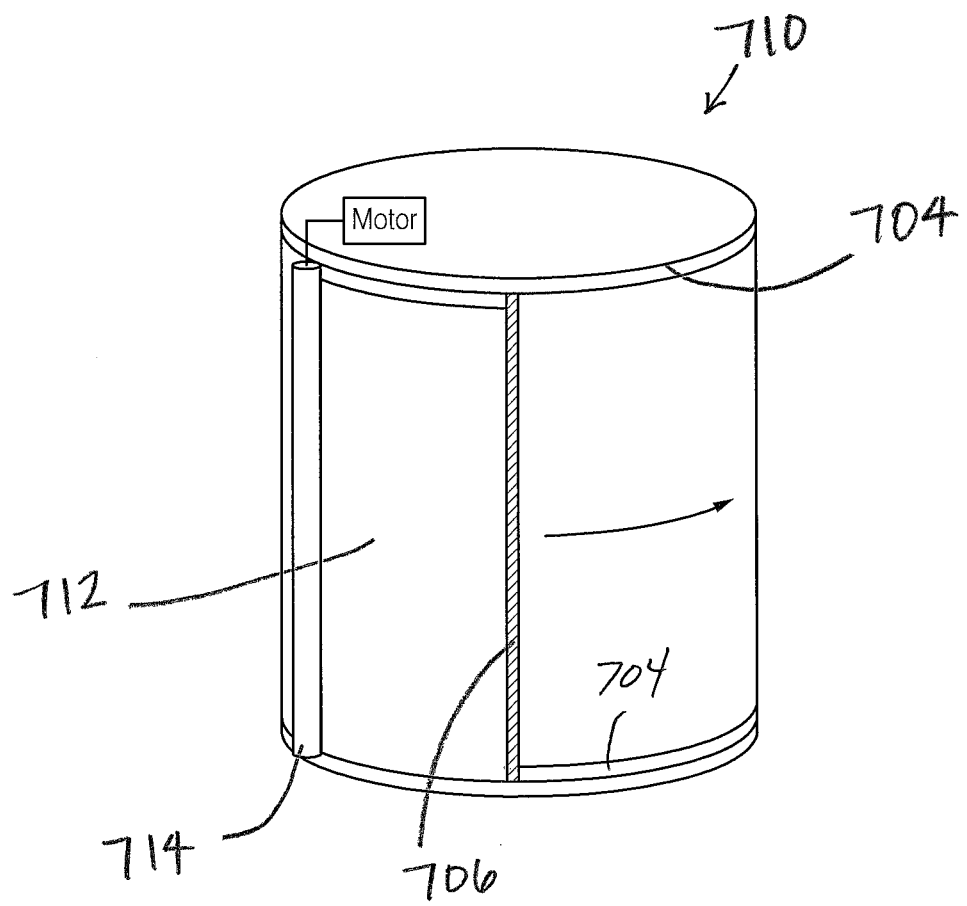

FIG. 7B illustrates another embodiment of a light deprivation system 710. In this embodiment, the light deprivation system comprises a curtain 712 that rolls up on a roller 714. Similarly to the embodiment of FIG. 7A, the curtain 712 is attached to a support bar 706 which rides in upper and lower tracks 704. In both embodiments of light deprivation systems 700, 710, the curtains 702, 712 can comprise various materials, such as fabric, polymer, and/or the like. In some embodiments, the material is plasticized to make it UV resistant or resistant to breaking down in the presence of ultraviolet light. In some embodiments, the curtain material comprises breathable fabric, such as, for example, three layer breathable greenhouse fabric.

Figure 7C:
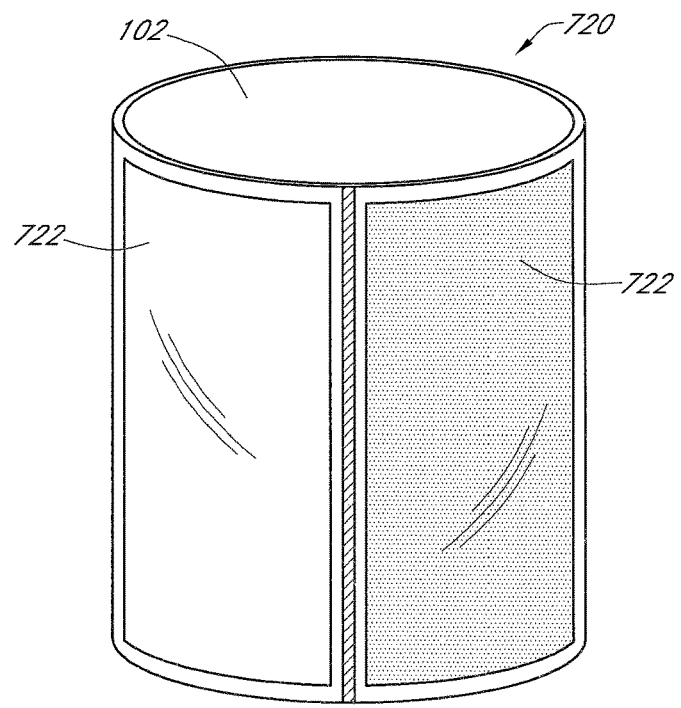
Figure 7D:
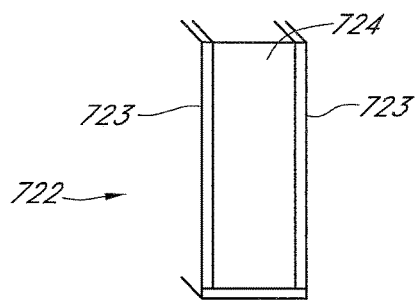

FIG. 7C illustrates another embodiment of a light deprivation system 720. In this embodiment, the light deprivation system 720 comprises smart glass panes 722 which are configured to transition from transparent to opaque upon application of an electrical current. FIG. 7D illustrates a simplified cross-sectional view of such a glass pane 722. In this embodiment, the glass pane 722 comprises two individual panes 723 separated by a gap that is filled with a gas 724 that is reactive to electrical current. Accordingly, when an electrical current is applied to the electronic gas, electronic gas goes opaque to limit introduction of external light into the canopy chamber 102.

Nutrient Delivery

The hydroponics industry has led to the widespread use of pre-diluted fertilizers which is imprecise (lab tests have shown wide variation in guaranteed analysis from bottle to bottle and batch to batch), expensive (price premium for ease-of-use, plus added freight charges), and negatively impactful to the environment (size/weight increase carbon footprint of supply chain). The disclosure herein discloses nutrient distribution systems that address these problems. For example, in some embodiments, a nutrient distribution system is designed to allow for the individual control of the delivery of one or more water-soluble, dry fertilizers. In some embodiments, the system comprises modular chambers (preferably of varying sizes based on, for example, the number of plants being fed) that can be added or removed based on the total number of fertilizer products being utilized. In some embodiments, prepackaged, water-soluble fertilizer packets are placed into the modular chambers where they are then mixed with water, such as being fed via a remote line from a centralized water source (or in some embodiments a local water storage container within the grow pod). After dilution, each chamber is desirably filled with a pH stable fertilizer that may comprise one or more vital plant elements, vitamins, supplements, and or biological organisms (mycorrhizae, trichoderma, bacteria, and/or the like). In some embodiments, each of these chambers comprises or is connected to a peristaltic pump that enables precisely dispensing the dissolved nutrient solution into a reservoir, where they are combined with nutrients from other chambers and then, in some embodiments, additional water, to achieve the desired nutrient ratios, partial hydrogen (pH), and electrical conductivity (EC).

Different plants require different nutrients and/or a different mix of nutrients to thrive. As mentioned above, typically, a grower of a plant may utilize a pre-mixed nutrient solution purchased from a third-party to add to his or her plants. This has many disadvantages, however. For example, each specific plant may require a different mix of nutrients. Further, even for the same type of plant, it may be desirable to change the mix of nutrients to obtain different results. When purchasing a pre-mixed nutrient solution from a third-party, the grower often has no way of knowing what nutrients are in that solution and in what proportions. Further, shipping and transporting of pre-mixed nutrient solutions can be expensive and inefficient. For example, many pre-mixed nutrient solutions are composed primarily of water, which is relatively heavy, bulky, and expensive to ship and store. The systems disclosed herein, however, address these and other deficiencies.

Plants generally require one or more of 17 different key nutrients in order to grow and thrive. These 17 key nutrients are nitrogen, phosphorus, potassium, magnesium, sulfur, calcium, boron, chlorine, manganese, iron, nickel, copper, zinc, molybdenum, hydrogen, carbon, and oxygen. However, various types of plants may require a different mixture of these nutrients. Further, within a specific type of plant, different nutrients may be required or desirable at different stages of the growth and flowering cycles. It should be noted that the technologies disclosed herein are applicable to storage and distribution of other elements in addition to, or in lieu of, the 17 nutrients, if desirable.

Figure 8A:
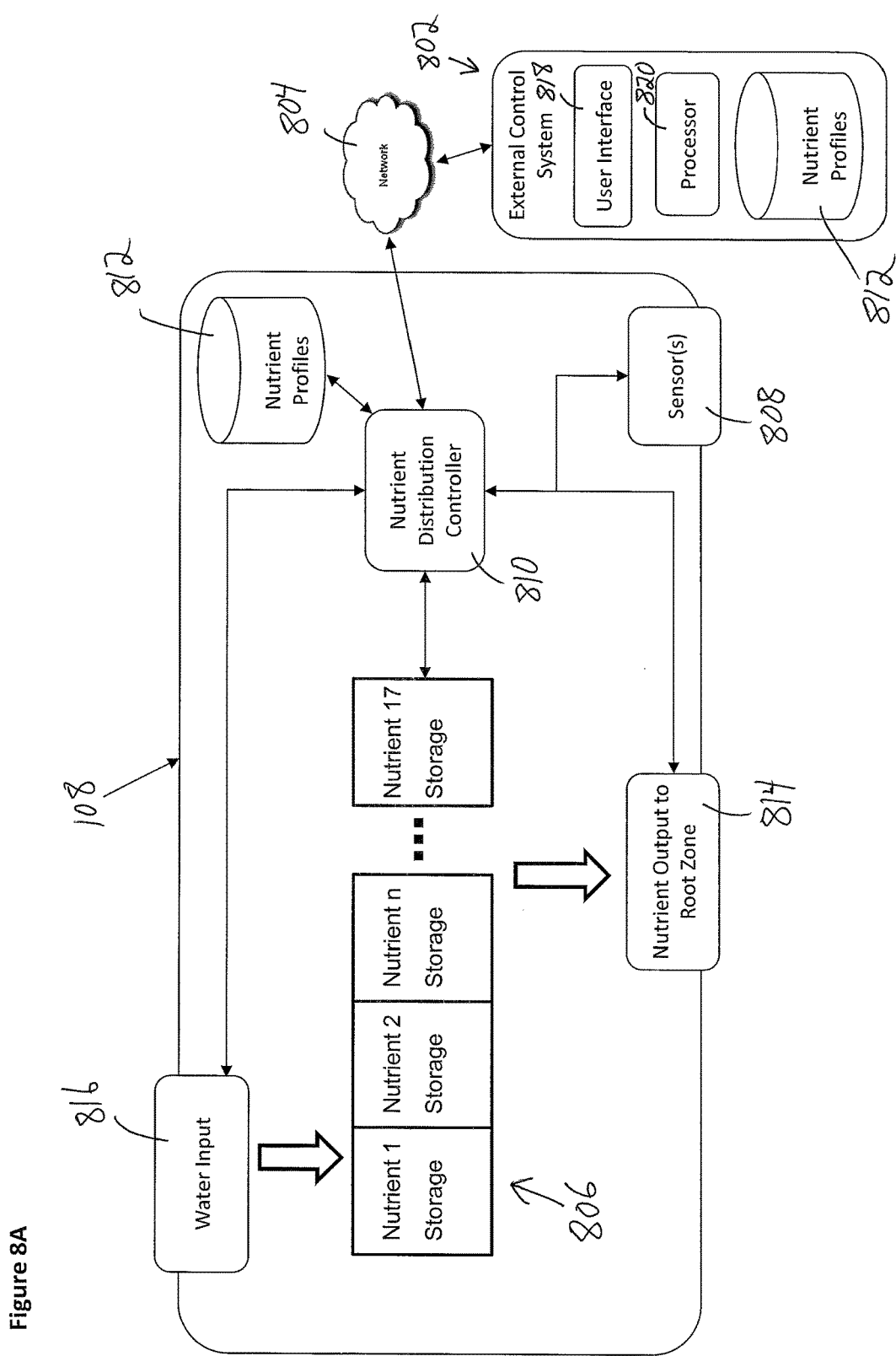
FIGS. 8A through 8D illustrate example embodiments of nutrient distribution systems for use with plant growth systems disclosed herein.

Some embodiments disclosed herein provide a system that is capable of storing one or more of these 17 nutrients in a powdered or dehydrated form, and to rehydrate them before or upon introduction into the root zone (e.g., root zone 104 in FIGS. 1A and 1B) for delivery to the plant being grown. FIG. 8A depicts an example embodiment of such a nutrient storage and delivery system 800. In this embodiment, a majority of the components are positioned within or about the lower cavity of the grow pod, such as the lower cavities 108 shown in FIGS. 1A and 1B (though other positioning is possible in other embodiments). As shown in FIG. 8A, the grow pod may communicate with an external control system 802, such as through a computer network 804, to control at least a portion of the nutrient distribution. The external control system may comprise, for example, a nutrient profiles database 812, a user interface 818, and a computer processor 820.

In this embodiment, nutrients are stored in a plurality of storage locations 806. Desirably, each nutrient is stored separately. By storing each nutrient separately, the system can be configured to maximize efficiency by using only the specific nutrient types and amount of each nutrient type needed at any particular time in the growth cycle. For example, if nutrient number one is determined to be needed by the plant, water may be input (e.g., by water input 816) and mixed with the nutrient number one powder and then output through, for example, an air assisted aeroponic nozzle (e.g., depicted as nutrient output to root zone 814).

Another advantage of storing nutrients individually is that powdered or dehydrated nutrients may be shipped from suppliers to growers in individual packets, cups, containers, and/or the like. Theses individual packets may be configured to be insertable into the grow pod for use by the grow pod. For example, the packets may be similar to single-use coffee packets that are used in single-cup coffee brewing machines. In some embodiments, however, the nutrients are shipped and inserted into the grow pods in a more bulk format.

In some embodiments, the nutrients are stored in a powdered or otherwise dehydrated form, and the nutrients are rehydrated on demand when needed. In other embodiments, the nutrients may be, for example shipped to a customer in a powdered form, but may be rehydrated upon introduction to the grow pod. Accordingly, the 17 nutrient storage locations illustrated in FIG. 8A may in some embodiments store the nutrients in a powdered form and in other embodiments may store the nutrients in a liquid suspension form. Further, in some embodiments, a combination of such storage locations may be used. For example, some amount of nutrients may be stored in powdered form, and there may also be a liquid storage location. In some embodiments, one or more sensors 808 (and/or other means) are used to determine when the powder and/or liquid storage location(s) for a particular nutrient is becoming depleted or has reached a lower threshold level so that the powder and and/or liquid nutrient in the storage location(s) may be refilled. In some embodiments, one or more sensors 808 (and/or other means) are used to determine when the liquid storage location(s) for a particular nutrient is becoming depleted or has reached a lower threshold level, and additional nutrient is created to fill that liquid storage location using the powdered nutrient in the powdered nutrient storage location.

In some embodiments, one or more of the 17 nutrients are able to be individually introduced into the root zone for take-up or absorption by the roots of the plant. However, in some cases, a particular plant may more efficiently take-up or receive a nutrient when that nutrient is delivered in combination with one or more other nutrients. Accordingly, the systems disclosed herein in some embodiments comprise features that enable one or more of the nutrients to be mixed together before delivery to the root zone. In some embodiments, a different nozzle is used for each nutrient. In some embodiments, a single nozzle is used for all of the nutrients.

In some embodiments, one or more nozzles may selectively be used to introduce one or more nutrients into the root zone. In some embodiments, one or more intermediate storage locations between the nutrient storage locations 806 and the nutrient output 814 are included. The intermediate storage locations may, for example, enable more than one nutrient to be mixed together with water and/or other components before introduction to the root zone.

With further reference to FIG. 8A, a nutrient distribution controller 810, such as a computer processor, microcontroller, and/or the like can be configured to receive input from the one or more sensors 808, consult a nutrient profiles database 812, and control the water input and/or nutrient output to ensure the appropriate nutrients are being fed to the plant when needed. In some embodiments, such a nutrient distribution system 800 can act as a standalone system. However, in some embodiments, the system can be configured to communicate through a computer network 804 with an external control system 802. The system 800 may be configured to transfer information to the external control system 802 that, for example, indicates a current condition of the plant being grown, current levels of nutrient storage, data from the sensors 808, water storage level, plant growth efficiency, and/or the like. The external control system 802 can be configured to analyze that information and determine what nutrients should be provided, and to send such information to the nutrient distribution controller 810. Accordingly, the nutrient profiles database 812 may be located at the grow pod (e.g., grow pods 100, 101, 141, and/or the like), at the external control system 802, and/or at both locations. In some embodiments, it can be desirable to have the overall nutrient distribution control take place at an external control system 802, because the external control system may have access to data from a plurality of grow pods, and thus may be able to mine such data to determine the most efficient nutrient profiles for any particular situation. In some embodiments, the external control system 802 can be configured to periodically distribute updated nutrient profiles to local grow pods for their nutrient distribution systems 800 to store in their own nutrient profiles database 812. Accordingly, in some embodiments, the benefits of having a centralized control system may be realized even when a local grow pod is not necessarily in constant contact with the external control system 802. Further, in some embodiments, a control system 802 can be configured to comprise automated crop health diagnostics, closed-loop feedback via business management and tie in with testing lab APIs, command-and-control capabilities, big data analytics, real-time weather replication, and/or the like.

In some embodiments, the sensors 808 may comprise sensors that detect hormones released by the roots of the plant. This is because some plants release hormones that are indicative of the nutrients currently required by that plant. Accordingly, it can be desirable to detect these hormones and utilize them in some embodiments as part of an active feedback system that can inform the nutrient distribution system what nutrients are currently required by the plant, enabling the nutrient distribution controller to release those nutrients to the plant. In some embodiments, other sensors may be used in addition to or in lieu of the hormone sensors to perform similar functions. For example, sensors may be used that enable the system to determine what stage of the growth cycle the plant is in, how healthy the plant currently is, the current root zone and/or canopy zone environmental conditions, and/or the like.

Figure 8B:
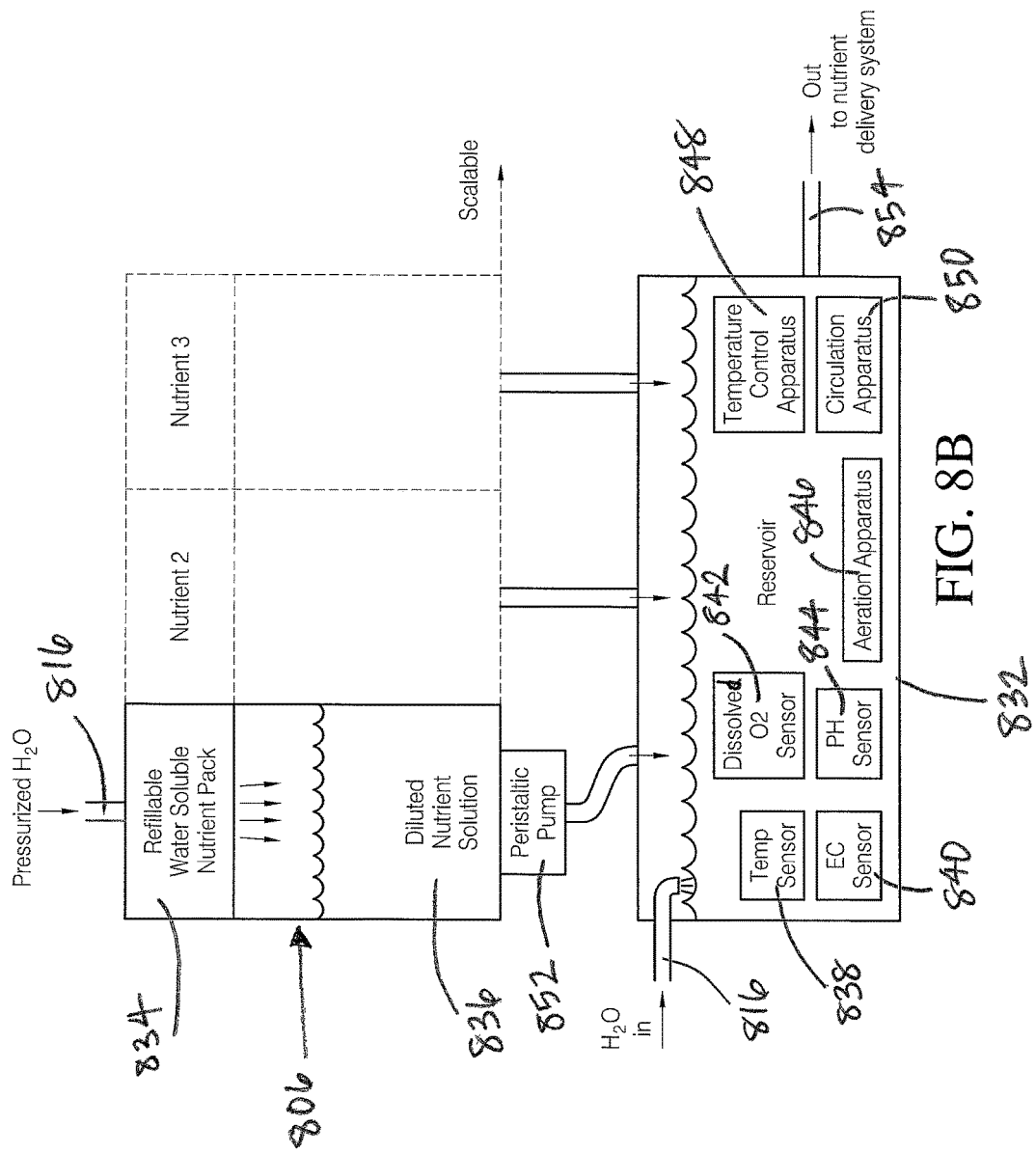

FIG. 8B illustrates another embodiment of a nutrient distribution system 830. This embodiment of a nutrient distribution system is similar in many respects to the nutrient distribution system 800 shown in FIG. 8A, but illustrates some different features. The nutrient distribution system 830 comprises a plurality of nutrient storage locations 806 and a reservoir 832. Each of the nutrient storage locations 806 comprises a location for accepting a refillable water-soluble nutrient pack 834 and a nutrient solution cavity 836 where the water-soluble nutrient is diluted within, for example, water. The water is desirably introduced as pressurized water at a water input 816. By introducing the water pressurized, it can help to mix the water-soluble nutrient into the water.

The reservoir 832 comprises a plurality of sensors and other components that help to ensure the nutrient solution in the reservoir 832 comprises appropriate qualities for introduction to the root zone. For example, in this embodiment, the reservoir 832 comprises a temperature sensor 838 electrical conductivity sensor 840 dissolved oxygen sensor 842, pH sensor 844, aeration apparatus 846, temperature control apparatus 848, and circulation apparatus 850. The temperature sensor 838, electrical conductivity sensor 840, and dissolved oxygen sensor 842, and pH sensor 844 can be used to sense the current properties of the solution stored in the reservoir 832. Depending on what needs to be changed with the nutrient solution, a controller may cause various things to occur. For example, a controller may cause the temperature control apparatus 848 to heat or cool the mixture. Further, the controller may cause the aeration apparatus 846 to aerate the mixture when aeration is needed. Depending on the type of nutrients that need to be added to the reservoir 832, a controller may instruct one or more peristaltic pumps 852 (or other type of pumping mechanism) to transfer some diluted nutrient solution from a diluted nutrient solution cavity 836 into the reservoir 832. When nutrient solution within the reservoir 832 is ready to be introduced to a root zone, the circulation apparatus 850 can cause some of the solution to exit the reservoir 832 at output 854.

Figure 8D:
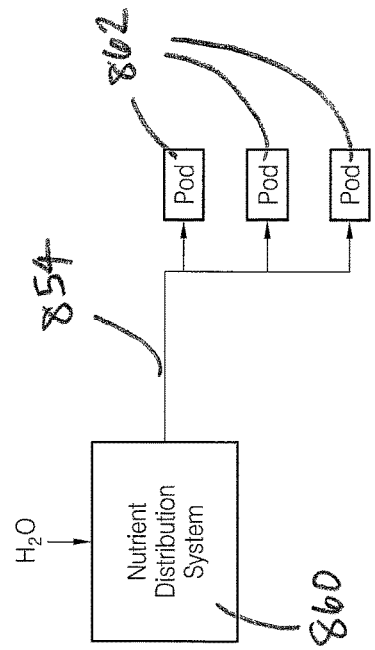
Figure 8C:
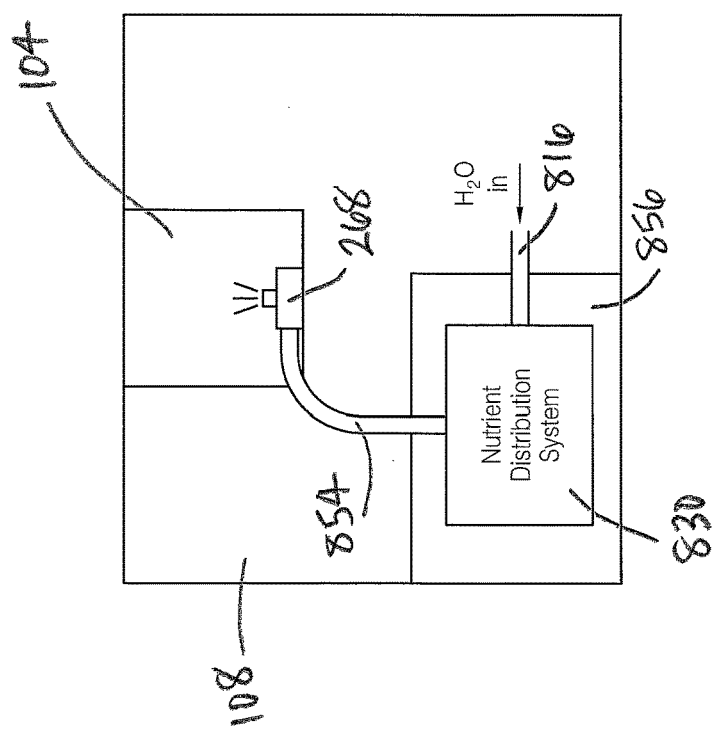

FIG. 8C illustrates an example configuration of the nutrient distribution system 830 of FIG. 8B in use with a grow pod. In this embodiment, the nutrient distribution system is positioned within a pod base 108 and in some embodiments may be externally accessible by, for example, access panel 856. When nutrient solution is required to be introduced into the root chamber 104, the circulation apparatus 850 of the nutrient distribution system 830 (shown in FIG. 8B) can cause nutrient solution to be transferred through output line 854 and to an aeroponic nozzle 268. The nutrient solution can then be introduced into the root chamber 104.

FIG. 8C illustrates a configuration wherein nutrient packs and water are introduced to a particular grow pod, and that grow pod controls introduction of diluted nutrient solution into the root chamber 104. FIG. 8D illustrates a schematic diagram of an example embodiment of a remote nutrient distribution system 860 which handles distribution of nutrients to a plurality of grow pods 862, which may be similar to, for example, any of the grow pod systems disclosed herein. In this embodiment, the nutrient distribution system 860 may be similar to the nutrient distribution systems 830 and/or 800, except that the system may distribute diluted nutrient solutions to more than one pod 862. Further, although FIG. 8D illustrates a single output line 854 coming out of the nutrient distribution system 860 and entering the plurality of pods 862, various embodiments may be configured such that the nutrient distribution system 860 can selectively introduce nutrient solutions to individual pods 862. For example, a different output line 854 may be used for each grow pod 862. As another example, each grow pod 862 may comprise a solenoid valve that can be activated by the nutrient distribution system 860. Accordingly, the nutrient distribution system 860 may have a single output line 854 that goes to each of the plurality of pods 862, but the system may be able to selectively open the solenoid valves at one or more of the pods 862 such that nutrient solution being delivered from the nutrient distribution system 860 is only delivered at one time to a subset of the plurality of pods 862. Also, it should be noted that, although the system illustrated in FIG. 8D depicts a nutrient distribution system 860 that supplies nutrients for a plurality of pods 862, similar concepts may be used for a nutrient distribution system that supplies nutrients to a plurality of root chambers within a single grow pod and/or distributed across a plurality of grow pods.

CO2 Distribution System

As discussed above, plant growing systems disclosed herein are desirably configured to monitor a plurality of environmental parameters within a canopy zone and/or root zone, and to use that monitored data as active feedback to make adjustments to the environment to promote efficient and/or accelerated plant growth. One relatively important environmental parameter for the canopy zone is the level of carbon dioxide in the air. Accordingly, it can be desirable in some embodiments to include one or more sensors that can detect the current level of carbon dioxide in the air of the canopy zone (either directly or indirectly), and one or more CO2 production and/or distribution systems or mechanisms to introduce additional carbon dioxide into the environment as needed. In some embodiments, the system may also be configured to remove excess carbon dioxide from the environment if there is more than an ideal amount of carbon dioxide in the environment.

Figure 9B:
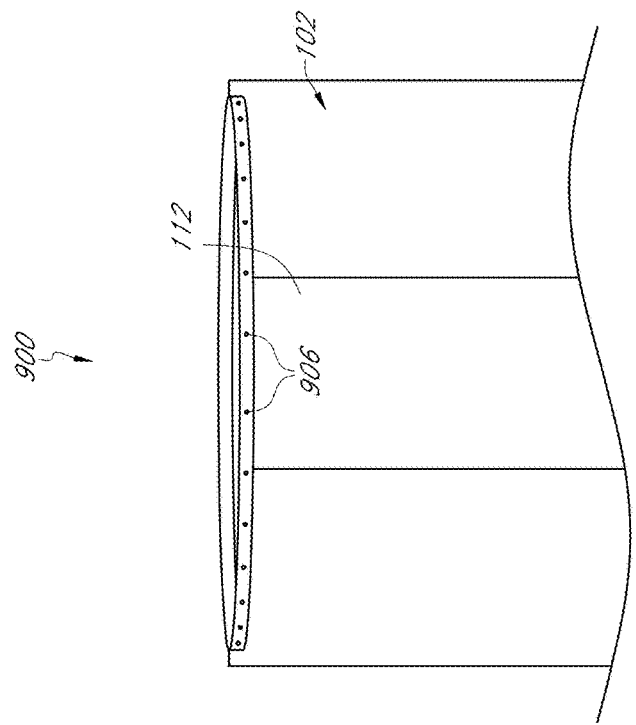
FIGS. 9A and 9B illustrate example embodiments of carbon dioxide or CO2 distribution systems for use with plant growth systems disclosed herein.
Figure 9A:
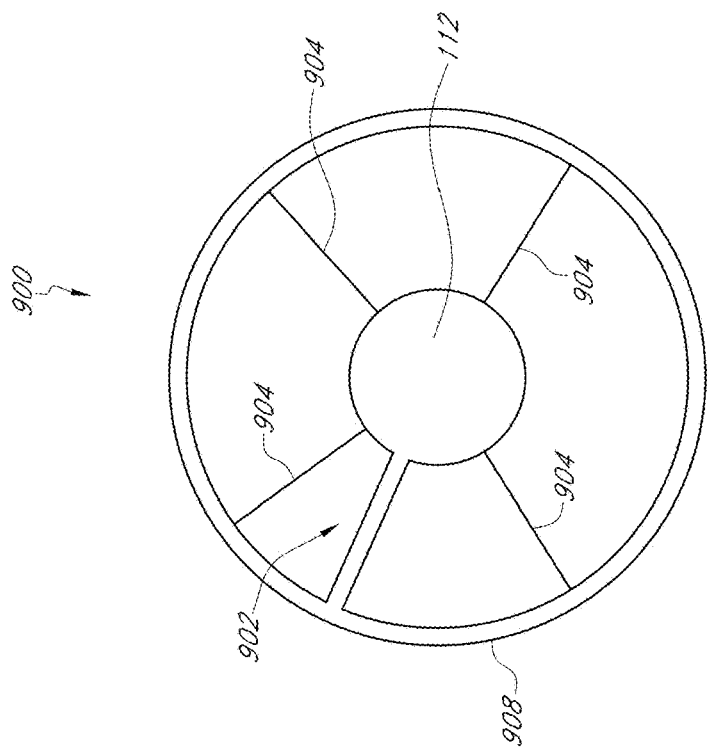

In some embodiments, the systems described herein can comprise a hollow halo positioned near and/or projecting from the top of the unit (e.g., near a top of the canopy chamber, such as canopy chamber 102 of FIG. 1A) that is fed $CO_2$ via tubing from a central source in the facility (produced by either burning natural gas, compressed gas cylinders, and/or as a by-product of fertilizer production) and/or a local source, such as a compresses gas cylinder stored within the grow pod. For example, FIGS. 9A and 9B illustrate top and side views, respectively, of one such $CO_2$ distribution system 900 (also referred to as a halo), according to some embodiments. The system 900 can include a $CO_2$ feed line 902 connected to a central source of $CO_2$. The halo 900 may comprise, for example, an outer ring 908 supported by one or more supports 904 to help maintain the structural integrity of the outer ring or peripheral portion 908 of the system 900. The peripheral portion 908 can include one or more $CO_2$ emitter holes, orifices, or nozzles 906 to discharge $CO_2$ received from the $CO_2$ feed 902 into the canopy zone 102 of the grow pods disclosed herein. Since $CO_2$ is heavier than air, the position of the halo around the circumference of the top of the plant canopy can allow for a uniform precipitation of $CO_2$ through the entire canopy, ensuring that the optimum $CO_2$ levels of, for example, approximately 1500 ppm are maintained.

FIGS. 9A and 9B illustrate one embodiment of a carbon dioxide distribution system 900. Various other configurations for introducing carbon dioxide into the canopy chamber 102 may be utilized in other embodiments. For example, CO2 emitters 906 may be incorporated into, for example, the ceiling of the canopy chamber 102, the sidewalls of the canopy chamber 102, the barrier 113 between the light source 112 and canopy chamber 102, the trellis, and/or the like. In some embodiments, CO2 emitters 906 are incorporated into an upper portion of a trellis. For example, with reference to FIG. 4B, the trellis 410 may further comprise a connector that connects to a carbon dioxide source and that leads to one or more carbon dioxide emitters, such as nozzles, orifices, and/or the like, that are positioned near an upper portion of the trellis 410. Accordingly, in such an embodiment, the trellis 410 may perform a plurality of functions, namely, structural support for the plant canopy, temperature regulation of the environment in the canopy zone, introduction of carbon dioxide into the canopy zone, and/or the like.

Automatic Harvesting

Some embodiments of plant growing systems as disclosed herein comprise automatic harvesting functionality. Harvesting plants can be labor-intensive and it is sometimes important to perform harvesting at the right point in time, so that the fruit or other product of the plant is at the appropriate level of ripeness when harvested. Accordingly, it can be desirable to automate the harvesting process, for example, by utilizing sensors of the device to detect when the prime time to harvest is, and/or by mechanically harvesting the fruit or other product without the need for a human to manually perform such harvesting.

FIGS. 10A through 11B illustrate two embodiments of automatic harvesting systems 1000, 1100 as used with a tomato plant. In the embodiment shown in FIGS. 10A and 10B, a circular blade 1002 is positioned adjacent a cylindrical trellis 1010 that supports the tomato plant stalks 1004. Note that in these figures, only the trellis 1010, plant 1006, and harvesting blade 1002 are shown. However, these embodiments may be utilized in, for example, a grow pod such as illustrated in FIGS. 1A, 1B, 1D, 2A, 2B, and/or the like. In this embodiment, the circular harvesting blade 1002, when it is time to harvest, can be moved downward to cut the tomatoes 1008 from the plant stalks 1004. One reason such a design may be desirable is that the plant is growing utilizing a centrally located light source, such as the light sources 112 illustrated in FIG. 1A and other figures. Accordingly, the tomatoes, or other object to be harvested from different plants, will tend to grow inward toward the light source. Accordingly, the trellis 1010 can act as a natural separator between the main plant stalk and the tomatoes or other item to be harvested.

The embodiment illustrated in FIGS. 11A and 11B is similar to the embodiment illustrated in FIGS. 10A and 10B. However, in the embodiment illustrated in FIGS. 11A and 11B, a vertically oriented harvesting blade 1102 rotates about the trellis 1010 instead of a cylindrical blade moving up and down with respect to the trellis. One of skill in the art would recognize that various other configurations may be utilized. Further, one of skill in the art will recognize that other trellis configurations may be used. For example, various embodiments disclosed herein do not necessarily use a full cylindrical trellis like the trellis 1010. For example, a modular trellis similar to trellis 410 illustrated in FIG. 4B may be used. In such a case, a plurality of trellises 410 may be positioned about a circumference of the canopy zone, such as two, three, four, five, or more individual trellises 410. In such an embodiment, a single horizontally oriented or vertically oriented harvesting blade 1002, 1102, may be used similarly to as the embodiments illustrated in FIGS. 10A and 11A. However, when separate individual trellis modules are being used, it may be desirable to have each of the trellis modules use their own auto harvesting mechanism. Accordingly, an auto harvesting mechanism may be incorporated into and/or attached to each of a plurality of individual trellis modules within a grow pod. For example, each trellis 410 from FIG. 4B may incorporate or be attached to one or more blades that are configured to move horizontally, vertically, diagonally, rotationally, and/or the like with respect to the plant supports 414 and hollow tubing 412.

In some embodiments, the harvesting blade (e.g., harvesting blades 1002 and 1102) is actively powered, such as by a motor or other actuator. In some embodiments, the harvesting blade or blades can alternatively be manually powered, such as by a user moving a lever, rotating a crank, or the like.

In some embodiments, the grow pods described herein can be configured to comprise a chute or other mechanism that guides the harvested tomatoes or other product out of the grow pod to be collected. In some embodiments, the chute, the floor of the canopy zone, and/or other surfaces may comprise a compliant or relatively soft material that limits damage to the tomatoes or other fruit or product when it drops off of the stalk. In some embodiments, the floor of the canopy zone or other portion of the grow pod may comprise a selectively inflatable bladder that can act as an airbag to limit damage to the tomatoes or other product when they drop off of the stalks. In some embodiments, the harvesting blade may comprise or be connected to a net or other catching mechanism that enables the tomatoes or other product to not have to fall all the way to the floor of the canopy zone as they are cut off by the harvesting blade. Rather, the net or other catching mechanism may be configured to move along with the harvesting blade and catch tomatoes or other product as they are cut from the stalk. The system in an embodiment can be configured to comprise a slanted portion above (e.g., right above) the root zone barrier (or as part of the root barrier) in order for the harvested produce to be collected and/or to slide out of the pod after the knife cuts the plant. In an embodiment, the pod system comprises a surface that can be mechanically and manually positioned by a user into a slanted or inclined position. In an embodiment, the pod system comprises a surface that can be positioned in a slanted position by an electro-mechanical apparatus, and in an embodiment, the pod system comprises a surface that can be permanently positioned in a slanted or inclined position. In an embodiment, the pod system comprises a surface that can be configured to comprise a funnel-like shape or a curved shape or a wedged-shape or conical shape or frustoconical shape or the like or a combination of the foregoing in order direct the cut harvested produce towards a particular area of the pod.

Structural Design

The embodiment of a grow pod illustrated in FIG. 1A comprises a generally cylindrical shape. In this embodiment, the grow pod is approximately 4 feet in diameter and 6 feet tall. However, various other sizes may be used. For example, a smaller unit may be desirable for home or hobby type users, or for research purposes. A larger grow pod may be desirable for commercial farming, for larger plants, and/or the like. For example, the techniques disclosed herein may be used with everything from small herbs to large trees. For example, a grow pod or plant growing system as disclosed herein may be scaled up and enable one or more full trees to grow within. In some embodiments, a grow pod may be as small as approximately 3 feet tall or as big as approximately 30 feet tall. For example, a 3 foot tall pod may be useful for small herbs, and a 30 foot tall pod may be useful for a larger tree. In some embodiments, the height of a grow pod may be, for example, approximately, no less than, or no greater than three, four, five, six, seven, eight, nine, 10, 11, 12, 13, 14, 15, 20, 25, or 30 feet. In some embodiments, the diameter or width of a grow pod may be, for example, approximately, no less than, or no greater than one, two, three, four, five, six, seven, eight, nine, 10, 11, 12, 13, 14, 15, 20, 25, or 30 feet. In some embodiments, the grow pods or growing systems disclosed herein are structurally designed such that they may be stacked upon one another. This may be desirable to, among other things, enable a higher number of plants to be grown and harvested within a limited amount of space. Further, although many of the figures included herein show cylindrically shaped growing systems, various other shapes may be utilized. For example, a grow pod may be rectangular in shape (e.g., as shown in FIG. 1D). In other embodiments, a grow pod may be octagonal in shape and/or may be configured to fit next to adjacent pods in a honeycomb shape fashion, such as to enable more grow pods to fit within the same amount of area.

Turntable/Modular Root Chambers

Some embodiments of plant growth systems disclosed herein are configured to enable an operator to access all sides of the unit, such as with a cylindrical system having sliding doors that rotate all the way about the canopy zone, as illustrated in FIG. 1C. In various situations, however, it may be undesirable and/or difficult for an operator to access all sides of a grow pod. For example, a commercial or industrial setting may have a plurality of grow pods packed into a dense area. In such a situation, it may be desirable to enable an operator to access all plants within a single grow pod, or all portions of a plant that is within a single grow pod, from a single door or opening into the canopy chamber. Accordingly, some embodiments may comprise a turntable or Lazy Susan type arrangement, as mentioned above with respect to FIG. 1D, which includes a turntable 142.

Figure 12A:
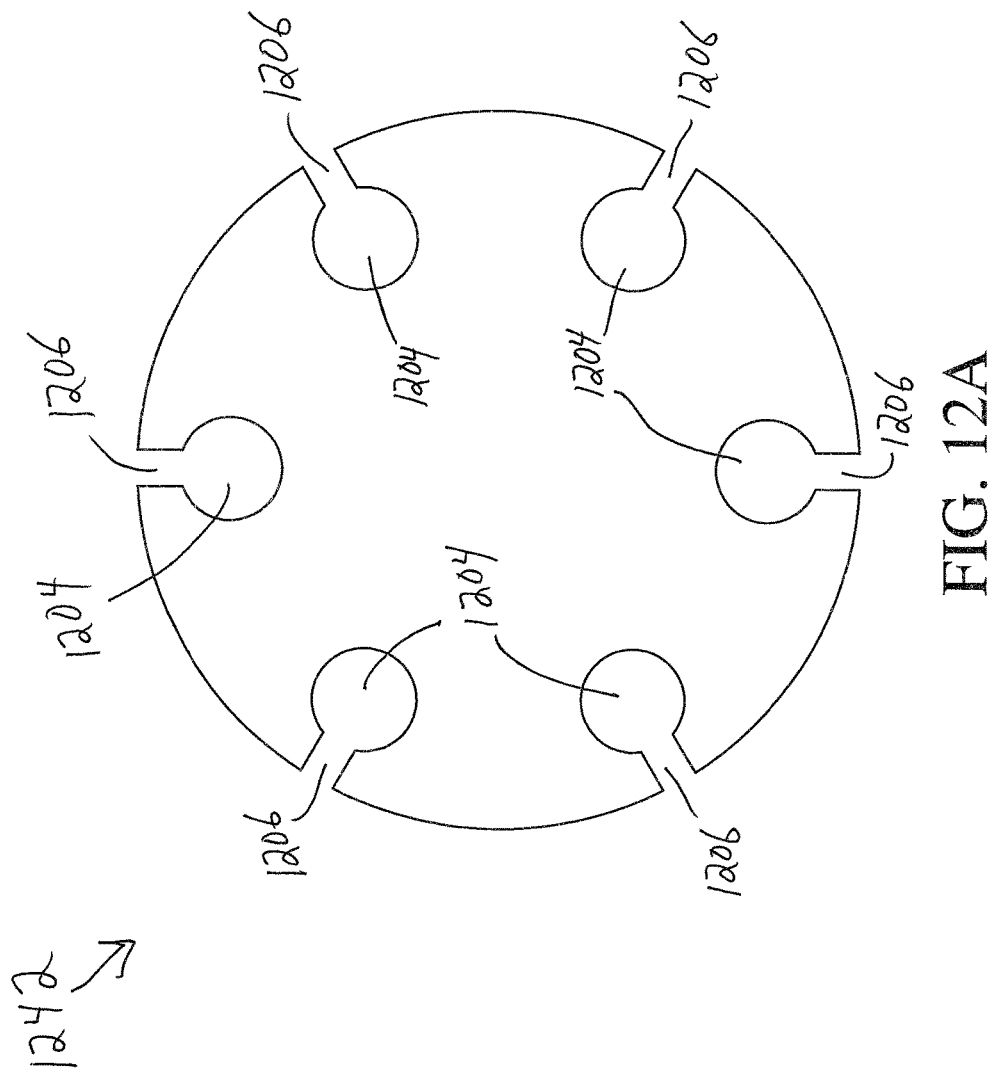
FIGS. 12A through 12C illustrate an example embodiment of a turntable for use with plant growth systems disclosed herein.
Figure 12B:
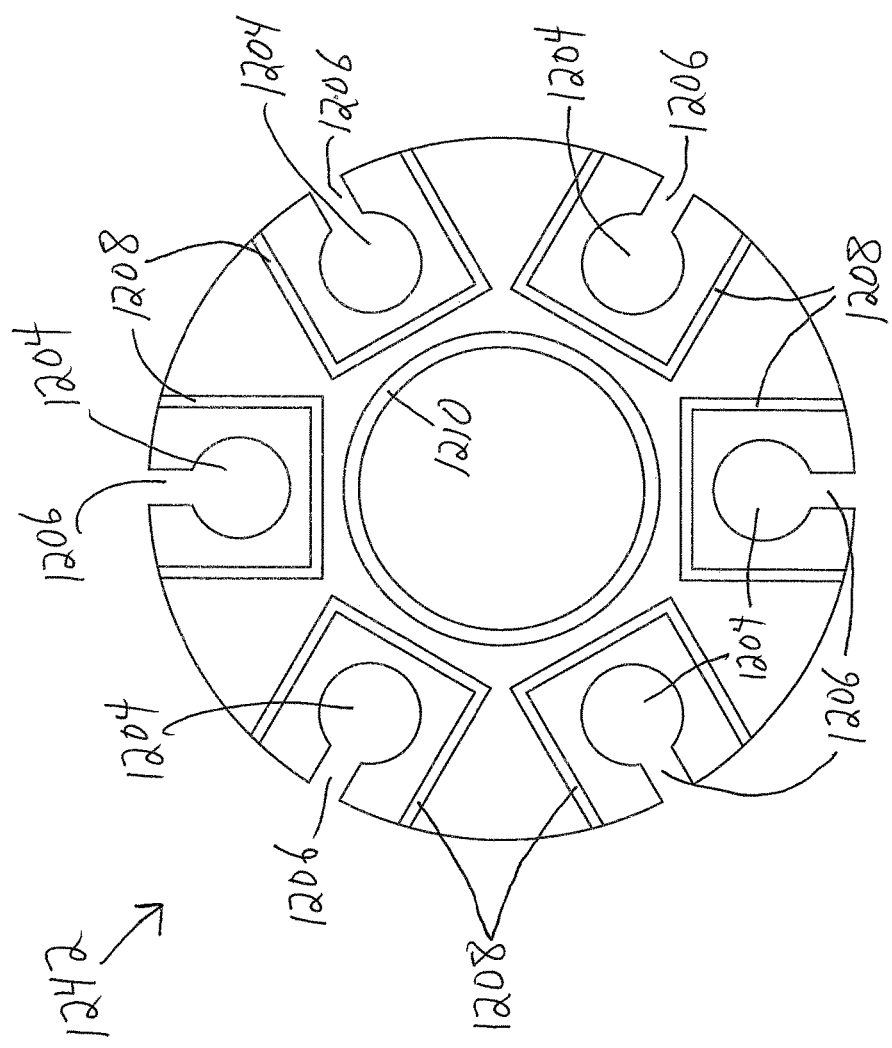
Figure 12C:
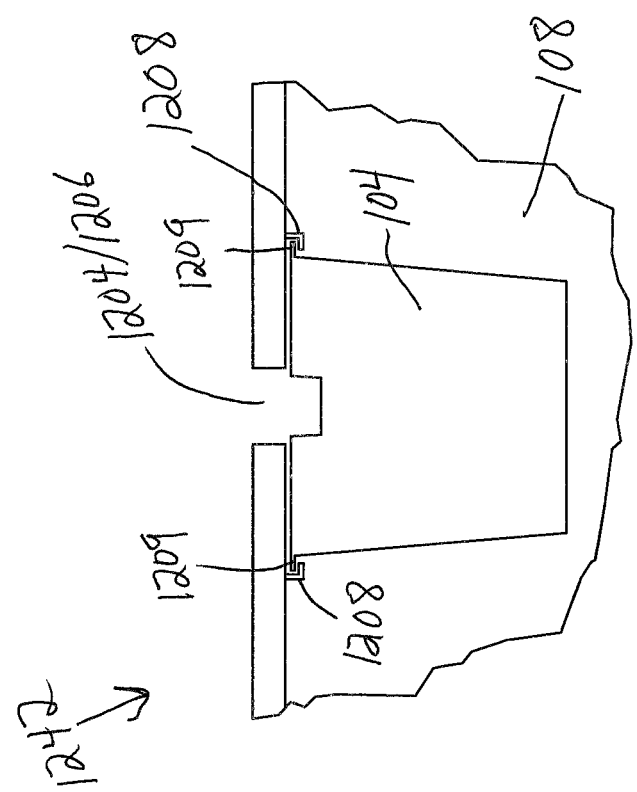

FIGS. 12A through 12C illustrate additional details of an example embodiment of a turntable 1242. The turntable 1242 may be similar in design and/or function to the turntable 142 illustrated as part of the grow pod 141 shown in FIG. 1D. FIG. 12A is a top view of the turntable 1242, FIG. 12B is a bottom view of the turntable 1242, and FIG. 12C is a side view of the turntable 1242 with a root chamber 104 coupled thereto.

The turntable 1242 comprises a plurality of plant sites 1204. In this embodiment, the turntable 1242 comprises six different plant sites 1204. Various embodiments may, however, include more or less plant sites 1204. Each of the plant sites 1204 is configured to have a root chamber 104 positioned at or next to it and/or coupled to the turntable 1242 adjacent the plant site 1204. The turntable 1242 also comprises a plurality of access channels 1206, with one adjacent each of the plant sites 1204. The access channels 1206 desirably extend from the plant sites 1204 radially outward and through an outer edge of the turntable 1242. This can enable a root chamber 104 having a plant stalk protruding upward therefrom to be easily slid in and out of the turntable 1242. Although some embodiments may not include access channels 1206, such a design may not be as desirable, because removal or insertion of a root chamber 104 already having a plant stalk protruding there from may be more cumbersome.

The turntable 1242 further comprises a support bracket 1208 positioned adjacent each of the plant sites 1204. The support brackets 1208 are configured or shaped to couple with a protruding ledge 1209 of the root chamber's 104, thus enabling the root chambers 104 to be slid into place near the plant sites 1204 and supported or held in place by the support brackets 1208. In some embodiments, the turntable 1242 comprises a door, arm, movable protruding member, and/or the like that is able to be positioned in place radially outside of the root chamber 104 after the root chamber 104 has been put in position adjacent to the plant site 1204. Accordingly, in some embodiments, the root chamber 104 may be essentially locked in place and/or unable to be removed from the turntable 1242 until the door, arm, movable protruding member, and/or the like is moved or repositioned. In some embodiments, a detent mechanism helps to hold the root chambers 104 in place without necessarily locking them in place.

In some embodiments, the support bracket 1208 is of a standardized design that allows any sized or a plurality of different sizes of root chambers 104 to be coupled thereto. For example, different sized root chambers 104 (e.g., having different internal volumes and/or internal or external dimensions) may be produced to be used with different types of plants having different sized root structures. Some of those root chambers 104 may be smaller or bigger than others. However, in some embodiments, it may be desirable to have each of these different sizes of root chambers comprise a ledge 1209 of a similar size and/or configuration such that a plurality of sizes of root chambers 104 can work with the same turntable 1242 and support brackets 1208. Accordingly, in some embodiments, more than one size or type of root chamber 104 may be used at the same time with a single turntable 1242.

Various features disclosed herein may enable a turntable, such as the turntable 1242, to act as a modular system that enables any root chamber 104 and/or plant type to be inserted therein. In some embodiments, the modular features disclosed herein, such as a root chamber 104 that is removable and replaceable, may be used in embodiments that do not necessarily have a turntable, but that include features to accept removable root chambers. Further, different retention mechanisms or designs may be used to retain the root chambers 104. For example, instead of a support bracket 1208 that slidably engages a ledge 1209, the root chambers 104 may screw into place, may be held with magnets, may be held in place with fasteners such as screws, bolts, and/or the like, may drop into place and be held in place via gravity and a ledge of the root chamber 104, and/or the like.

A turntable as disclosed herein may be configured to be rotatable with respect to the rest of the grow pod in various ways. In the embodiment illustrated in FIG. 12 B, the turntable 1242 comprises a bearing race 1210 shaped to engage a plurality of ball bearings and/or roller bearings to enable relatively easy rotation of the turntable 1242, even if the turntable is supporting a relatively large amount of weight. Although in this embodiment the bearing race 1210 is illustrated at a central portion of the turntable 1242, namely inside of the plant sites 1204, one or more bearing races and/or other mechanisms enabling rotation of the turntable 1242 may be positioned elsewhere. Further, in some embodiments, the turntable 1242 is configured to be manually rotated, such as by an operator manually pushing the turntable in a circle. In some embodiments, however, the turntable 1242 may be motorized and may be able to rotate on demand under the power of, for example, an electric motor.

In some embodiments, a turntable as disclosed herein may not be able to rotate a complete 360° or may not be able to rotate more than 360°, due to connections that may need to be made in some embodiments to, for example, the root chambers, trellis, and the like. For example, a nutrient distribution system, heat exchanger system, and/or the like may be positioned stationary within the base of the grow pod, but may have one or more lines or tubing connected to the root zones. Accordingly, the angular rotational range of the turntable may desirably be limited mechanically so that these lines or tubes are not unnecessarily stretched or stressed. As another example, a heat exchanger or other mechanism that passes heated or cooled fluid to a trellis attached to the turntable may be positioned stationary in the base of the grow pod. Accordingly, a certain length of tubing may be used that enables the turntable to turn a certain amount; however, it may be desirable to mechanically limit the rotation of the turntable to within a certain range of rotation, so that the fluid tubing is not unnecessarily stretched or stressed.

Plant Training System

Most plants that may be grown in grow pod or plant growth systems as disclosed herein start as a seed, which sprouts a main stem that typically grows upward, and which, assuming nothing else affects it, will continue to grow upward and sprout lateral branches as it grows. In some embodiments of grow pods, particularly in embodiments that comprise multiple root chambers positioned around the circumference of a grow pod, such as, for example, the grow pods illustrated in FIGS. 1B and 1D, such a growth pattern may be acceptable and may even be desirable. However, in embodiments where a root chamber is positioned directly below an obstruction, such as a light source or light zone, such as the embodiment illustrated in FIG. 1A, such a growth pattern may not be desirable, because the main plant stalk would be growing directly into the bottom of the light tube. Accordingly, it may be desirable in some embodiments to train the plant to grow into a particular shape that may enable lateral branches of the plant to grow sideways outward from the opening of the root chamber, and then proceed upward once the lateral branches reach the trellis.

Figure 13A:
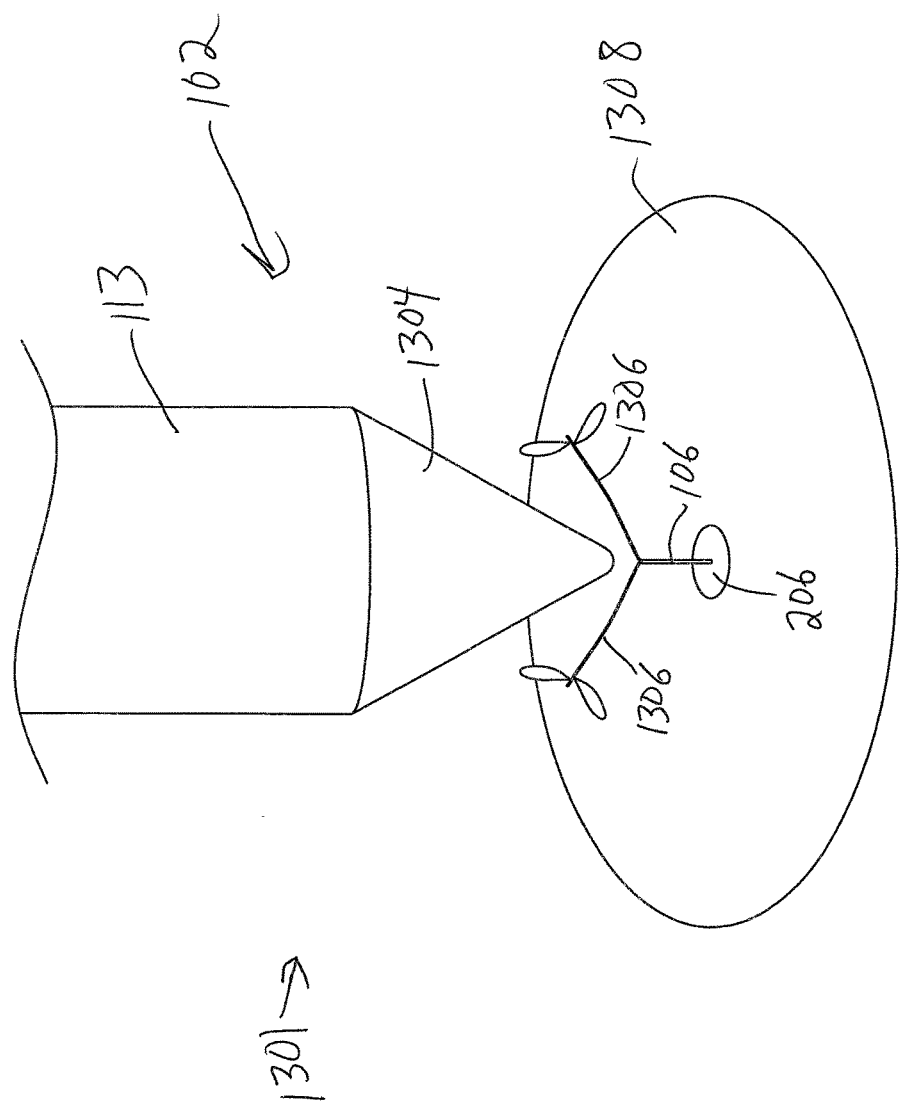
FIGS. 13A through 13C illustrate example embodiments of plant training systems for use with plant growth systems disclosed herein.
Figure 13C:
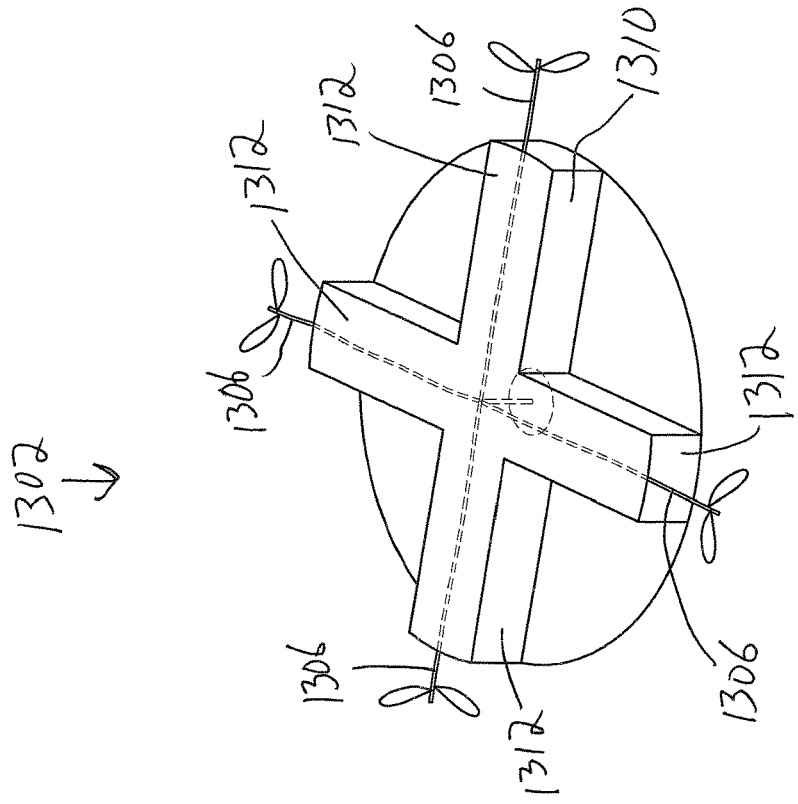
Figure 13B:
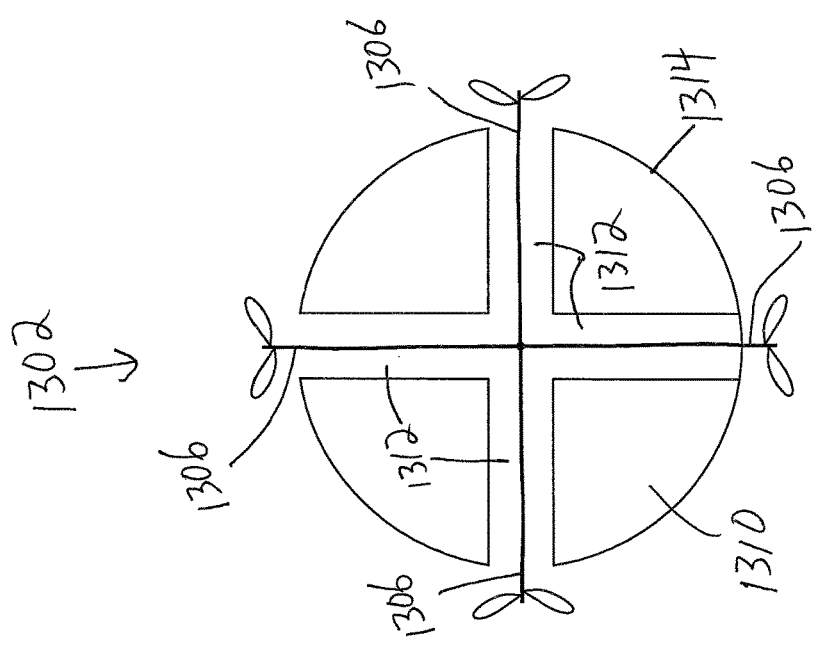

FIGS. 13A through 13C illustrate embodiments of plant training systems that accomplish the above benefit. Namely, these plant training systems 1301, 1302 automatically train lateral branches to grow sideways for a portion of their growth, and then upward at or about the trellis. FIG. 13A illustrates a cone version of a plant training system 1301. In this embodiment, this schematic diagram illustrates a portion of a canopy zone 102, such as the canopy zone 102 of FIG. 1A. This embodiment comprises a light tube or barrier 113 similar to as shown in FIG. 1A. This light tube 113 is centrally positioned in the canopy zone 102 and contains a light source, such as the light source 112 shown in FIG. 1A. However, instead of having a flat base to the light tube 113, as shown in FIG. 1A, the training system 1301 adds a cone-shaped base to the light tube 113. The cone-shaped base 1304 comprises desirably a transparent material, such as glass, transparent plastic, Plexiglas, Lexan, and/or the like, that enables light from the light source 112 to pass therethrough. In this embodiment, the transparent cone 1304 is approximately the diameter of the light tube 113 at its top end and narrows down to a smaller diameter and/or a point at its base.

The configuration illustrated in FIG. 13A can be desirable, because lateral branches 1306 of the plant 106 will be forced to grow outward by the cone 1304. By making the cone 1304 transparent, the branches 1306 will still be drawn to the cone, because they will be drawn to the light source. Accordingly, as the lateral branches 1306 grow, they will likely pass up along the edge of the transparent cone and then continue in an upward direction once they go beyond the transparent cone 1304. In some embodiments, the cone 1304 can lead into a trellis, desirably to guide the lateral branches 1306 to the outer side or radially outer side of the trellis, thus enabling the branches to grow upward on the exterior side of the trellis. In some embodiments, it can be desirable to cut off or pinch or remove the terminal bud or main plant stalk before it reaches the transparent cone 1304.

Any lateral branches 1306 that have sprouted below the point of pinching off the stalk will continue to grow outward, desirably guided by the cone. It should be noted that the illustrations in FIGS. 13A through 13C are simplified schematic diagrams of systems that may be incorporated into various other embodiments disclosed herein. For example, FIG. 13A illustrates a canopy chamber floor 1308 having an aperture 206 through which the plant stem 106 protrudes. Such a system may be incorporated into, for example, the system illustrated in FIG. 2 a, wherein the root system of the plant 106 protrudes below the opening 206 into a root chamber 104.

FIGS. 13B and 13C illustrate a different embodiment of a plant training system 1302. In this embodiment, instead of using a cone position below a light tube to guide the lateral branches 1306, a cross-shaped member 1310 is used. The cross-shaped member 1310 comprises a plurality of channels 1312 which are configured to guide the lateral branches 1306 radially outward. Desirably, an outer diameter 1314 of the cross shaped member 1310 is similar to a diameter of a trellis, such as the trellis 111 illustrated in FIG. 1A. Accordingly, the lateral branches 1306 can be caused to grow radially outward through the channels 1312, and turn upward to continue growing upward along the trellis. In some embodiments, the outer diameter 1314 of the cross shaped member 1310 is slightly greater than the diameter of the trellis, such as to ensure the lateral branches 1306 are guided to the radially outside or exterior portion of the trellis instead of an interior portion of the trellis.

Although the embodiment illustrated in FIGS. 13B and 13C comprises a cross shaped member 1310 having four channels 1312, various other embodiments may be used. For example, the number of channels may be, for example, two, three, five, six, seven, eight, nine, 10, or more. Further, in some embodiments, more than one lateral branch may be guided through the same channel. In some embodiments, the cross shaped member 1310 is made of or comprises a transparent material, such as glass, polymer, Plexiglas, Lexan, and/or the like. It may be desirable to use a transparent material to, for example, enable light from the internal light source to pass therethrough and reach the plant.

In some embodiments, at least some manual intervention is desired. For example, a system may be set up such that an operator of the system manually cuts off the main stalk of the plant and manually positions four lateral branches 1306 into the four channels 1312. In some embodiments, however, to limit the requirement of manual intervention, the system may be designed so that all or a significant portion of the plant training is performed automatically. For example, the system may comprise a blade, cutting mechanism, and/or the like that is configured to automatically pinch or cut off the main stalk of the plant once the system has determined that a sufficient number of lateral branches have begun growing. For example, the system may be configured to monitor the growth of the plant using a digital camera and image processing software to determine an appropriate time to cut off the main stalk of the plant. Further, in some embodiments, the system may comprise one or more movable arms or protruding members that can be actuated and caused to push a lateral branch to one side or another to force it to grow into one of the channels 1312 when the lateral branch first begins growing.

In some embodiments, a plant growing system as disclosed herein may be configured to have or operate in a seed germination mode and a normal growth mode. For example, when a plant is just starting out as a seed, and the main plant stalk has not yet protruded into the canopy zone, the system may be configured to be operated in seed germination mode, wherein the system controls the environment to be ideal for germination of the seed and growth of the initial plant stem or stalk. The system can be configured to detect when the plant stem or stalk begins protruding into the canopy zone, such as by detecting such growth with a digital camera, detecting that something has passed through the barrier between the root zone and canopy zone, and/or the like. Once this is detected, in some embodiments, the system can be configured to automatically switch to normal plant growth mode, wherein the environment is tailored to normal plant growth. In some embodiments, the system may be configured to gradually transition from seed germination mode to normal plant growth mode as the main plant stalk grows further into the canopy zone.

Root Trellis

As described elsewhere in this specification, various embodiments of plant growth systems or grow pods comprise one or more trellises in the canopy zone. These trellises in the canopy zone are configured to enable the plant to attach thereto and be relatively evenly distributed about the central light source. By using a trellis to distribute portions of a plant relatively evenly about the internal light source, the system can support efficient and/or accelerated growth of the plant canopy.

Figure 14A:
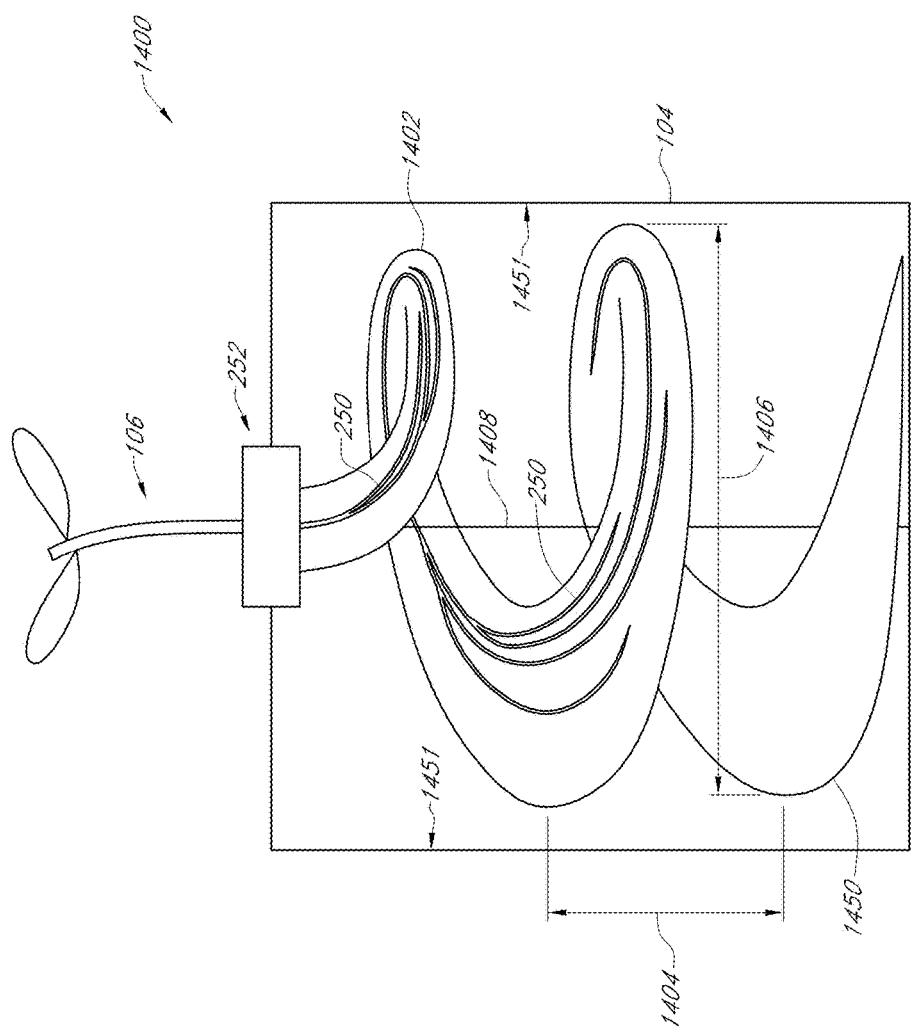

Similar concepts can apply to a root system of a plant being grown in, for example, the grow pods disclosed herein. FIGS. 14A and 14B illustrate two examples of root trellis systems 1400, 1401. These root trellis systems 1400, 1401 can be used to train the roots 250 to grow in a particular shape or along a particular path that can help to extend the length of the roots and/or spread them out to provide the most surface area for nutrient and/or oxygen uptake.

The schematic diagram shown in FIGS. 14A and 14B are similar to the schematic diagram shown in FIG. 2C and described above. For example, the root trellis systems 1400, 1401 comprise a root chamber 104 with a plant 106 extending upward therefrom and a root system 250 protruding into the root chamber 104. The portion of the plant 106 where the root system 250 begins is supported at an opening into the root chamber 104 by a growing medium and/or plant support structure 252. For simplicity, the systems illustrated in FIGS. 14A and 14B do not show other components of a typical root zone, such as temperature control and aeroponic nozzles. However, it would be understood by one of skill in the art that the root trellis systems 1400, 1401 may be used with any of the grow pods or plant growth systems disclosed herein.

In the embodiments illustrated in FIGS. 14A and 14B, the root trellis systems 1400, 1401 comprise a spiral shaped ramp or trellis 1402 extending downward from the grow medium or plant support 252. Such a spiral or helix shape can help to guide the roots 250 downward in a spiral or helix shape, thus enabling the roots to grow to a longer length than if there was no trellis 1402, yet still be relatively evenly distributed within the root chamber 104 to enable efficient nutrient and/or oxygen uptake.

In some embodiments, the trellis 1402 is made of or comprises a material that enables moisture to pass therethrough. Accordingly, nutrients that are introduced into the root chamber via an aeroponic nozzle, such as the air assisted nozzle 268 shown in FIG. 2C, can pass through the trellis 1402 if needed to be introduced to portions of the roots 250 that are abutting or adjacent the trellis 1402. In some embodiments, the trellis 1402 comprises a material that allows moisture therethrough but that does not allow the roots 250 to grow therethrough. In other embodiments, the trellis 1402 may comprise a material that does allow at least a portion of the roots 250 to grow therethrough. For example, the trellis 1402 may comprise a material having a porosity of a sufficient size to enable at least a portion of the roots 250 to grow therethrough. One advantage of such a design is that it may help for the root system 250 to maintain its shape about to the trellis 1402 if at least a portion of the root structure 250 can grow therethrough and thus attach to the trellis 1402.

In some embodiments, the lead or pitch 1404 of the helix shaped trellis 1402 is a constant number. For example, the lead 1404, meaning the amount of longitudinal advancement of the spiral shape in one revolution, is the same throughout the entire trellis 1402. In other embodiments, it may be desirable to have a variable lead 1404. For example, in some cases the root system 250 may as it moves downward from the top of the root chamber 104 to the bottom of the root chamber 104. Accordingly, to best utilize the space within the root chamber 104, it may be desirable to have a shorter lead at the beginning of the trellis 1402, such as near the grow medium or plant support 252, and a longer lead as the trellis 1402 approaches the bottom of the root chamber 104. Further, the diameter 1406 of the trellis 1402 may be variable. For example, the outer envelope or diameter 1406 of the trellis 1402 may be generally cone or funnel shaped, with a smaller outer envelope size 1406 near the top of the root chamber 104 and a larger outer envelope size or diameter 1406 near the bottom of the root chamber 104. Further, in some embodiments, the radial outer edge 1450 of the trellis 1402, such as the edge that defines the outer diameter 1406, may be in contact with, abutting, or form a part of a side wall of the root chamber 104. To put it another way, the trellis ramp 1402 may extend radially outward all the way to an interior wall surface of the root chamber 104. Such an embodiment may be desirable, for example, to make sure roots 250 cannot extend radially outward past or beyond the trellis ramp 1402 and thus extend vertically downward radially outside of the trellis 1402. In an embodiment where the trellis 1402 is spirally shaped and extends all the way to the side wall of the root chamber 104, the roots 250 may be forced to move downward in a spiral shape and may have no ability to bypass the trellis and fall directly vertically downward (unless there is a vertical path through the center of the ramp 1402, which there is in some embodiments, such as in FIG. 14B, but not in other embodiments, such as in FIG. 14A where the ramp 1402 extends radially inward to a central support 1408). One of the main differences between the embodiments illustrated in FIGS. 14A and 14B is that the embodiment of a trellis 1402 illustrated in FIG. 14A comprises an outer edge 1450 that is close to the wall of the root chamber 104 all around the trellis, but not completely touching the wall. The embodiment illustrated in FIG. 14B, however, illustrates an off-centered trellis 1402 that, in one area (the right side of FIG. 14B), is relatively close to the wall of the chamber 104, but is further from the wall at another area (the left side of FIG. 14B). Either of the designs shown in FIGS. 14A and 14B may be modified such that the outer wall 1450 extends all the way to the side wall 1451 of the root chamber.

In some embodiments, the trellis 1402 comprises a central support 1408, as shown in FIG. 14A (but not in FIG. 14B). The central support 1408 may be, for example, a rod or shaft that helps to maintain the structural rigidity of the trellis ramp 1402. In other embodiments, the spiral shaped trellis 1402 may comprise sufficient rigidity on its own that no central support 1408 is needed or desired.

Although FIGS. 14A and 14B illustrate a spiral or helix shaped trellis 1402, various other shapes may be used, as long as they achieve one or more of the benefits of increasing the length of the roots 250, more evenly distributing the root system 250 throughout the root chamber 104, increasing the surface area of the roots 250, avoiding denser clumping of the roots 250 in particular areas of the root chamber 104, and/or the like.

In some embodiments, the trellis ramp 1402 comprises a nonporous material, such as plastic, metal, and/or the like, that is shaped to provide a flow path for a liquid nutrient mix that may be fed from, for example, a flat nozzle or similar positioned at or near the top of the trellis 1402. In such an embodiment, the nutrient mix may be guided downward within the root chamber 104 by the trellis 1402, and caused to flow over or about the roots 250. In some embodiments, such a system is similar to the "nutrient film" hydroponic technique. In some embodiments, the trellis 1402 may comprise one or more baffles, raised edges, and/or the like that help to keep the nutrient mix from falling off of the spiral, helix, and/or the like path as the nutrient mix flows along the trellis 1402. In some embodiments, such a trellis may not be completely nonporous, but may be designed or configured to allow some nutrient mix to flow across it and some to pass through it. In some embodiments, the trellis ramp 1402 can be shaped or configured such that the nutrient stream flows evenly across the roots as it flows down to the bottom of the chamber. Once the nutrient mix reaches the bottom of the chamber, the remaining nutrient stream may, for example, enter a drain that directs the fluid to a reservoir or to waste. In some embodiments, the fluid that is directed to the reservoir is then pumped back up to the top of the root chamber 104 for reintroduction to the top of the trellis ramp 1402, potentially after having had additional nutrients added thereto. In some embodiments, more than one nozzle may be used to introduce a liquid nutrient mix at a plurality of locations along the ramp. For example, one or more nozzles may be positioned at the top of the ramp, and one or more nozzles may pee positioned at various other locations in the ramp below the top of the ramp.

In some embodiments, the trellis ramp 1402 may be temperature controlled in a way that causes condensation to form on the trellis ramp 1402. For example, nutrients may be introduced into the root zone 104 by an air assisted nozzle, such as the air assisted nozzle 268 illustrated in FIG. 2C, in a mist or gas form. The trellis ramp 1402 may, however, be configured to be at a lower temperature than the external environment and/or the mist introduced by the nozzle, thus causing some of the mist to condense on the trellis 1402, and then slide down the trellis 1402 as described above with reference to a liquid nutrient mix flow.

Root Cube Support

In a growing system or grow pod as disclosed herein, a plant that is being grown needs to be supported somehow. In traditional growing where cuttings are taken and rooted in rockwool, peat moss, rapid rooter plugs or the like, such as in hydroponics, the base of the plant stalk and the rooting cube is surrounded by a grow medium (e.g., crushed glass, glass bead, ceramic, and/or the like) which is contained within a net pot, coco coir pot, or bag. In an aeroponic system as disclosed herein, however, such a grow medium is not necessarily needed or desirable. However, it is still desirable in some embodiments to support the portion of the plant where the main plant stalk meets the root system.

Figure 15B:
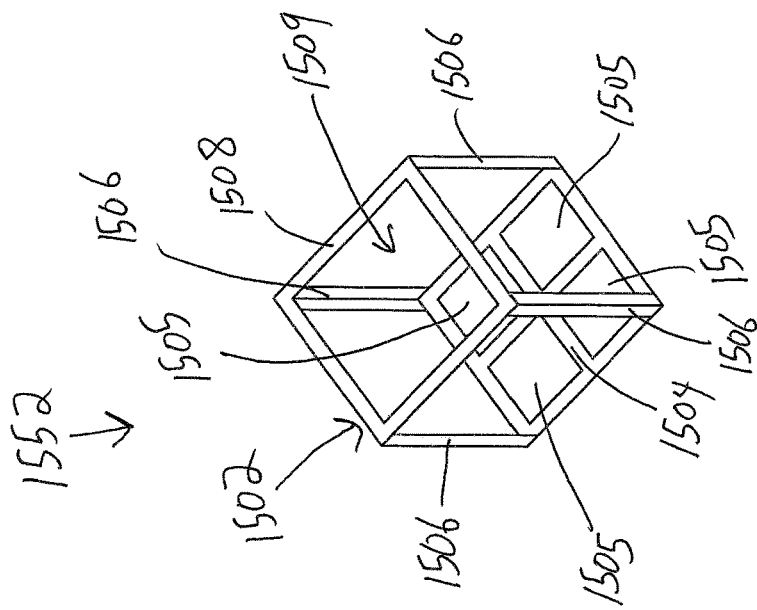
FIGS. 15A and 15B illustrate an example embodiment of a structure for supporting a plant root system.
Figure 15A:
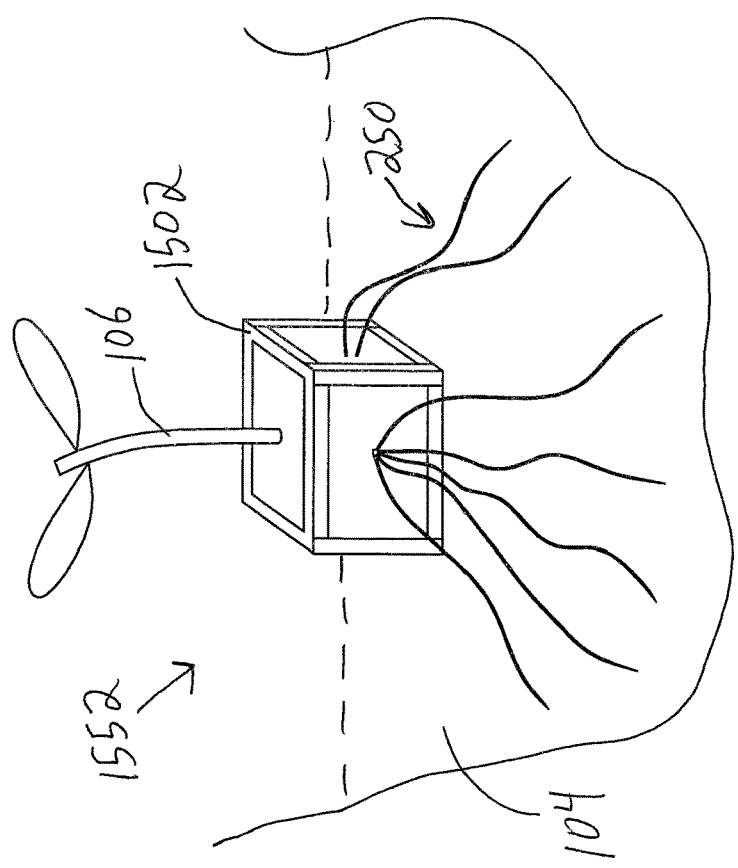

FIGS. 15A and 15B illustrate one embodiment of a plant support mechanism 1552 that can be used to support the main plant stalk 106 and root system 250 without needing a bag or container of grow medium. This plant support mechanism 1552 may be positioned as shown in FIG. 2C and FIGS. 14A and 14B with reference to the plant support 252 shown in those figures. Accordingly, the plant support mechanism 1552 may, for example, be positioned at a top of a root chamber 104.

In this embodiment, the plant support mechanism 1552 comprises a root cube 1502 that is of a generally cube shape. The root cube 1502 comprises base supports 1504 that form a plurality of openings 1505 to enable roots 250 to grow therethrough. Extending upward from the base supports 1504 are four vertical supports 1506. Top horizontal supports 1508 connect the vertical supports 1506. An opening at the top 1509 formed by four top horizontal supports 1508 allows the main plant stalk or stem 106 to extend upward therethrough.

One advantage of the design illustrated in FIGS. 15A and 15B is that the root cube 1502 can adequately support the plant stalk 106 and root structure 250 without needing any grow media that may be messy, require cleaning, require changing, and/or the like. In some embodiments, for example, the root cube 1502 is sized and shaped to support a rockwool (or other similar material) cube (or other shaped device) that supports the plant or clone. In some embodiments, a root cube or similar plant support mechanism 1552 is designed to be relatively minimalist or as minimalist as possible to perform the function of supporting a rockwool cube (or the like) while having as much open area for roots to grow therethrough. Also, one of skill in the art will recognize that a cube shape is merely one example of a shape that would work to support a plant without requiring a grow medium. For example, a plant support mechanism may be generally cylindrical in shape, rectangular, spherical, funnel or cone-shaped, and/or the like. Further, although the embodiment illustrated in FIG. 15B shows a relatively course grid of base openings 1505 for the roots 250 to pass therethrough, other embodiments may comprise a finer grid of openings, or even may use a porous mesh material, such as a wire screen and/or the like. It may be desirable, however, to utilize a relatively course grid of openings, particularly in a case where the root cube is supporting a cube of rockwool or other material, as opposed to a grow medium. When a grow medium, such as is typically used with hydroponics, is not used, the system can be configured to use a coarser grid and/or to have more and/or larger openings for roots to pass therethrough. For example, the grid may be sized to adequately support one or more of a standard rockwool cube size which may be, for example, 1"×1", 1.5"×1.5", 2"×2", 3"×3", 4"×4", 5"×5", 6"×6", or larger. In some embodiments, the horizontal sides created by the vertical supports 1506 may comprise one or more cross members that create a grid of openings and/or the sidewall may comprise a porous mesh, such as a wire screen, and/or the like. However, as with the base openings, it may be desirable in some embodiments to use a courser opening configuration that is sufficient to support a rockwool cube or similar, but allows easy root growth therethrough.

Door Locking Systems

In some embodiments, it may be desirable to lock the doors that open into the canopy zone of a growing system. This may be desirable for a variety of reasons. For example, it may be desirable to limit curious individuals from opening the doors of a canopy chamber and/or from accidentally opening the doors of a canopy chamber, since this may disrupt the internal environment of the canopy chamber and, for example, cause increased energy usage to get that internal environment back to its ideal properties after the doors are re-closed. As another example, if a plant being grown is of a relatively high value and or is being grown for research purposes and needs a controlled environment, it can be desirable to limit access to the canopy chamber to only specific individuals.

Figures 16A, 16B:
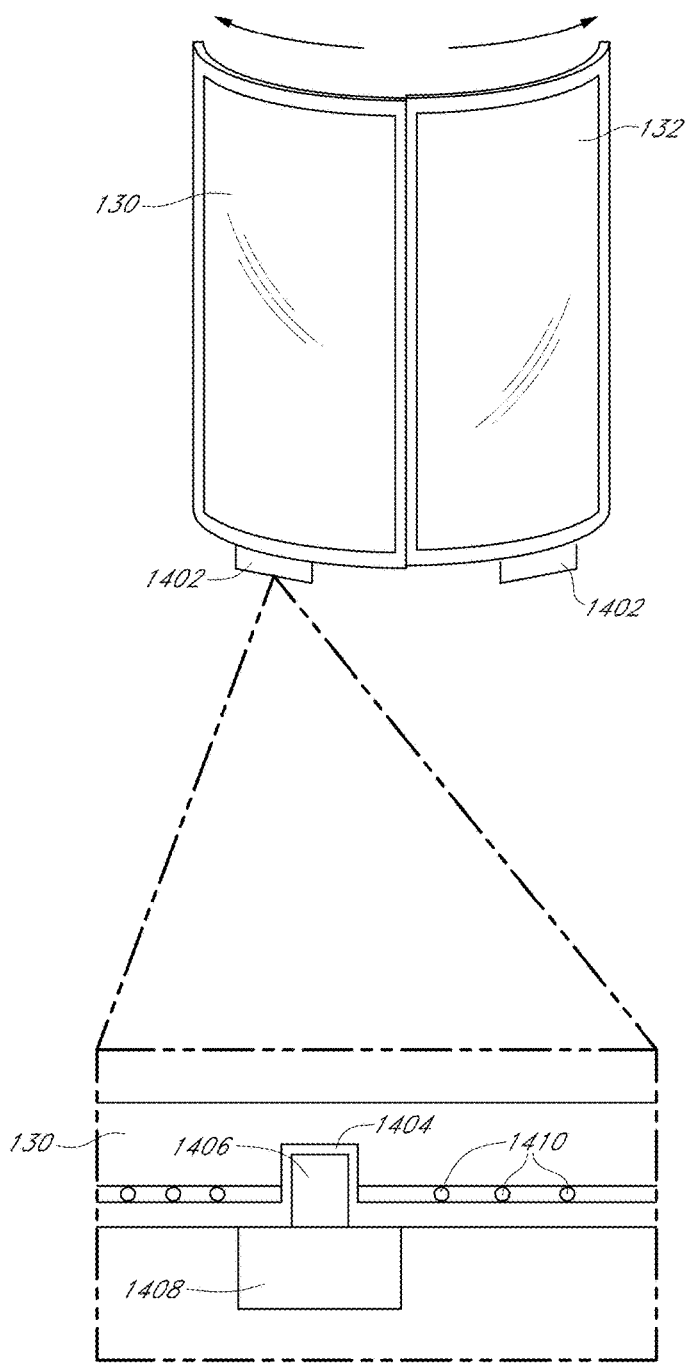
FIGS. 16A and 16B illustrate an example embodiment of a door locking system for use with plant growth systems disclosed herein.

Accordingly, various embodiments of plant growth systems or grow pods as disclosed herein may comprise one or more locking mechanisms are systems that selectively lock or restrict access to the canopy zone, such as the canopy zone 102 illustrated in FIGS. 1A, 1B, and 1D. FIGS. 16A and 16B illustrate one example embodiment of such a locking system. The locking system illustrated in FIGS. 16A and 16B may be used with, for example, a sliding door arrangements, such as shown in FIG. 1C. With reference to FIG. 16 a, the locking system comprises an outer sliding door 130 and an inner sliding door 132. Each of these doors comprises or is adjacent to a locking system 1402. FIG. 16 B illustrates an exploded view of one of the locking systems 1402. The locking system 1402 comprises an electronic deadbolt mechanism comprising a deadbolt 1406 that is controlled by an actuator 1408. The actuator 1408 may desirably be electronically controlled, although in some embodiments the actuator 1408 may comprise a manual override that enables someone to manually move the deadbolt if needed. The base of the door 130 comprises a bowl to catch 1404 sized or configured for the deadbolt 1406 to protrude into it. FIG. 16 B also illustrates a plurality of ball bearings 1410 that, for example, enable reduced friction sliding of the doors 130, 132.

When the deadbolt 1406 is protruding into the boat catch 1404, the sliding doors are restricted from sliding. Accordingly, when the deadbolt 1406 is protruding into the base of the door, the canopy chamber is locked and not accessible by an operator. Although the embodiment illustrated in FIGS. 16 a and 16 B comprises an electronic deadbolt locking mechanism, one of skill in the art will recognize that various other locking methods may be used. For example, various grow pods or plant growth systems disclosed herein may comprise a magnetic lock, a deadbolt arrangement that is positioned at a different place of the door, a mechanism that locks the doors to each other instead of two a frame of the grow pod, and/or the like. Further, although the present embodiments have been described with respect to a locking mechanism for the canopy chamber doors, one or more locking mechanisms may also be used to restrict access to other portions of the grow pod. For example, the cavity 108 illustrated in FIG. 1 a may comprise an access port that enables an operator to access the cavity 108. That access port may be a locking port to restrict access thereto.

Air Circulation and Purification System

Because plant growth systems or grow pods disclosed herein desirably comprise a controlled environment for the plant canopy, it can be desirable to include an air circulation system that helps to circulate air throughout the canopy chamber. By circulating air throughout the chamber, such as canopy chamber 102 illustrated in FIG. 1A, the environmental variables can be more consistent. For example, the temperature within the canopy zone can be more consistent throughout the canopy zone if the air within the canopy zone is being circulated. Further, airflow throughout the canopy zone may, for example, help to distribute carbon dioxide that is emitted by a carbon dioxide emitter, such as described above with reference to FIGS. 9 a and 9B. In some embodiments, it can also be desirable to utilize an air purification system that helps to remove contaminants from the air within the canopy zone. In some embodiments, the air purification system comprises odor reducing or eliminating properties, such as by using carbon filters or ozone. Odor reducing or eliminating properties may be desirable, such as to reduce or eliminate odors that may escape from the grow pod, either through a leak in the system or when a door into the canopy zone is opened.

Figure 17A:
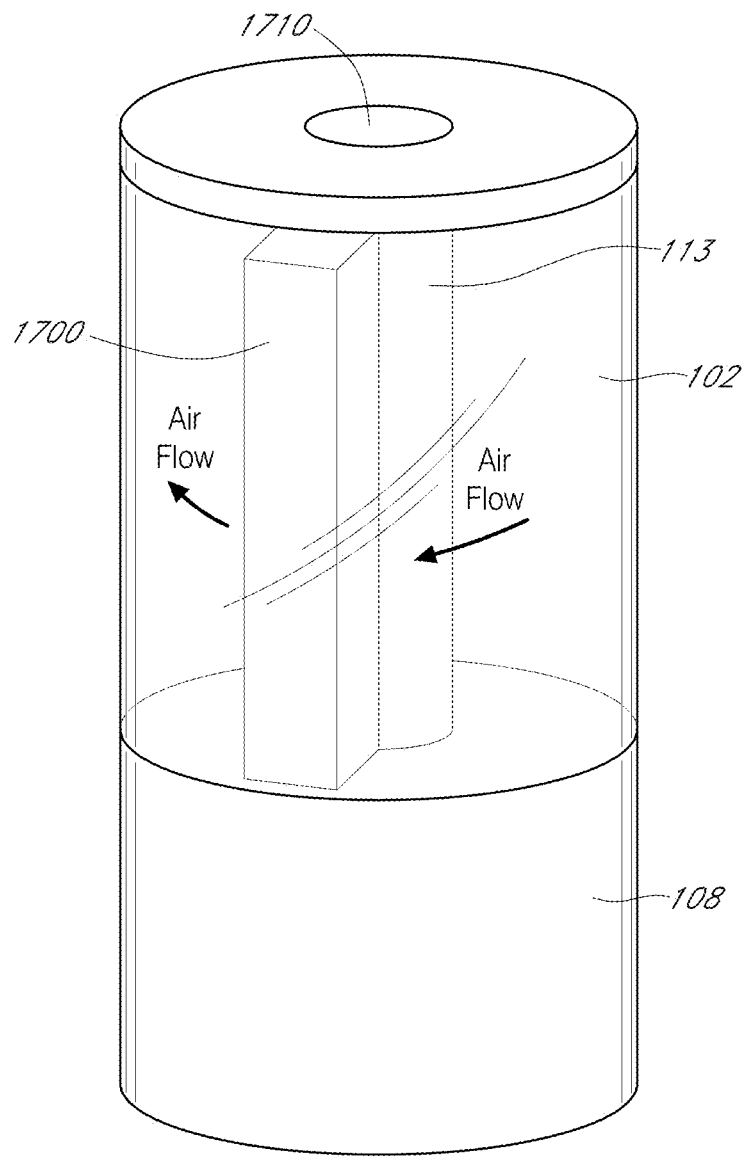
FIGS. 17A and 17B illustrate an example embodiment of an air circulation and purification system for use with plant growth systems disclosed herein.
Figure 17B:
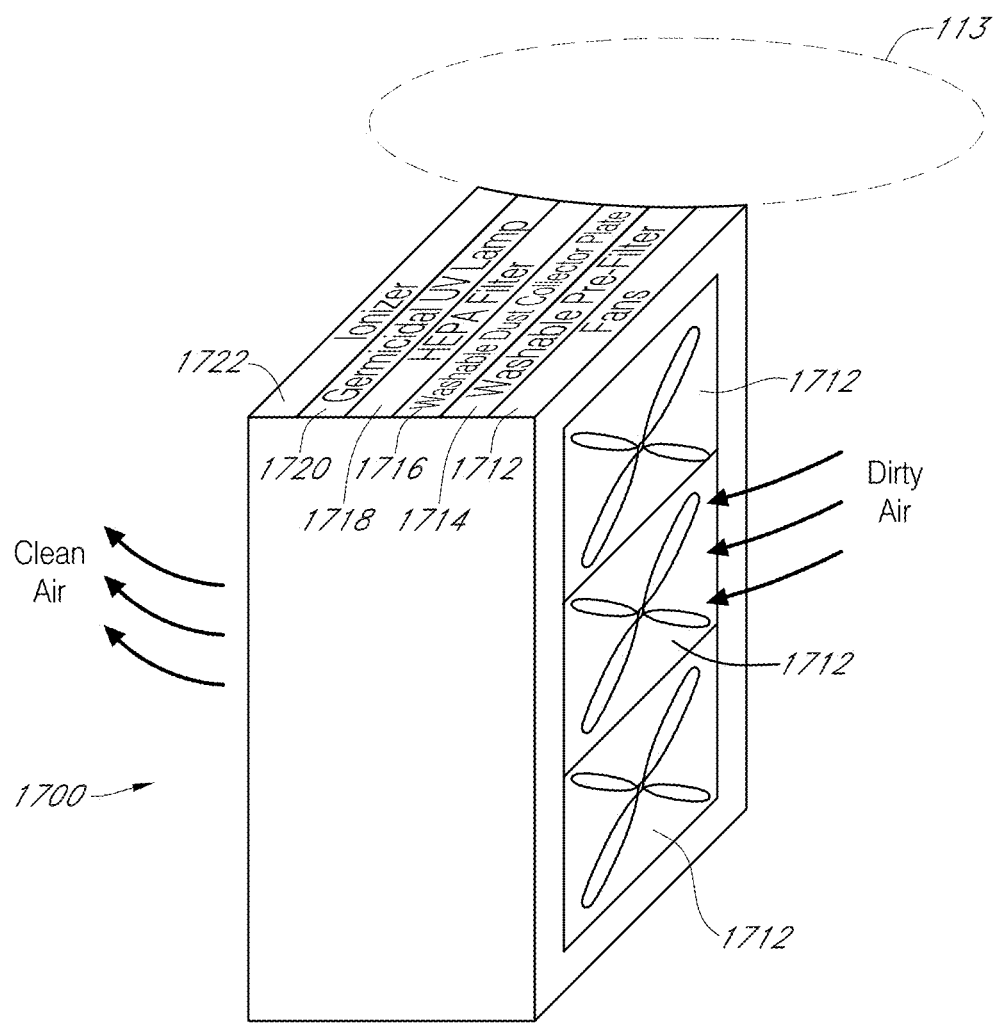

FIGS. 17A and 17B illustrate one example of an air circulation and purification system 1700. In this embodiment, the air circulation and purification system 1700 comprises a generally rectangular shape that fits with in a generally cylindrically shaped canopy zone 102, similar to the canopy zone 102 illustrated in FIG. 1A. In this embodiment, the air purification and circulation system 1700 extends from the top to the bottom of the canopy chamber 102 and also from the outer wall to the light tube or barrier 113. Accordingly, this embodiment of an air circulation system 1700 essentially seals off a portion of the canopy chamber 102, thus enabling efficient circular flow of air and recirculation of that air within the canopy chamber 102.

With reference to the expanded view in FIG. 17B, the air circulation and purification system 1700 comprises a plurality of fans 1712 that are configured to suck air in at the right side, force that air through a plurality of filters or other functional modules 1714, 1716, 1718, 1720, 1722, and out the left side of the system 1700. With reference to FIG. 17A, the air then proceeds clockwise about the interior of the canopy chamber 102, and ends up back at the entrance to the air circulation system. Although not explicitly shown in FIG. 17B, one or more of the functional modules may comprise odor reducing, scrubbing, or eliminating properties, such as by using carbon filters and/or ozone generators. Further, in other embodiments, the direction of airflow may be different (for example, counterclockwise) and/or the fans 1712 may pull air through the system 1700 instead of, or in addition to, pushing air through the system 1700.

In this embodiment, the filters or functional modules comprise a washable prefilter 1714, washable dust collector plate 1716, HEPA filter 1718, germicidal UV lamp 1720, and ionizer 1722. These modules work together to purify and/or clean the air that passes therethrough. In some embodiments, one or more of these modules are replaceable and or cleanable. Further, in some embodiments, fewer or greater functional modules are utilized.

Although the embodiment illustrated in FIGS. 17 a and 17 B illustrates a generally rectangular shaped apparatus 1700 that causes counterclockwise flow of air throughout the canopy chamber 102, various other configurations are envisioned. For example, a configuration similar to as shown in FIG. 17 a may be used, but to the apparatus 1700 may not extend all the way to the ceiling, floor, light tube 113, and/or outer wall of the canopy chamber 102. Further, more or less fans 1712 may be used. In some embodiments, as illustrated in FIG. 17 a, the grow system comprises an exhaust 1710 which enables heat from the light tube 113 to be exhausted therefrom. This can be helpful, for example, such as to not introduce that heat into the canopy chamber 102.

In some embodiments, instead of positioning the fans 1712 and/or functional modules 1714, 1716, 1718, 1720, 1722 within the canopy zone or chamber 102, one or more of these items may be positioned outside of the canopy chamber 102. For example, one or more of these features may be positioned in a tunnel that passes above or below the canopy chamber 102, similar to as shown in FIG. 19 a, described below, which illustrates an air inlet and air outlet in a base of the canopy chamber.

Positive Pressure System

As mentioned above, it can be desirable to minimize disruptions to the internal environment within the canopy chamber, so that the environment within the canopy chamber can be precisely controlled. However, there may be various instances where an operator needs to access the canopy chamber, such as to reposition the plant canopy, perform pruning, harvest crops, and/or the like. When a plant is being grown, but an operator opens the door to access the pod, there is a danger that contaminants from the external environment could be introduced into the internal canopy chamber environment. One solution to such a problem is to include a positive pressure system that generates a higher relative pressure within the canopy zone than the ambient pressure of the external environment. Accordingly, when the doors are opened, air will be caused to exit from the canopy chamber instead of being introduced into the canopy chamber, thus reducing the risk that contaminants from the external environment enter the canopy zone through the opening created by the doors.

Figure 18A:
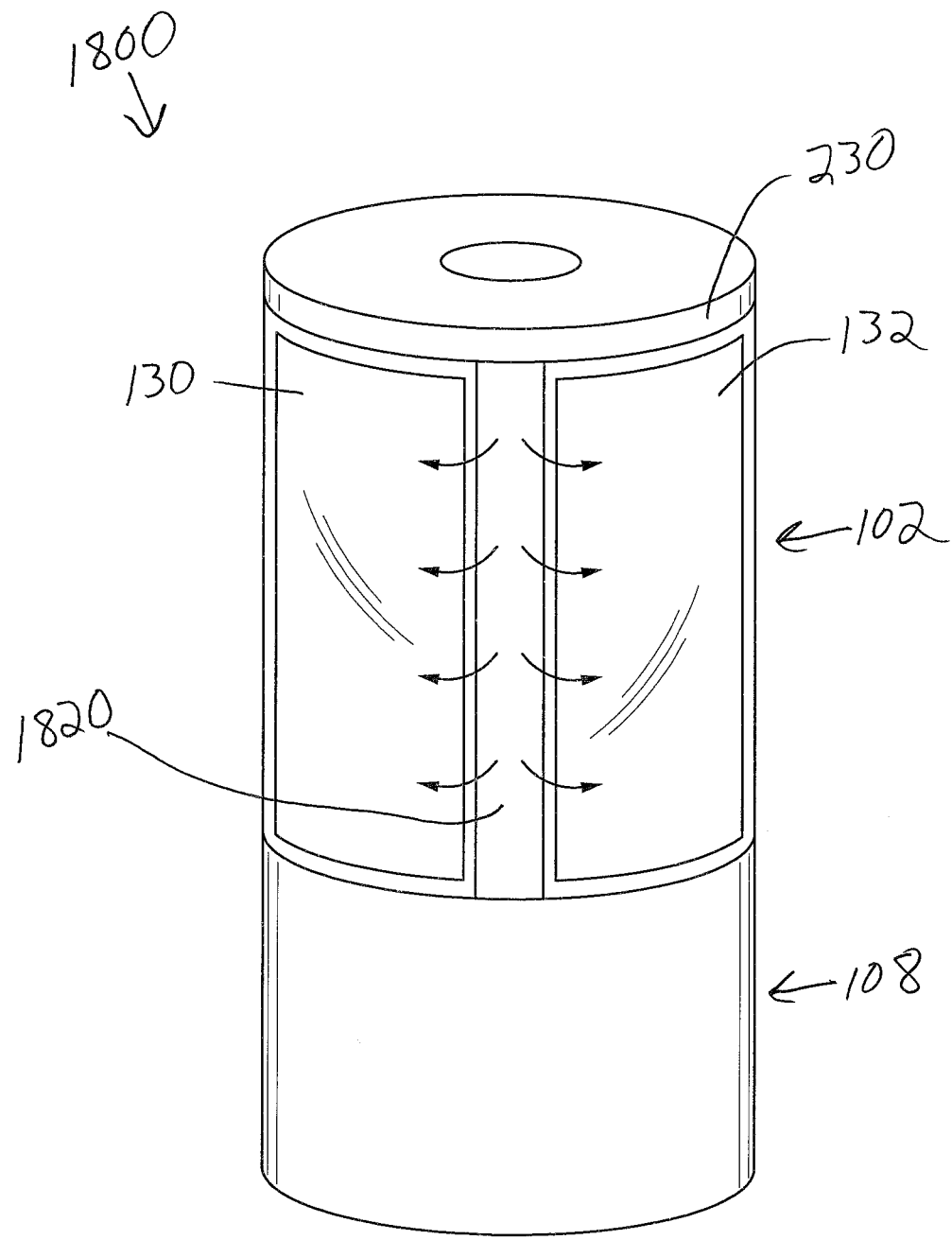
FIGS. 18A and 18B illustrate an example embodiment of a positive pressure system for use with plant growth systems disclosed herein.

FIGS. 18 a and 18 B illustrate one example of such a positive pressure system. The system is shown as it would be used with, for example, a cylindrical grow pod as illustrated in FIGS. 1A, 1B, 2A, and 2B. The concepts disclosed herein may be used with any plant growth systems or grow pods disclosed herein, however. With reference to FIG. 18A, sliding doors 130 and 132 are shown slightly opened such that there is a gap 1820 between the doors that is an opening into the canopy chamber 102. As shown in FIG. 18A, the positive pressure system has been activated, and air is flowing out through the gap 1820.

Figure 18B:
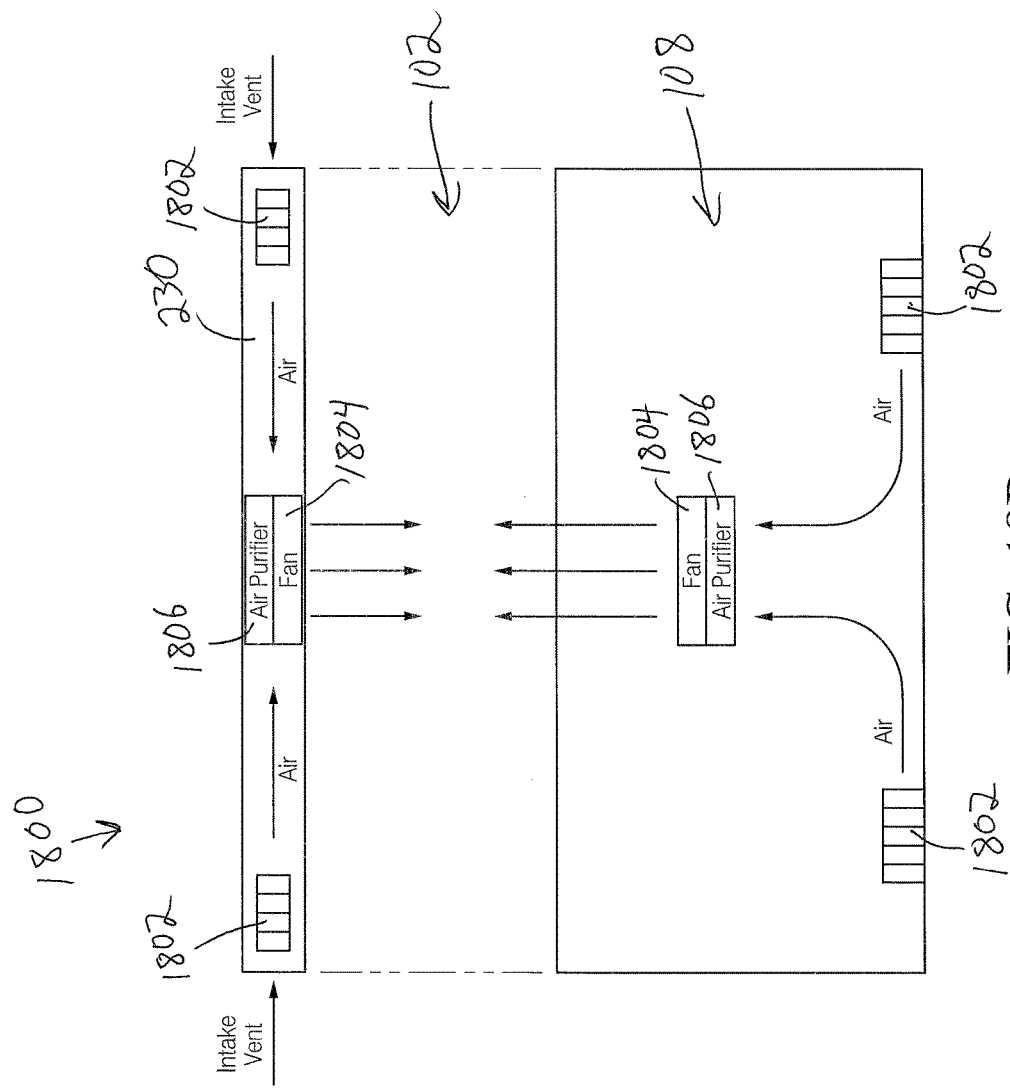

FIG. 18B illustrates a schematic view of the internal workings of the positive pressure system of this embodiment. The positive pressure system 1800 comprises a plurality of intake vents 1802 which lead, such as through ducting, to a fan 1804 that causes air to be sucked in through one or more of the intake vents 1802 and transferred into the canopy chamber 102. This sucking in of air from the external environment and forcing it into the canopy chamber 102 will generate a higher relative pressure in the canopy chamber 102 than the external environment. Accordingly, when the doors 130, 132 are opened, that higher pressure will cause air to be expelled from the canopy chamber instead of introduced into the canopy chamber through the gap 1820.

In some embodiments, the positive pressure system 1800 comprises one or more air purifier mechanisms 1806 that clean and/or purify the air from the external environment prior to introducing that air into the canopy chamber 102. This can be a desirable feature, because sucking air in through the intake vents 1802 and directly passing it into the canopy chamber 102 without cleaning or purifying it may defeat the purpose of the positive pressure system, which is to prevent contaminants from the external environment from being introduced into the canopy chamber 102. Although the schematic diagram of FIG. 18 B illustrates a single block for the air purifiers 1806, the air purification mechanism may comprise a plurality of filters and/or functional modules, similar to as shown in FIG. 17 B and described above, which work together to clean, purify, and/or otherwise process the air before introducing it into the canopy chamber 102.

In some embodiments, a positive pressure system, such as the positive pressure system 1800, can be configured to be activated by a sensor that senses the doors are being opened. This can be desirable, such as to reduce energy consumption of the grow pod. For example, if the positive pressure system or running when the doors are closed, that may waste energy. However, in some embodiments, it may be desirable to run the positive pressure system at at least a minimum level, such as running the fans 1804 at a relatively low speed, to compensate for any leaks in the system that may make the canopy chamber 102 not completely airtight. In some embodiments, the system may comprise one or more pressure sensors that detect the pressure of the canopy chamber 102 and/or the relative pressure of the canopy chamber 102 with respect to the external environment. The system may be configured to, for example, selectively activate the positive pressure system 1800 as needed to maintain a higher pressure in the canopy chamber 102 than in the external environment. In a case where the canopy chamber 102 is completely airtight, and there are no leaks to the external environment, this may mean that the positive pressure system 1800 is activated once to increase the pressure within the canopy chamber 102, and the positive pressure system does not need to be activated again until an operator desires to open the doors into the canopy chamber 102. In a case where the canopy chamber 102 is not airtight, such as where there are at least some leaks to the external environment, either intentionally or unintentionally, the positive pressure system 1800 may be caused to operate more regularly and or in some embodiments operate continuously, at least at a relatively low level.

In some embodiments, the positive pressure system can be incorporated into an air circulation system, such as the air circulation system 1700 illustrated in FIGS. 17A and 17B. For example, the air circulation system 1700 illustrated in 17B may comprise a duct that opens to the outside environment, and that duct may include one or more solenoid valves that enable the system to selectively open or close access to the duct that opens to the outside environment. Accordingly, when the pressure within the canopy chamber 102 does not need to be increased, the duct to the outside environment can be sealed off. However, when the pressure within the canopy chamber 102 needs to be increased relative to the outside environment, the duct may be opened, and thus the air purification system 1700 may be able to suck some air in from the external environment, pass that air passed of the various functional modules 1714 through 1722, and introduce the new air into the canopy chamber 102, thus increasing the relative pressure in the canopy chamber.

Recirculating Humidity Control System

Another environmental parameter that can be desirable to be controlled within the canopy chamber is the relative humidity within the canopy chamber. In some embodiments, a standard humidifier and/or a standard dehumidifier may be used in conjunction with a control system to control the ambient humidity within the canopy chamber. However, some embodiments may utilize a unique recirculating humidity control apparatus that enables controlling of the humidity in the canopy chamber while also reducing energy and/or resource consumption. One way such a system reduces energy and/or resource consumption is by collecting any water taken out of the environment by a dehumidifier and then using that water by a humidifier to reintroduce it into the environment when additional humidity is desired.

Figure 19A:
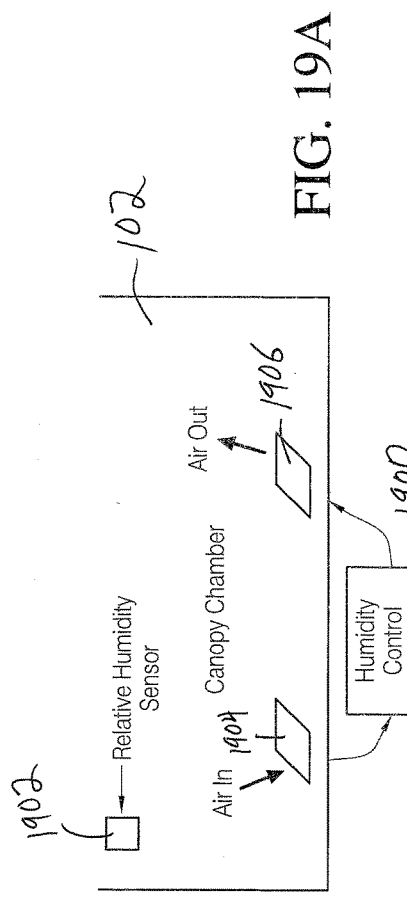
FIGS. 19A and 19B illustrate an example embodiment of a recirculating humidity control system for use with plant growth systems disclosed herein.
Figure 19B:
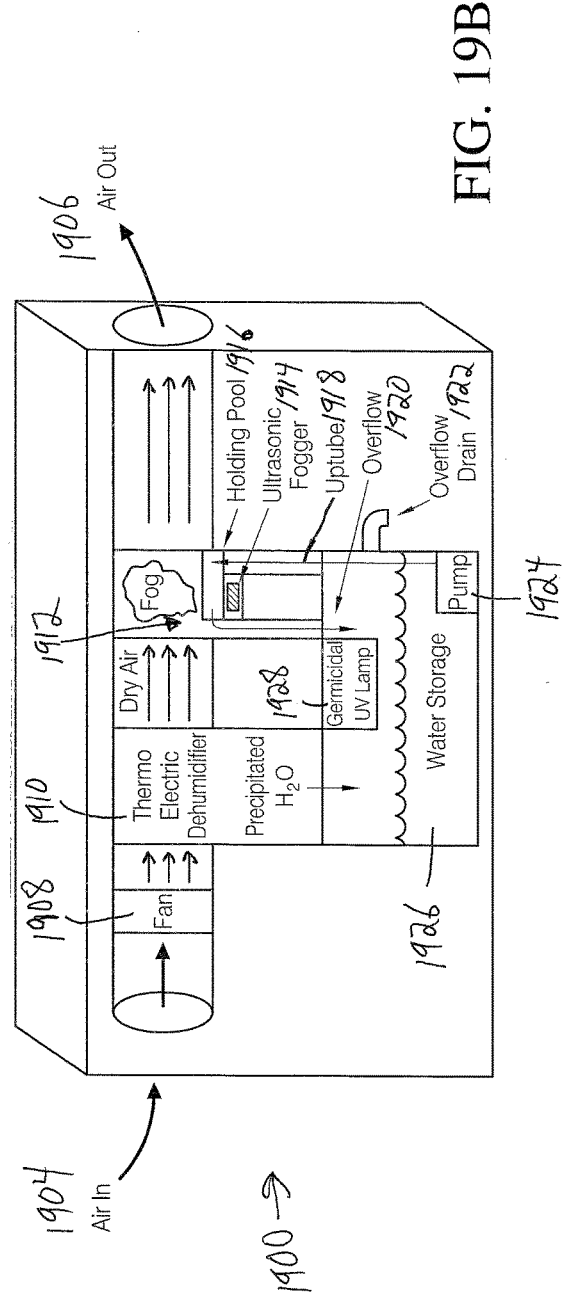

FIGS. 19A and 19B illustrate one example of such a humidity control system or apparatus 1900. The humidity control system 1900 may be used with any of the plant growth systems or grow pods disclosed herein. FIG. 19A is a schematic diagram that illustrates a bottom portion of a canopy chamber 102. The canopy chamber 102 comprises a relative humidity sensor 1902 which is configured to detect the present humidity in the canopy chamber. The canopy chamber 102 further comprises one or more air inlets 1904 and one or more air outlets 1906 which enable air to pass into and out of the humidity control apparatus 1900.

FIG. 19B illustrates an exploded schematic diagram of the internal workings of the humidity control apparatus or system 1900. In this embodiment, air enters at the air inlet 1904 on the left, and exits to return to the canopy chamber at the air outlet 1906 on the right side of the device. When air enters the humidity control apparatus 1900, a fan 1908 sucks the air in and can also be caused to blow the air out the exit 1906. In other embodiments, more than one fan may be used. In this embodiment, the air first passes through a dehumidifier 1910 and then passes through a humidifier 1912, before exiting at the outlet 1906. Depending on the present requirements of the canopy zone 102, either the dehumidifier 1910 or the humidifier 1912 will be activated to either extract moisture from the air or introduce moisture to the air, respectively.

The dehumidifier 1910 in this embodiment is a thermoelectric dehumidifier. In other embodiments, different types of dehumidifiers may be used. When the dehumidifier 1910 extracts moisture from the air, that moisture or precipitated water falls into the storage chamber 1926 where it remains for use by the humidifier 1912. In some embodiments, the system comprises one or more purification or sanitation features that clean the water in the storage tank 1926 before reintroducing it through the humidifier 1912. For example, this embodiment comprises a germicidal ultraviolet lamp 1928.

The embodiment illustrated in 19B comprises an ultrasonic humidifier 1912. The humidifier 1912 comprises a pump 1924 which pumps water from the storage tank 1926 up to a holding pool 1916. An ultrasonic fogger 1914 causes water in the holding pool 1916 to turn into fog which can be directed into the airstream to add moisture to air passing by. Water can be pumped up to the holding pool through up to 1918, and can overflow 1920 back down into the water storage tank 1926. Although this embodiment utilizes an ultrasonic humidifier, various other embodiments may use other types of humidifiers. Further, in various embodiments, the recirculating humidifier in dehumidifier concepts disclosed herein may be combined with other systems disclosed herein. For example, the dehumidifier in and humidifier in features may be combined with, for example, the air circulation and purification system 1700 illustrated in FIGS. 17 a and 17 B.

Self-Cleaning System

As discussed above, it can be desirable in some embodiments to minimize the requirement for a user or operator to open the canopy chamber and/or to manually intervene with processes performed by the plant growth system or grow pod. One other way to accomplish this is to incorporate one or more self-cleaning systems that are configured to clean and/or sanitize the grow pod.

Figure 20:
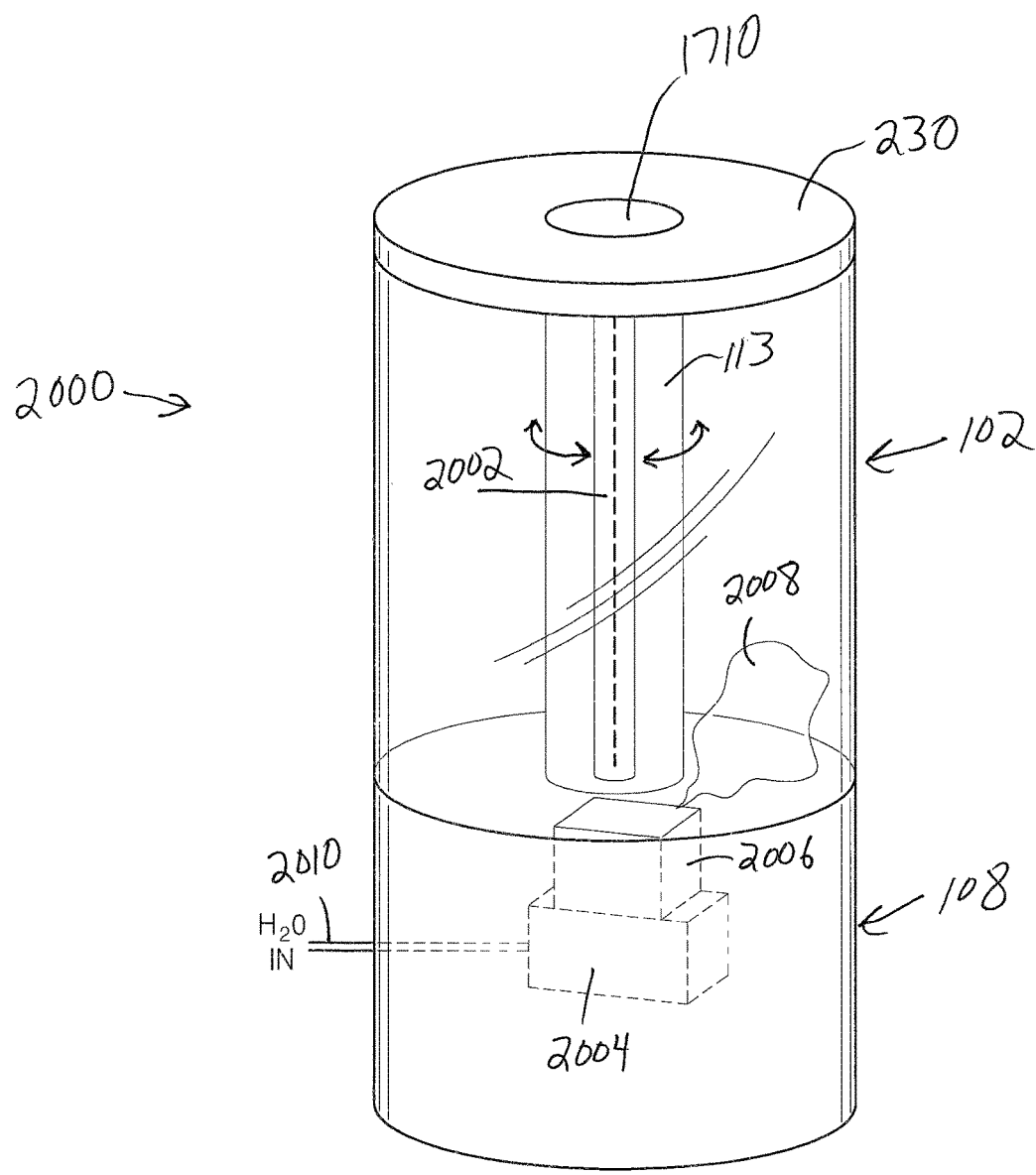
FIG. 20 illustrates an example embodiment of a self-cleaning system for use with plant growth systems disclosed herein.

FIG. 20 illustrates one example of such a self-cleaning system 2000. In this embodiment, the self-cleaning system 2000 comprises two separate methods of cleaning and/or sanitation. First, the light tube 113, which may be similar to light tubes or internal light sources discussed elsewhere in this application, may comprise one or more germicidal ultraviolet LED lights. For example, the embodiment illustrated in FIG. 20 comprises a germicidal UV LED light bar 2002. This lightbar 2002 may be, for example, one of the individual light modules 602 that come together to form the cylindrical light source illustrated in FIG. 6D. In some embodiments, the light source and/or light tube may be configured to rotate, such as under the power of a motor, such that the germicidal ultraviolet lights can be caused to impinge on the entire or substantially the entire internal area of the canopy chamber 102.

Another cleaning or sanitation method illustrated in FIG. 20 is a steam generator 2004. The steam generator 2004 takes water at a water inlet 2010 and generates steam that exits through a steam vent 2006 into the canopy chamber 102. The hot steam 2008 within the canopy chamber 102 can help to clean and/or sanitize the canopy chamber 102.

Although the embodiment illustrated in FIG. 20 comprises two different cleaning and/or sanitation mechanisms, namely germicidal ultraviolet light and hot steam, other embodiments may comprise only one of these and/or may comprise a different combination of cleaning and/or sanitation methods. Further, although the embodiment illustrated in FIG. 20 illustrates cleaning or sanitation of the canopy chamber 102, similar concepts may be used for other portions of the grow pod, such as for the root chambers, such as the root chamber 104 illustrated in FIG. 1 a.

Integrated Pest Control System

Figure 21A:
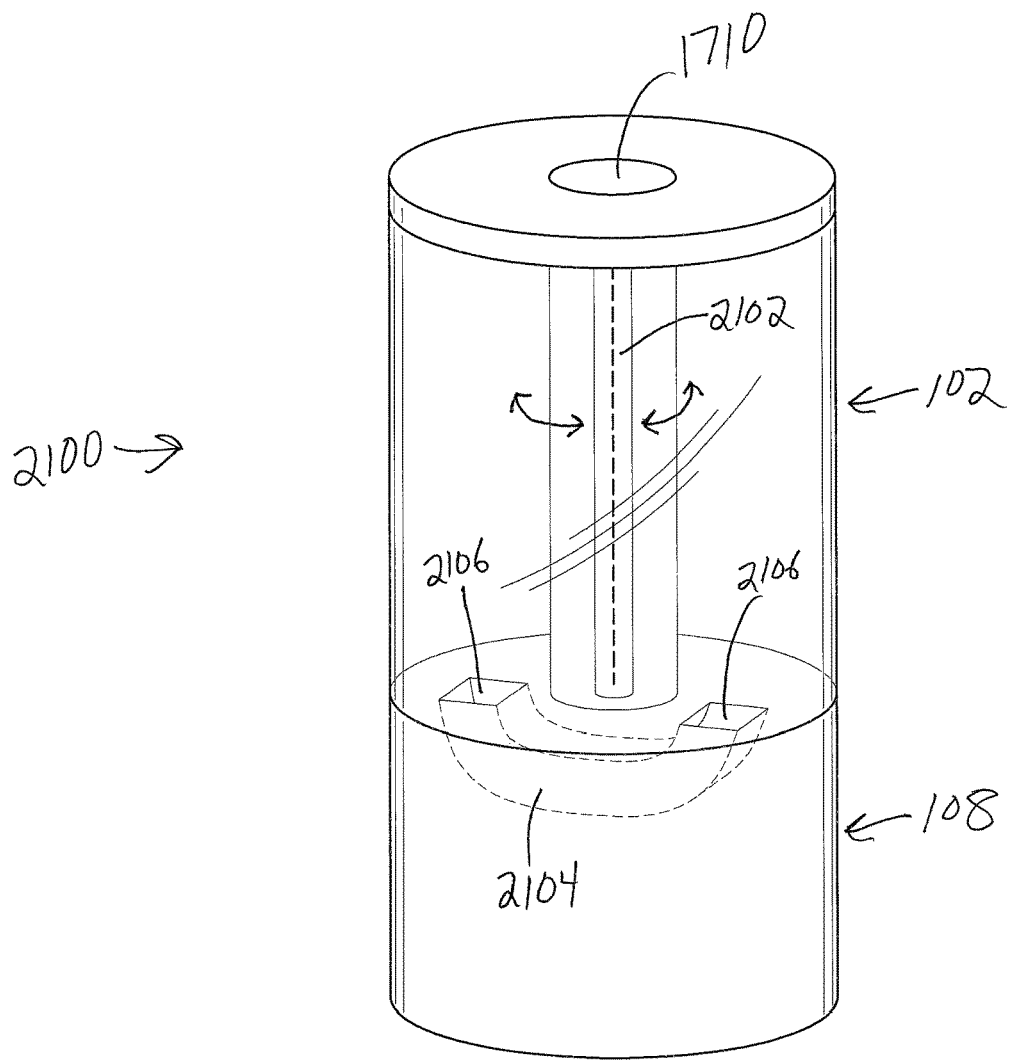
FIGS. 21A and 21B illustrate example embodiments of pest control systems for use with plant growth systems disclosed herein.
Figure 21B:
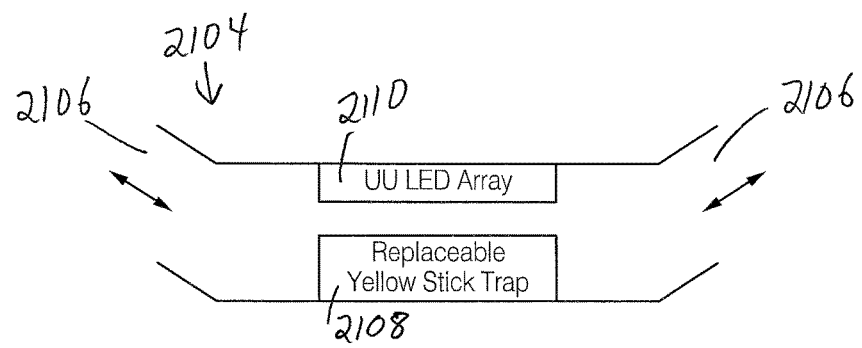

In some embodiments, it can be desirable to capture and/or eliminate pests, such as insects, that may be present within the canopy chamber 102 of a plant growth system or grow pod as disclosed herein. FIGS. 21A and 21B illustrate one embodiment of an integrated pest control system 2100. The pest control system 2100 includes two different methods of pest control. The first is a rotating UV LED bar 2102 that can be configured to introduce ultraviolet light into the canopy chamber 102 that is of a wavelength, intensity, or type that is not harmful to the growth of the plants, but that repels insects. The rotating ultraviolet LED bar 2102 may be similar to, for example, the germicidal ultraviolet LED bar 2002 illustrated in FIG. 20. In some embodiments, the rotating ultraviolet LED bars 2002 and 2102 may be the same LED bar and may be configured to output the same type of ultraviolet light in the cleaning or sanitation procedure as with the pest control procedure, or may be configured to output a different type of light and/or a different intensity of light for the two different procedures.

The integrated pest control system 2100 further comprises a past tunnel 2104 having one or more entrances there to 2106. The past tunnel 2104, as illustrated in FIG. 21B, comprises a ultraviolet LED array 2110 which can be configured to attract pests there too. The past tunnel 2104 can also comprise one or more features that trap and/or kill the pests or insects once they are in the tunnel. For example, in this embodiment, the pest a little 2104 comprises a replaceable yellow sticky trap 2108 that traps the insects or pests once they enter the past tunnel 2104 and does not let them out. In other embodiments, additional and/or different mechanisms may be used, such as an electrical bug zapper, and/or the like.

In some embodiments, the integrated pest control concepts disclosed herein may be combined or integrated into other systems or subsystems of the plant growth systems or grow pod's disclosed herein. For example, the concepts of the past tunnel 2104 may be incorporated into, for example, the air circulation and purification system illustrated in FIGS. 17A and 17 B, the recirculating humidity control system illustrated in FIG. 19 B, and/or the like.

Drying System

In traditional growing of many plants, the plants are harvested by cutting the branches down and then hanging them upside down in a controlled environment to allow them to dry out. Various embodiments of plant growth systems disclosed herein, however, can increase the efficiency of this process, reduce the requirement for operator intervention, decrease the cost of growing and harvesting plants, and/or the like by incorporating automated drying systems and techniques that enable drying of the plants in situ.

In some embodiments, a plant growth system as disclosed herein can be configured to have a drying cycle that is either manually enabled or automatically enabled when the system detects that drying is needed, such because the plants are ready for harvest. When the drying cycle is activated, the system can be configured to turn off or disable the aeroponic systems, such as by ceasing introduction of moisture and/or nutrients into the root pods, which can allow the plant roots and therefore also the plant canopy to begin to dry out in situ. In some embodiments, the cutting off or disabling of moisture introduction into the root zone is immediate. In some embodiments however, the cutting off or disabling of introduction of moisture into the root zone is gradual. Further, in some embodiments, instead of just disabling or ceasing introduction of new moisture into the root zone, a dehumidification system is used to actively extract moisture and reduce the humidity in the root chamber. Such a system can accelerate the drying process.

In some embodiments, temperature and/or humidity sensors in the canopy zone can be used to help keep the canopy zone at an ideal temperature and or humidity for drying. For example, with some plants, an ideal drying environment is approximately 68° F. and 50% relative humidity. Such a drying environment may be ideal for, for example, dense flowering crops. Other crops may have a different ideal environment. In some embodiments, the system can be configured to automatically detect when the drying cycle is complete, such as by detecting when the relative humidity is no longer rising. For example, as the plant canopy is drying, it may be introducing its internal moisture into the air of the canopy zone, and that moisture would cause the humidity in the canopy zone to increase (until or unless a dehumidification system, such as the system described above with reference to FIG. 19B, extracts that moisture to maintain a relatively constant humidity level). When the crops are finished drying, they will stop introducing moisture into the canopy zone or reduce the speed at which they are introducing moisture into the canopy zone, and the system may be configured to detect to this change by detecting that the dehumidification system is no longer needed and/or is working at a lower level to maintain the ideal relative humidity. Once the system determines that the drying cycle is over, the system may be configured to automatically alert an operator or user, automatically activate a harvesting system, such as the harvesting systems illustrated in FIGS. 10A through 11B, automatically drop harvested crops into a curing and storage system as described below, and/or the like.

Curing and Storage System

Some embodiments of plant growth systems or grow pods as disclosed herein may comprise a curing and/or storage system or subsystem that can be used to cure and/or store harvested crops after they have been removed from the plant canopy. In a commercial or industrial setting where a plurality of grow pods as disclosed herein are being used, the commercial enterprise may more efficiently cure and/or store harvested crops in a separate unit. However, in some embodiments, it may be desirable to have such curing and storage functions built into a grow pod as disclosed herein. Some commercial enterprises may want to use that functionality, and also a home or residential user, which may for example be using a single grow pod, may find this feature helpful.

Figure 22:
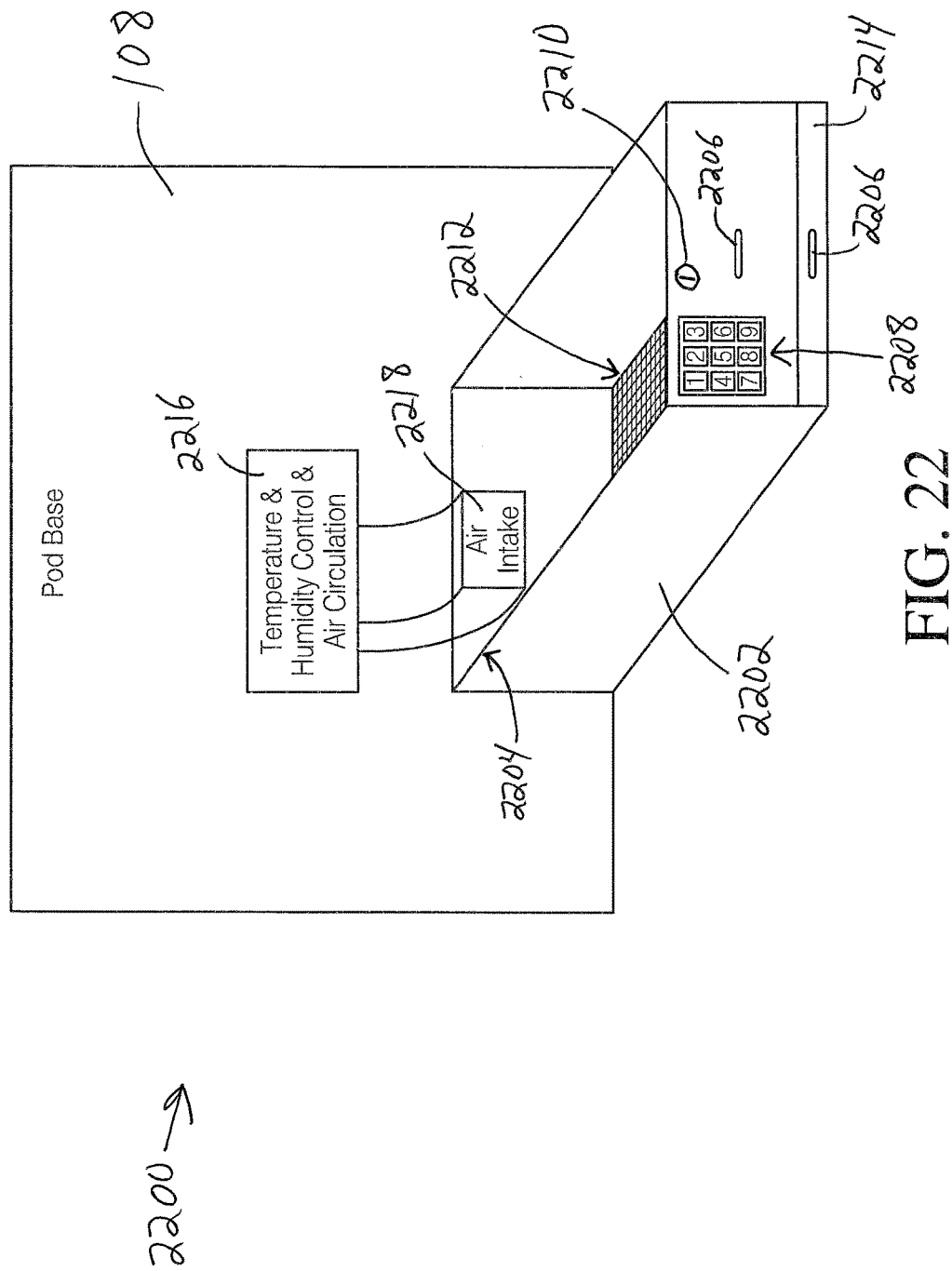
FIG. 22 illustrates an example embodiment of a curing and secure storage system for use with plant growth systems disclosed herein.

FIG. 22 illustrates one example of a curing and/or storage system built into the base 108 of a grow pod, such as the grow pods illustrated in FIGS. 1A, 1B, 1D, and/or the like. The curing and/or storage system 2200 comprises a drawer 2202 which can be closed within the pod base 108 and sealed desirably airtight using rubber seals 2204 around the opening. The drawer 2202 can be pulled out using drawer pulls 2206. In some embodiments, it can be desirable to lock the drawer 2202 in place, such as to prevent unauthorized access to the curing and/or storage mechanism 2200. Accordingly, in this embodiment, the drawer 20 20 to further the comprises an electronic keypad lock 2208 and a key-based manual override lock 2210. Other potential locking mechanisms that may be used may comprise a biometric locking mechanism, an NFC-based locking mechanism, a magnetic stripe reader, a mechanism that unlocks by communicating with a user's smart phone via Bluetooth, and/or the like. Further, although FIG. 22 illustrates an embodiment having a single drawer or curing/storage system, various embodiments may comprise more than one drawer and/or curing and/or storage system. For example, it may be desirable in some embodiments to have multiple curing and/or storage systems for the storing of different harvests. In some embodiments, each individual drawer in such a system is individually lockable. In some embodiments, each drawer or curing and/or storage system comprises its own temperature, humidity, and air circulation system 2216. In some embodiments, a temperature, humidity, and air circulation system 2216 is shared between more than one curing and/or storage system. In some embodiments, a drawer 2202 is not necessarily used. For example, a curing and/or storage system may comprise a cavity within a portion of a grow pod, such as the base 108, with that cavity being accessible via a door, which may include a locking mechanism, and the cavity being desirably temperature and humidity controlled.

In this embodiment, the drawer 2202 further comprises a fine mesh screen 2212 at the base of the drawer 2202. The fine mesh screen 2212 can help to collect pieces of the harvested crop that fall off the harvested crop and collect in lower collection drawer 2214, which may in some embodiments be independently removable from drawer 2202 for an operator to collect any pieces of the crop that have fallen and/or been filtered through the fine mesh screen 2212.

In some embodiments, it can be desirable to control the environment in the curing and/or storage system 2200. Accordingly, the embodiment illustrated in FIG. 22 comprises a temperature and humidity control and air circulation system 2216 which connects to the drawer 2202 through air intake 2218. The temperature and humidity control and air circulation system 2216 may utilize standard methods known in the art and/or various other environmental control techniques disclosed herein. In some embodiments, the curing and/or storage system 2200 may be a standalone device that is not necessarily integrated into a grow pod.

In some embodiments, the curing and/or storage system 2200 can be positioned in the base of the grow pod 108 in a way that when crops are automatically harvested, such as by the automatic harvesting systems illustrated in FIGS. 10a through 11 B, the crops fall into the drawer 2202 and automatically begin curing. For example, the floor of the canopy zone may comprise an opening or chute leading into the drawer 2202.

Data Monitoring, Feedback, & Dynamic User Interface

Figure 23A:
FIGS. 23A through 23C illustrate example embodiments of control and feedback systems for plant growth systems disclosed herein.

In some embodiments, individual plant growth systems or grow pods as disclosed herein can be configured to communicate with other grow pods and/or external systems. For example, a centralized control system may be configured to monitor and/or control a plurality of grow pods located at the same location and/or spread across a plurality of locations. FIG. 23A shows an example of one such centralized control system 2300. In this embodiment, a user is shown monitoring a facility having a plurality of grow pods 2304 from a single user or computer device 2302. In this example, the computer device 2302 is a tablet computer. In some embodiments, a server or other computer system may handle some of the monitoring and/or control tasks, with user access point systems, such as the tablet computer illustrated in FIG. 23A, acting as a user portal or dynamic user interface to enable a user or system administrator to interact with the system.

In some embodiments, each grow pod or unit individually connects to the computer system over a network, wired or wireless. In some embodiments, the grow pods are configured to communicate within a mesh network, wherein one or more grow pods act as repeaters for other grow pods.

In some embodiments, the system 2300 can comprise a cloud-based internet-of-things (IoT) control system for automation of the lights, aeroponic systems, atmospheric and mechanical controls, building security, personnel tracking, plant tracking, growth tracking, and/or the like. In an embodiment, all or some of the hardware devices can communicate with one another using mesh networking protocols, creating the IoT of agriculture. The system can be configured to provide cost analysis based on inputs such as electricity, water, and/or nutrient costs, and/or outputs such as yield. It can also, in some embodiments, track inventory, shipping & receiving, accounting, etc. creating the first agricultural enterprise resource planning (ERP) system. The system can be configured to be accessible from a mobile device. In an embodiment, an operator of the system can be able to control various aspects of the system from a mobile device.

Figure 23B:
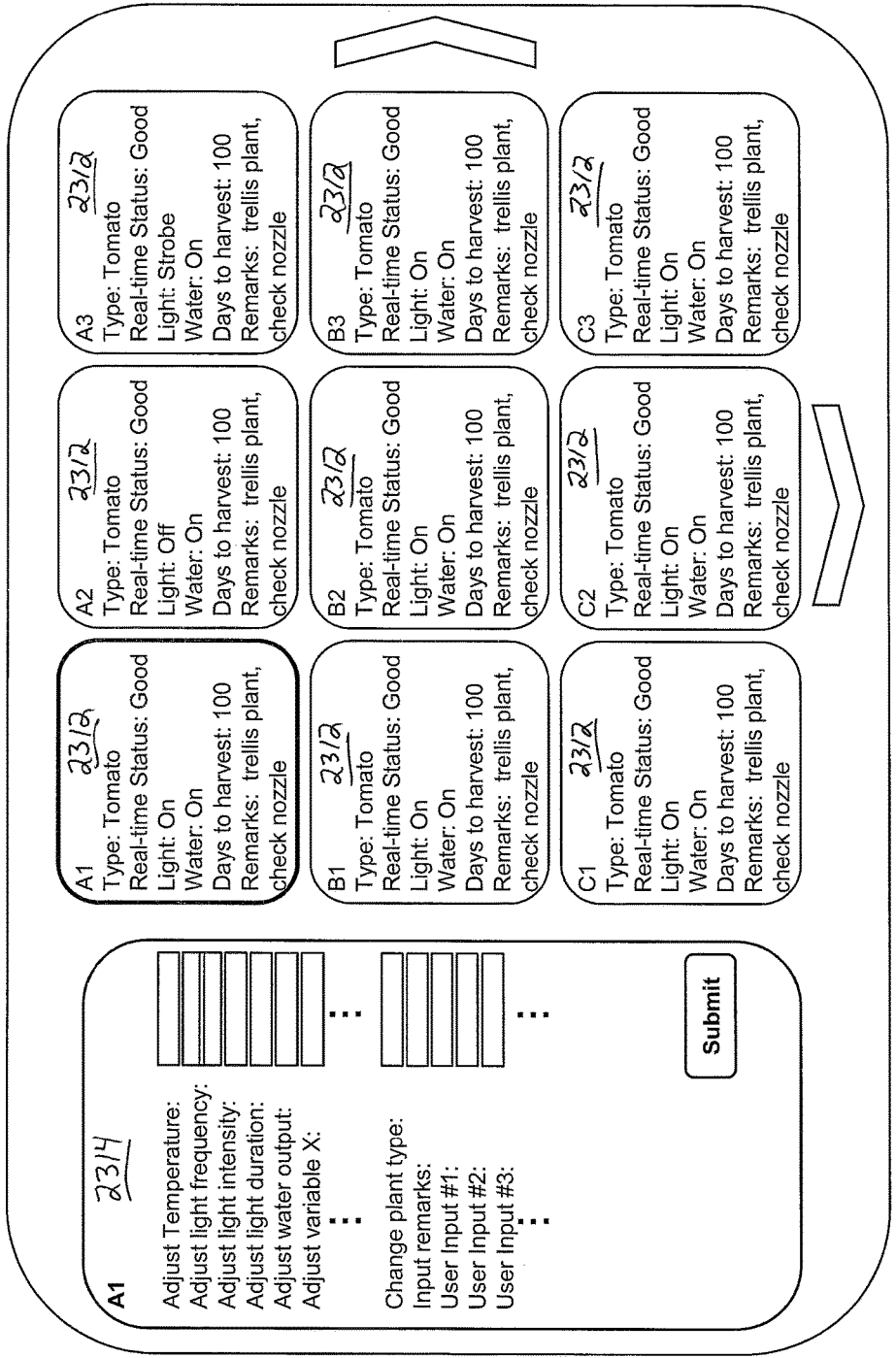

FIG. 23B illustrates another embodiment of a dynamic and/or real time user interface 2310 similar to the user interface illustrated in FIG. 23A. The user interface 2310 may be displayed on, for example, a tablet computer, a smart phone, a desktop computer, a television, and/or the like. In this embodiment, the interface is being displayed on a tablet computer with a touchscreen interface. The user interface 2310 can be dynamically updated in response to status detections and/or status reports from various grow pods, or in response to data analysis or mining performed on data collected from grow pods. In this embodiment, the right portion of the interface depicts a box 2312 for each individual grow unit. Within the boxes 2312 are various indicators of current status information and/or alerts for that grow pod. The left portion 2314 of the interface comprises input fields that can be used by the user to adjust parameters of the grow pods. In some embodiments, the system can be configured to enable the user to adjust parameters for grow pods individually. In some embodiments, the system can be configured to enable a user to adjust parameters simultaneously for a group or plurality of grow pods or units.

In some embodiments, the dynamic and/or real time user interface 2310 can be configured to highlight or otherwise bring a user's attention to grow pods that are experiencing an off-nominal or otherwise atypical situation. For example, if something is malfunctioning in a grow pod, the user interface 2310 may be configured to change the border of the box 2312 indicative of that grow pod (e.g., darken the border, make the border thicker, change the color of the border, and/or the like), enlarge the size of the box 2312 indicative of that grow pod, bring that box 2312 to the forefront while pushing the other boxes 2312 to the background, hiding all boxes 2312 except for the box 2312 indicative of the off-nominal grow pod, and/or the like. In some embodiments, the device and or user interface 2310 may be configured to make a sound or vibrate to alert a user to such an off-nominal or anomaly situation.

In some embodiments, a network connected grow pod system can be configured to collect and analyze relatively large amounts of information gathered from a relatively large number of grow pods. For example, hundreds of commercial and noncommercial growers across the country and/or the world (and/or out of this world) may utilize thousands or hundreds of thousands or more grow pods that are all capable of reporting data back to a main server system for analysis (for example, external system 802 shown in FIG. 8A, or a different central server system). One benefit of such a system is that, for example, the system may be able to analyze the data and determined that particular environmental parameters and/or nutrient profiles utilized at some locations has resulted in increased efficiency. Further, the system can be configured to then update nutrient profiles and/or other operating parameters and distribute this information across other locations or grow pods to enable growing efficiency to be increased across the system.

Computing System

Figure 23C:
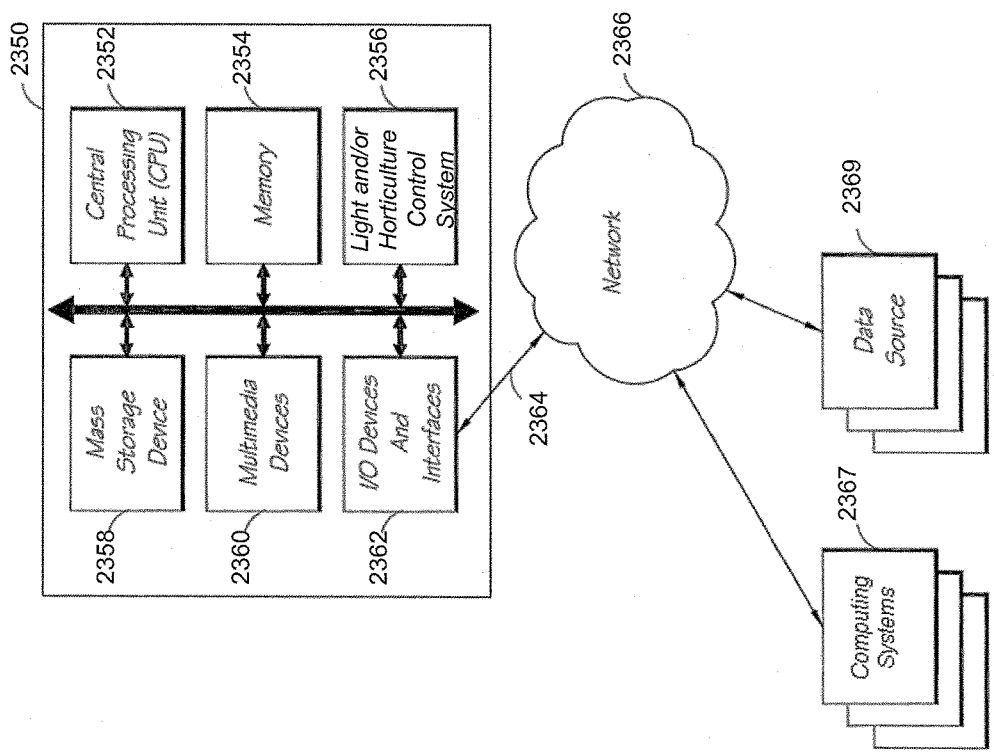

FIG. 23C is a block diagram depicting an embodiment of a computer hardware system configured to run software for implementing one or more embodiments of the light and/or horticulture control systems and/or plant growth systems described herein.

In some embodiments, the computer clients and/or servers described above take the form of a computing system 2350 illustrated in FIG. 23C, which is a block diagram of one embodiment of a computing system that is in communication with one or more computing systems 2367 and/or one or more data sources 2369 via one or more networks 2366. The computing system 2350 may be used to implement one or more of the systems and methods described herein. In addition, in one embodiment, the computing system 2350 may be configured to manage access or administer a software application. While FIG. 23C illustrates one embodiment of a computing system 2350, it is recognized that the functionality provided for in the components and modules of computing system 2350 may be combined into fewer components and modules or further separated into additional components and modules.

Light and/or Horticulture and/or Plant Growth Control System

In one embodiment, the computing system 2350 comprises a light and/or horticulture control system 2356 that carries out the functions described herein with reference to management of light and horticulture and plant growth systems, including any one of techniques described above or below. The light and/or horticulture control system 2356 and/or other modules may be executed on the computing system 2350 by a central processing unit 2352 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 2350 also comprises a mainframe computer suitable for controlling and/or communicating with large databases, performing high volume transaction processing, and generating reports from large databases. The computing system 2350 also comprises a central processing unit ("CPU") 2352, which may comprise a conventional microprocessor. The computing system 2350 further comprises a memory 2354, such as random access memory ("RAM") for temporary storage of information and/or a read only memory ("ROM") for permanent storage of information, and a mass storage device 2358, such as a hard drive, diskette, or optical media storage device. Typically, the modules of the computing system 2350 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 2350 comprises one or more commonly available input/output (I/O) devices and interfaces 2362, such as a keyboard, mouse, touchpad, and printer. In one embodiment, the I/O devices and interfaces 2362 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 2362 comprise a microphone and/or motion sensor that allow a user to generate input to the computing system 2350 using sounds, voice, motion, gestures, or the like. In the embodiment of the above figure, the I/O devices and interfaces 2362 also provide a communications interface to various external devices. The computing system 2350 may also comprise one or more multimedia devices 2360, such as speakers, video cards, graphics accelerators, and microphones, for example.

Computing System Device/Operating System

The computing system 2350 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 2350 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 2350 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of the above figure, the computing system 2350 is coupled to a network 2366, such as a LAN, WAN, or the Internet, for example, via a wired, wireless, or combination of wired and wireless, communication link 2364. The network 2366 communicates with various computing devices and/or other electronic devices via wired or wireless communication links. In the embodiment of the above figure, the network 2366 is communicating with one or more computing systems 2367 and/or one or more data sources 2369.

Access to the light and/or horticulture control system 2356 of the computer system 2350 by computing systems 2367 and/or by data sources 2369 may be through a web-enabled user access point such as the computing systems' 2367 or data source's 2369 personal computer, cellular phone, smartphone, laptop, tablet computer, e-reader device, audio player, or other device capable of connecting to the network 2366. Such a device may have a browser module that is implemented as a module that uses text, graphics, audio, video, and other media to present data and to allow interaction with data via the network 2366.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 2362 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 2350 may comprise a physical or logical connection established between a remote microprocessor and a mainframe host computer for the express purpose of uploading, downloading, or viewing interactive data and databases on-line in real time. The remote microprocessor may be operated by an entity operating the computer system 2350, including the client server systems or the main server system, an/or may be operated by one or more of the data sources 2369 and/or one or more of the computing systems 2367. In some embodiments, terminal emulation software may be used on the microprocessor for participating in the micro-mainframe link.

In some embodiments, computing systems 2367 who are internal to an entity operating the computer system 2350 may access the light and/or horticulture control system 2356 internally as an application or process run by the CPU 2352.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, a wearable device (for example, smart watch, smart glass or the like) or the like.

Other Systems

In addition to the systems that are illustrated in the above figure, the network 2366 may communicate with other data sources or other computing devices. The computing system 2350 may also comprise one or more internal and/or external data sources. In some embodiments, one or more of the data repositories and the data sources may be implemented using a relational database, such as DB2, Sybase, Oracle, Code-Base and Microsoft® SQL Server as well as other types of databases such as, for example, a flat file database, an entity-relationship database, and object-oriented database, and/or a record-based database.

Various Additional Embodiments/Features

In an embodiment, an aeroponic apparatus (e.g., a plant growth system and/or grow pod as disclosed herein) is configured to be insulated, actively-cooled, self-draining, wireless sensor-enabled. In an embodiment, the aeroponic apparatus can comprise motorized wheels and/or built-in plant and root trellis'. One or more of the foregoing features can enable the system to reduce water consumption by up to 95% as compared to soil farming and allows the plant canopy to be trained along any two or three-dimensional trellis geometry including, but not limited to a cylinder, column, horizontal plane, and/or vertical plane.

Figure 24A:
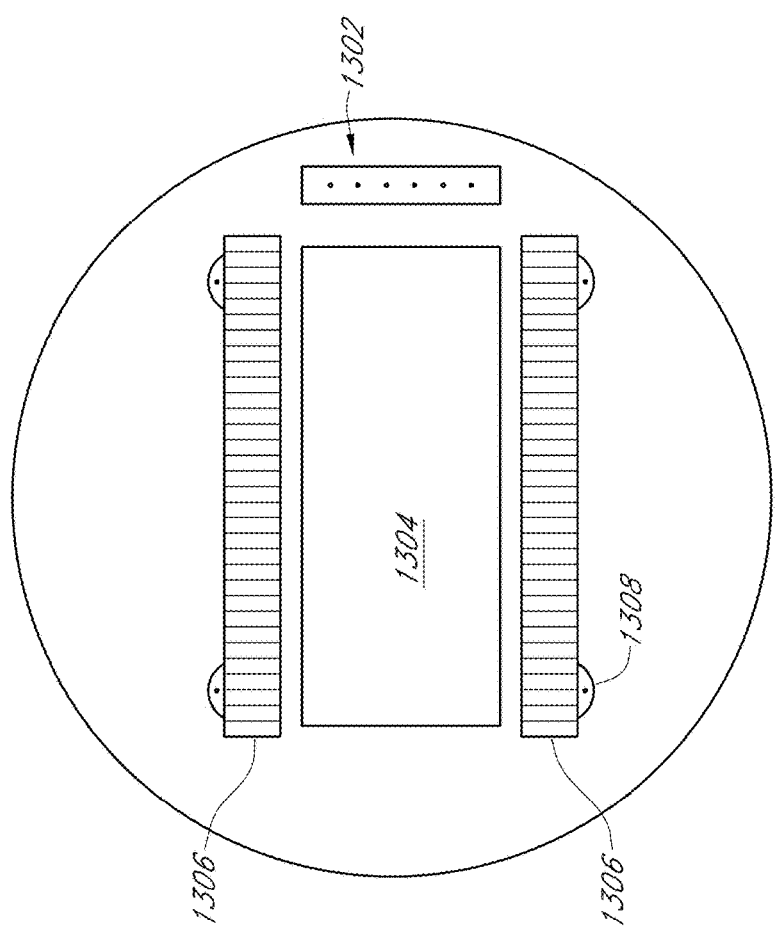

In an embodiment, the wheels of the system can allow the plant to be easily moved without disturbing the root zone or canopy. In a perpetual harvest scenario where plant light cycles are artificially manipulated to enable multiple harvests per year, the plant must be moved from the vegetative growth area to the fruiting/flowering growth area. In a flowering or fruiting plant scenario, the plant would need to be moved out of the grow facility and into the harvest facility. In an embodiment, the wheels are driven by electric motors powered by batteries. In an embodiment, the motor and/or the batteries are positioned in the base of the system. The system can be configured to self-navigate along painted lines on the floor that are detected by a reflectance sensor array on the bottom of the system (for example, pot) as it moves throughout the grow facility. For example, FIG. 24A is a bottom view of a grow pod as described herein, according to some embodiments. As shown in FIG. 24A, the bottom of the grow pod can include a reflectance sensor array 1302, an electronics compartment 1304 which can house one or more electronics (e.g., a battery, various hardware, a motor), and rubber tank tracks 1306 positioned over wheels or rollers 1308. One of skill in the art will understand that the arrangement illustrated in FIG. 24*a* is merely one way of creating a mobile grow pod that can move itself.

FIG. 24B illustrates another benefit of having mobile grow pods, such as grow pods that can move under their own power, such as by powered tank treads and/or wheels, or even grow pods that have wheels, casters, and/or the like that are not powered but that enable the grow pod to be pushed around by an external force. FIG. 24B shows an overhead view of a grow room comprising 25 individual grow pods 141, similar to the square or rectangular shaped grow pod 141 illustrated in FIG. 1D. To be most efficient with space utilization in this commercial environment, the 25 grow pods 141 are positioned such that there is room for an aisle 2402 to be created between two columns of grow pods 141. Depending on which grow pod or grow pods need to be accessed, the grow pods 141 can be configured to move in unison to generate the aisle 2402 as needed. As shown in FIG. 24B an aisle has been created between the third and fourth columns of grow pods 141. However, an aisle may be created between any of the columns of grow pods 141. Further, in some embodiments, the grow pods 141 may move up and down with reference to FIG. 24B and cause an aisle to be formed between particular rows. In some embodiments, a control system can be configured to automatically instruct individual grow pods to move to create access to a particular grow pod as needed. For example, if a particular grow pod is experiencing an anomaly or an off nominal situation, such as a malfunction, the system may be configured to transmit an alert to an operator that the off nominal grow pod should be inspected, and may also be configured to automatically initiate movement of the various grow pods to enable the operator to access the off nominal grow pod.

Figure 25A:
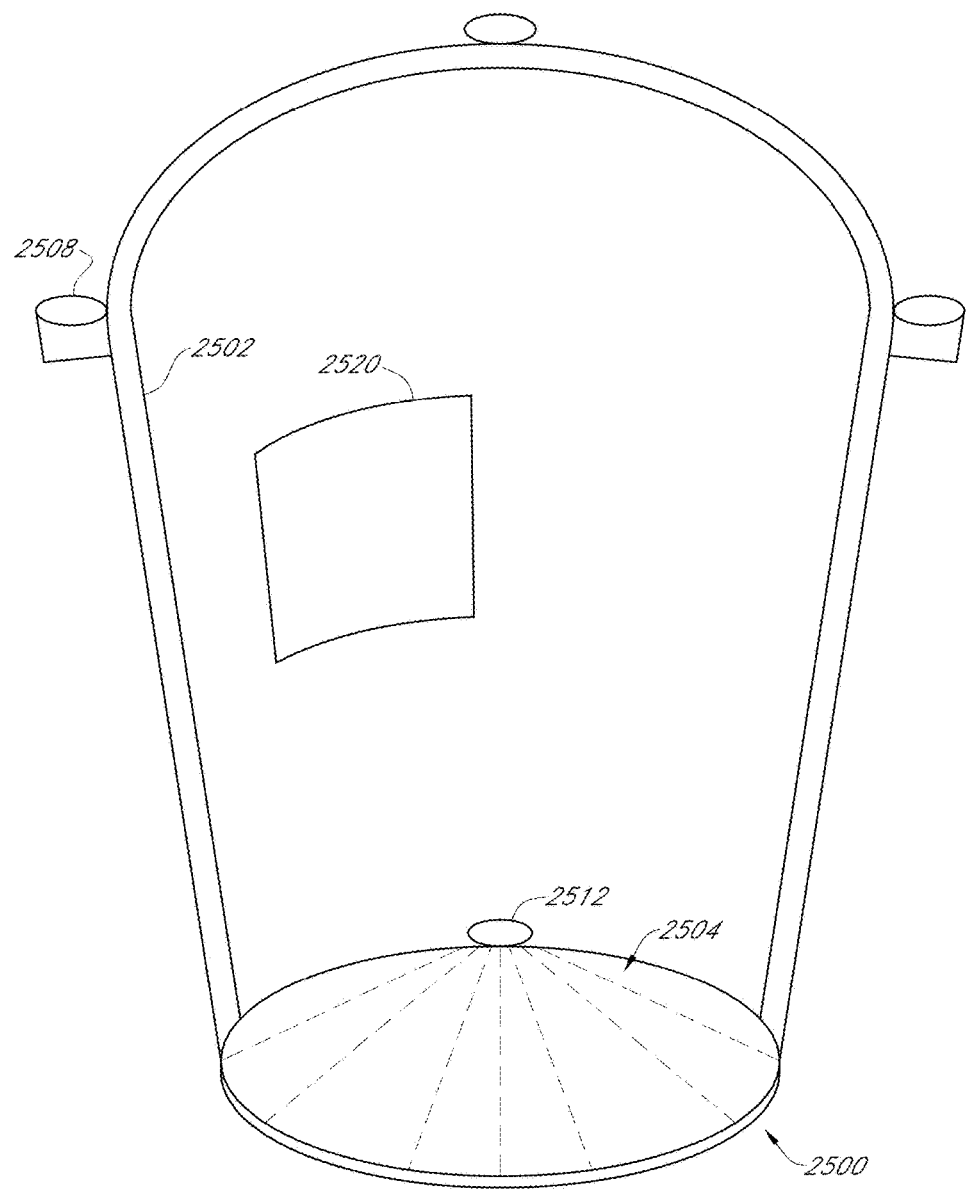
FIGS. 25A through 25C illustrate alternative plant growth system embodiments.
Figure 25B:
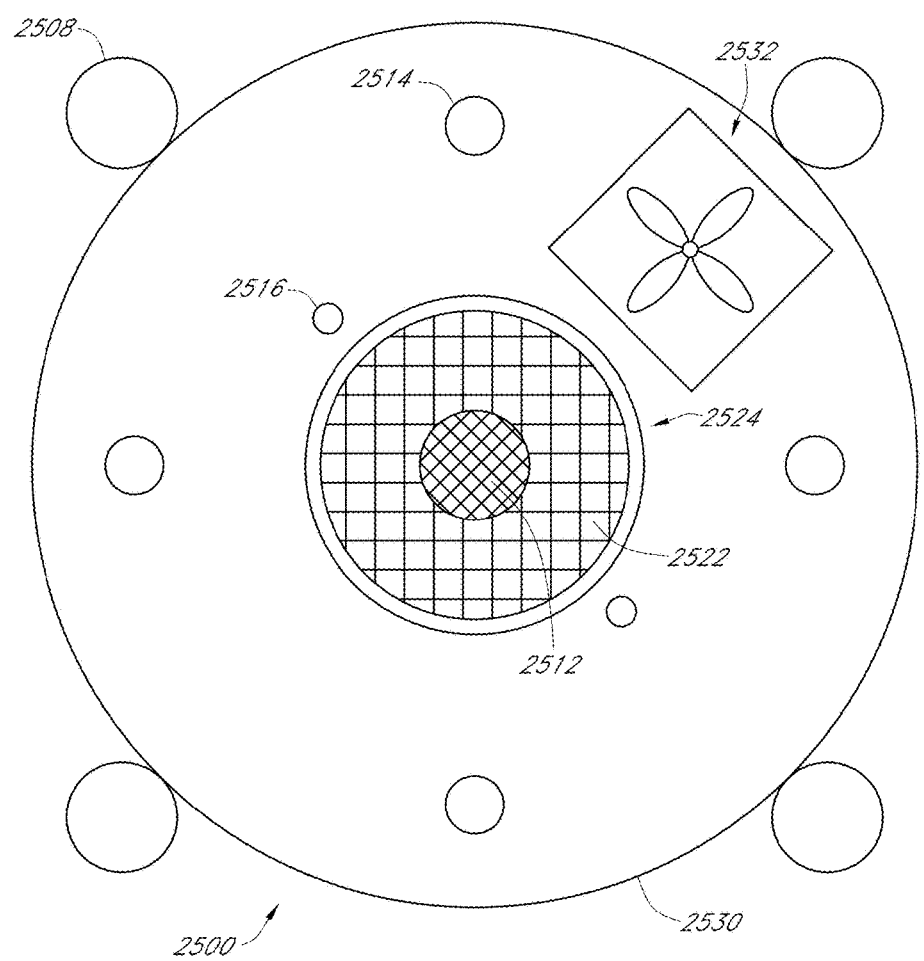
Figure 25C:
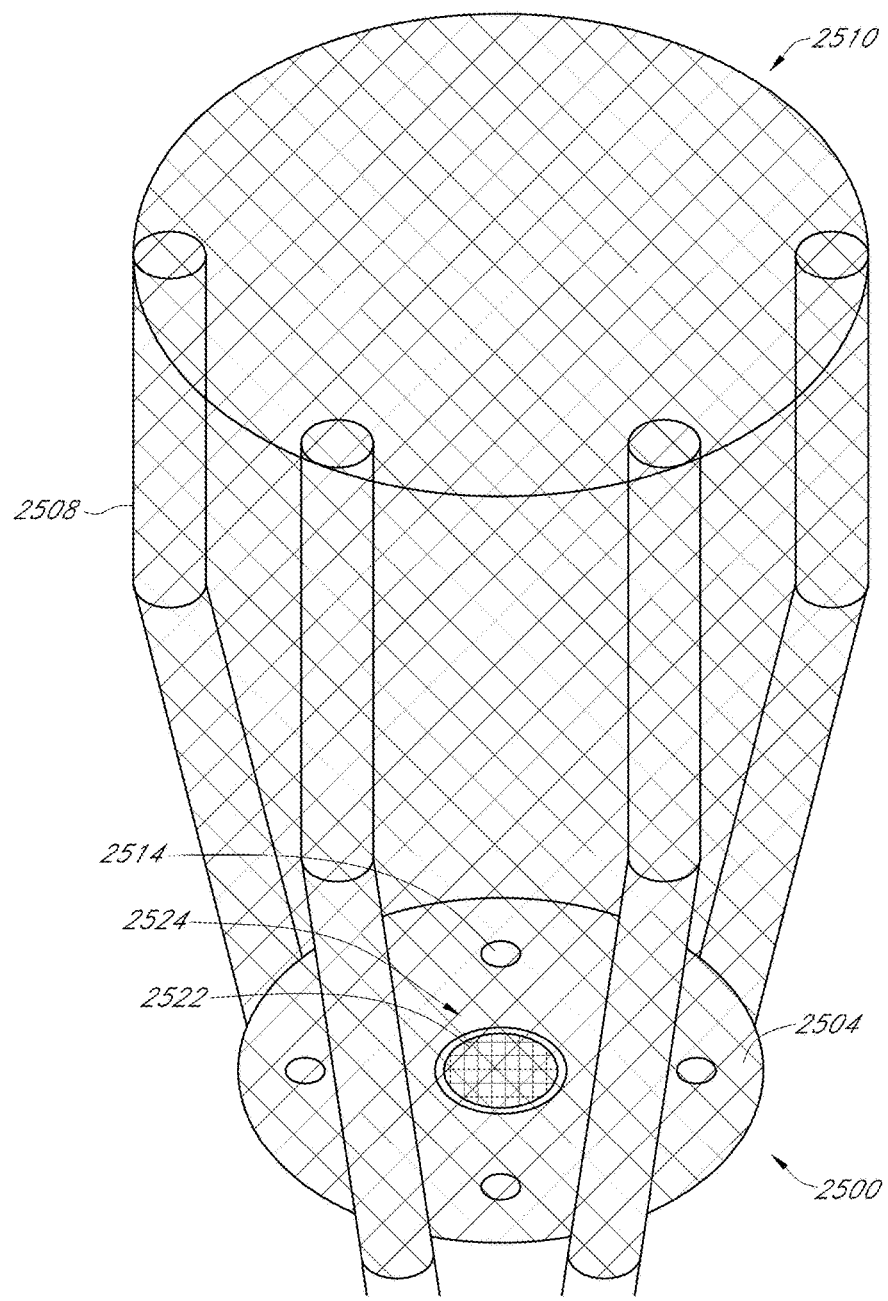

FIGS. 25A-25C show example cross sectional, top, and perspective views of a grow pod 2500 (also referred to as a pot), according to some embodiments. In an embodiment, the system 2500 comprises a pot having a wall 2502, floor 2504, and/or lid 2530 (shown in FIG. 25B) that is/are double walled so as to provide insulation to help maintain the root zone temperature at an ideal 68-72 degrees Fahrenheit (or any other ideal temperature range). In an embodiment, the lid 2530 of the pot 2500 also contains small, water resistant axial fans 2532 (shown in FIG. 25B) for additional cooling capabilities. The walls of the pot can also contain four mounting holes for trellis support poles 2508. This can allow the trellis 2510 (shown in FIG. 25C) to be affixed to the plant so that two can move together in harmony.

In an embodiment, the system 2500 comprises a pot having a floor 2504 with a slope (e.g., represented by the dashed lines on the floor 2504 in FIG. 25A) to prevent pooling and direct all water to the drainage hole 2512 at the bottom of the pot.

In an embodiment, the system comprises a pot having a wireless sensor module 2520 including one or more sensors for measuring root zone temperature, humidity, and/or oxygen concentration, as well as a day/night video camera in the root zone for monitoring root development.

In an embodiment, the system comprises a pot having built-in aeroponic misting nozzles 2514 (see FIGS. 25B and 25C) as well as oxygen distribution nozzles 2516 (see FIG. 25B) for supplementing the root zone with additional oxygen.

In an embodiment, a portion of the floor can include a net 2522 (or other porous fabric), a periphery of which is secured into a net cup 2524, at or near the junction between the canopy and root zones 102, 104 as described above with reference to, for example, FIG. 1A.

Figure 26A:
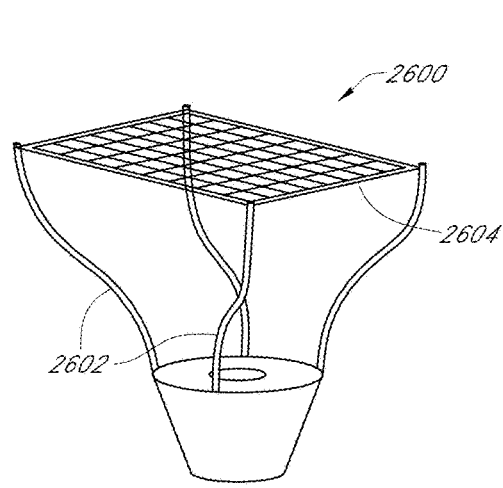
FIGS. 26A through 26D illustrate alternative trellis embodiments for use with plant growth systems disclosed herein.
Figure 26B:
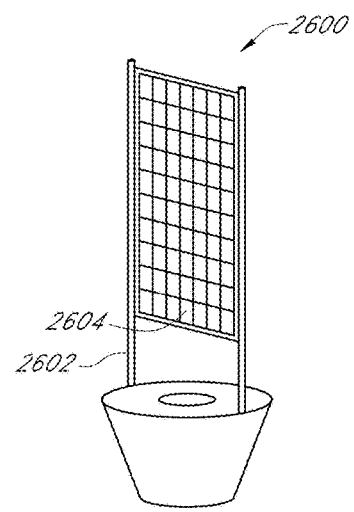
Figure 26C:
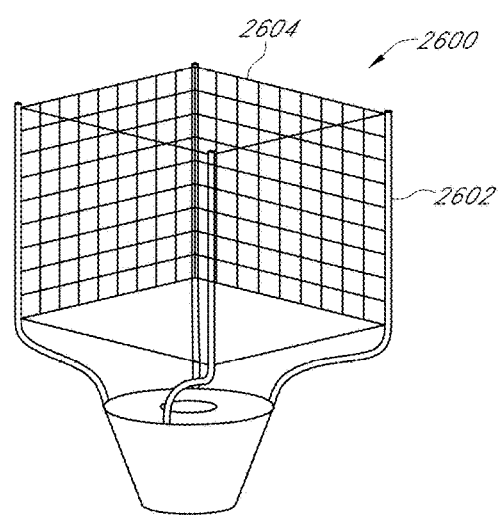
Figure 26D:
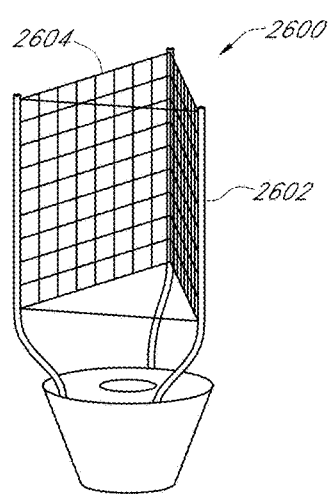

The plant canopy can be trained along any two or three-dimensional trellis geometry including, but not limited to a cylinder, column, horizontal plane, and/or vertical plane. For example, FIGS. 26A-26D illustrate various trellis geometries having a trellis 2600 having one or more trellis support posts 2602 and a trellis frame 2604. FIG. 26A is a horizontally oriented trellis 2600, FIG. 26B is a vertically oriented trellis 2600, FIG. 26C is a trellis 2600 with four sides that together define a vertical column, and FIG. 26D is a trellis 2600 with three sides that together define a triangular column. The front trellises in FIGS. 26C and 26D have been omitted for clarity, in addition to various other features of the grow pods described herein.

Plant Growth System Processes

As discussed above, various embodiments of plant growth systems disclosed herein may incorporate some automated processes or algorithms, and/or may operate substantially or completely autonomously, at least for some functions. For example, in some embodiments, a plant growth system may be configured to enable a seed or clone to be placed within the system, and the system may be configured to automatically control the plant growth cycle as the seed or clone moves through its various growth states, such as a vegetative state, a fruiting/flowering state, a drying process, a harvesting process, and/or a curing process. In various embodiments, all of these processes may be automatically performed, some may be automatically performed and others may be manually performed, some may be partially automated but also require some user input, some of these processes may be optional and may not be performed with all plants and/or by all systems, and/or the like. Further, the completion of one process or stage and initiation of the next process or stage may in various embodiments be automatically occurring and/or may desirably have or require at least some user action. For example, in some embodiments, a system as disclosed herein may be capable of automatically detecting, by one or more sensors or detectors or cameras of the pod system or external to the pod system, when a particular stage has completed and when the system should be switched over to controlling the next stage. However, it may be desirable in some embodiments to allow an operator or user to manually verify that the plant is of a condition that it is ready to move to the next stage before the system switches over to that next stage. In an embodiment, the completion of one process or stage and the initiation of the next process or stage may occur based on a period of time, for example, such period of time may be user defined, predetermined, or dynamically adjusted by the pod system or a user or based on a recipe accessed from a database. In an embodiment, a recipe is a set of instructions or plans for growing a specific type of plant, variety of plant, or species of plant. In an embodiment, the pod system can access a recipe from a database residing within the pod or by accessing a database operated by a third party, for example accessible through a network connection or through the cloud. In an embodiment, a recipe can be purchased or license from a third party through a database system. In an embodiment, a recipe can be licensed for one time use. In an embodiment, the pod system can be configured to track and determine the number of times a user may utilize the recipe for growing a particular plant in a particular pod system, for example, a system for tracking licenses to use various recipes. In an embodiment, the pod system can be configured to manage and/or control the transaction process for licensing a recipe from a third party. In an embodiment, the pod system can be configured to manage and/or control and/or activate certain features and/or grow processes and/or algorithms either at the pod system or remotely using a user control access system or by a central server system, which can be at the local facility of the pod system or at a different facility remote from the pod, and possibly under the control of a third party. Such management and/or activation of certain features and/or grow processes and/or algorithms of the pod system can be based on a user's license or purchase of such features. In an embodiment, the pod system can be configured to manage and/or control the transaction process for licensing or purchasing such features.

In some embodiments, a plant growth system may simultaneously perform more than one of these processes, or at least a portion of more than one of these processes, such as if more than one plant is being grown in the same system, and the plants are not all growing at the same rate. Simultaneous performance of more than one of the stages may be easier with some stages and more difficult with others. For example, if two plants are being grown in the same system, with their plant canopies positioned within the same canopy zone, but their root systems positioned within separate root zones, it may be relatively easy to have different conditions present in each of the two root zones, but it may be more difficult to have different canopy conditions present for the two different plant canopies. For example, in an example where two plants are being grown in the same grow pod, one plant may be ready for drying and the other may not be ready for drying. In that case, introduction of moisture into the root zone of the plant ready for drying may be reduced, to initiate the drying process of that plant. However, the canopy zone may continue to be controlled in a manner that helps the other plant to continue its fruiting/flowering stage, before the canopy zone is changed over to an environment more ideal for drying plants. As another example, a plant growth system may be simultaneously curing a harvested plant in one area of the system and growing a new plant in another area of the system. In an embodiment, the pod system can be configured to control the growing environment at any stage by controlling and adjusting one or more of the following factors or parameters: ratio of minerals, electroconnectivity, oxygen concentration, light spectrum, light access or duration, feed nutrition, nitrogen, nutrients, carbon dioxide concentration, temperature, humidity, water availability or levels, ambient light, airflow, other chemicals or liquids or gases, gas exchange rates, plant respiration, radiant energy, biotic factors, bacteria, transpiration, allelopathy levels, and concentrations or levels of phosphorus, potassium, calcium, magnesium, sulfur, copper, manganese, zinc, boron, molybdenum, chlorine, iron, nickel, cobalt, vanadium, sodium, silicon, selenium, carbon, hydrogen, or the like.

FIGS. 27A through 27D illustrate various embodiments of process flow diagrams that illustrate example processes that may be performed by plant growth systems disclosed herein. Each of these processes may be controlled by, for example, the light and/or horticulture control system 2356 discussed above with respect to FIG. 23C and/or any other electronic controller, and/or may be at least partially manually controlled.

Figure 27A:
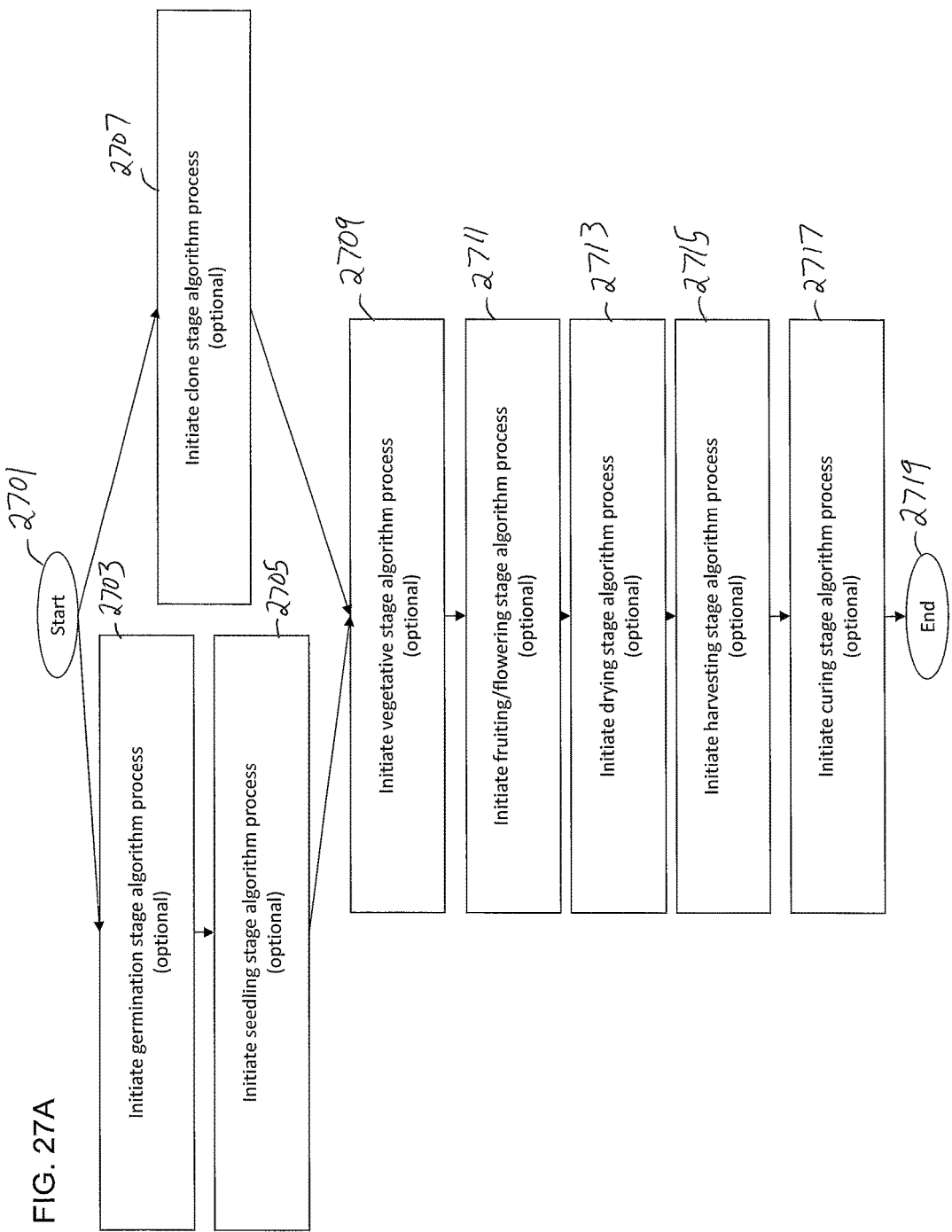
FIGS. 27A-27D illustrate example embodiments of process flow diagrams depicting various processes that may be performed by plant growth systems.

FIG. 27A illustrates an example embodiment of a process flow diagram illustrating a plurality of stages or algorithm processes a plant growth system or grow pods disclosed herein may use. As shown in FIG. 27A, each of the various stages or algorithm processes is optional. For example, some grow pods may have the capability of performing each of these processes and some grow pods may have the capability of performing only some of these processes. Further, in some embodiments, even with a grow pod that is capable of performing all of these processes or a subset of these processes, the processes that the grow pod is capable of performing may be optional, in that it may not be desirable to perform each of these processes for a particular plant or situation. In various embodiments, detection of when each of these stages is complete and/or needs to be initiated is automated and/or may involve some manual user intervention. One of the benefits of enabling a system to have different stages or algorithm processes is that the environmental and other variables that are ideal for a particular plant may vary based on the stage of growth that plant is in. For example, when a plant is in a germination versus a seedling stage, the desirable parameters, such as, for example, temperature, relative humidity, nutrient mix, oxygen and/or carbon dioxide levels, and/or the like may be different.

Still referring to FIG. 27A, the process begins at block 2701. Whether the process flow proceeds to block 2703 or 2707 depends on the type of starting plant. In some embodiments, plant growth is started from a seed, and the process flow would proceed to block 2703. In some embodiments, plant growth is started from a clone, such as a clone cut from another plant, and the process flow would proceed to block 2707. At block 2703, the system initiates a germination stage algorithm process. The germination stage algorithm process may be configured to germinate a seed. The process flow proceeds to block 2705 when the seed turns into a seedling. In that case, the system can be configured to initiate a seedling stage algorithm process.

If a clone is being used, the process flow proceeds from the start block 2701 to block 2707. At block 2707, a clone stage algorithm process is initiated. After the clone stage algorithm process is complete or the seedling stage algorithm process is complete, the process flow proceeds to block 2709. At block 2709, the system initiates a vegetative state algorithm process. When the plant is ready to move from the vegetative state to the fruiting/flowering stage, the process flow proceeds to block 2711 where the system initiates the fruiting/flowering stage algorithm process.

During each of the stages between and including box 2701 to 2711, the system is configured to promote growth of the plant or plants. Accordingly, the system may be performing actions such as, for example, introducing moisture, oxygen, nutrients, and/or the like into a root zone, introducing light, carbon dioxide, and/or the like into a canopy zone, controlling various parameters such as temperature and humidity of the canopy zone and root zone, and/or the like. Once the process flow reaches block 2713, the primary growth of the plant is completed, and the rest of the processes are tailored to harvesting the crops that have been grown (including any related process, such as drying and curing).

Once the fruiting/flowering stage process is complete and the plant is ready for drying, the process flow proceeds to block 2713, where the system initiates a drying stage algorithm process. Once the plant is sufficiently dry and/or ready for harvesting, the process flow proceeds to block 2715, where the system initiates a harvesting stage algorithm process, for example, using one or more of the harvesting systems and/or methods disclosed herein. In an embodiment, harvesting can mean and refer to the cutting of plants, flowers, fruits, or the like. In an embodiment, harvesting can also include collecting, for example using one or more of the systems and/or methods disclosed herein, of plants, flowers, fruits, or the like. As with the other stages, the harvesting process may be substantially or completely automated, substantially or completely manually performed or some combination thereof. For example, the harvesting stage process may comprise activating one or more of the automated harvesting systems disclosed herein that automatically harvest the crops.

Once the crops have been harvested, the process flow can proceed to block 2717, where the system may optionally initiate a curing stage algorithm process. For example, the system may be configured to activate a curing process using, for example, the curing system illustrated in FIG. 22, as discussed above. The process ends at block 2719.

Seedling Process

Figure 27B:
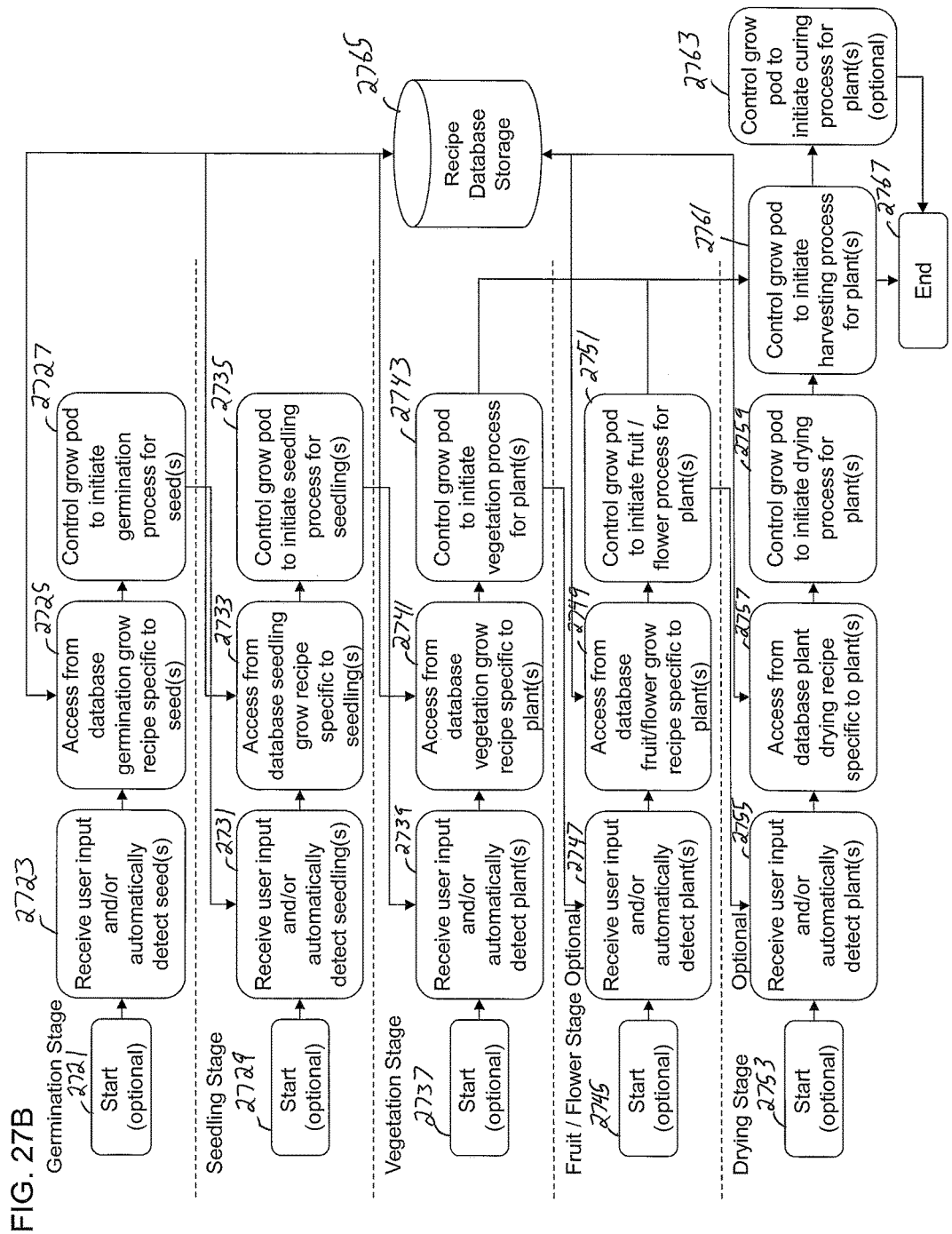

FIG. 27B illustrates additional details of an example embodiment of a process flow diagram for growing a plant using a system disclosed herein. In this embodiment, the plant starts from a seed, similar to the left side path illustrated in FIG. 27A where blocks 2703 and 2705 are used instead of block 2707. As with FIG. 27A, the process flow illustrated in FIG. 27B comprises a plurality of optional stages. In this case, the system comprises a germination stage that begins at block 2721, a seedling stage that begins at block 2729, a vegetation stage that ends it that begins at block 2737, a fruit/flowering stage that begins at block 2745, and a drying stage that begins at block 2753. The process flow further comprises optional harvesting and curing stages at blocks 2761 and 2763.

In each of the various stages, the system may receive user input that initiates that stage and/or the system may automatically detect, for example by a sensor, detector, camera, or other equipment internal or external to the pod system, that such stage should be initiated. Further, the system may receive user input related to parameters that will be controlled during that stage, and/or the system may automatically detect parameters that should be used with that stage. Such user input and/or automatic detection is illustrated in FIG. 27B in blocks 2723, 2731, 2739, 2747, and 2755.

Further, in each of the various stages, the system may access one or more databases, such as recipe database 2765. The system may access such a database to, for example, retrieve a grow recipe that, for example, defines or lists one or more desirable parameters to be controlled during that stage. For example, a grow recipe retrieved from the recipe database 2765 during the seedling stage may provide the desirable parameters or ranges for, for example, canopy chamber temperature, relative humidity level, light spectrum, light intensity, and/or the like. As another example, during the fruit/flowering stage, such a recipe received from the recipe database 2765 may provide information related to the same or similar parameters, but some of the information may be different. For example, the light spectrum and/or intensity of light may be different in the fruit/flowering stage with respect to the seedling stage. These parameters are merely some examples, and various other parameters may also be defined in the grow recipes and/or may vary between the different stages. Further, the parameters that are controlled may be variable while within a certain stage, and may not necessarily remain constant during any particular stage. Accessing a database for each of the stages is illustrated in FIG. 27B in blocks 2725, 2733, 2741, 2749, and 2757.

Once the system knows the parameters desirable for any particular stage, such as from user input, automatic detection, accessing a grow recipe, desired end product, desired end product characteristics, plant species, plant type, plant variety, and/or the like, the system can be configured to control the grow pod to initiate, continue, and/or complete that particular stage. This process is shown in FIG. 27B at blocks 2727, 2735, 2743, 2751, 2759, 2761, and 2763. For simplicity, FIG. 27B does not illustrate blocks similar to blocks 2723 and 2725 for the harvesting and curing stages. However, such blocks may be included in the harvesting and/or curing stages in some embodiments. In FIG. 27B, the process ends at block 2767, such as after the harvesting or curing process is complete. In some embodiments, however, the process may end after any of the other stages, if desirable. For example, in some embodiments, it may be desirable to grow a seed into a seedling and then transfer that seedling to another system. In that case, the process flow may end after block 2735. In some embodiments, when the seedling is transferred to a different system, the new system may pick up at block 2737.

Clone Process

Figure 27C:
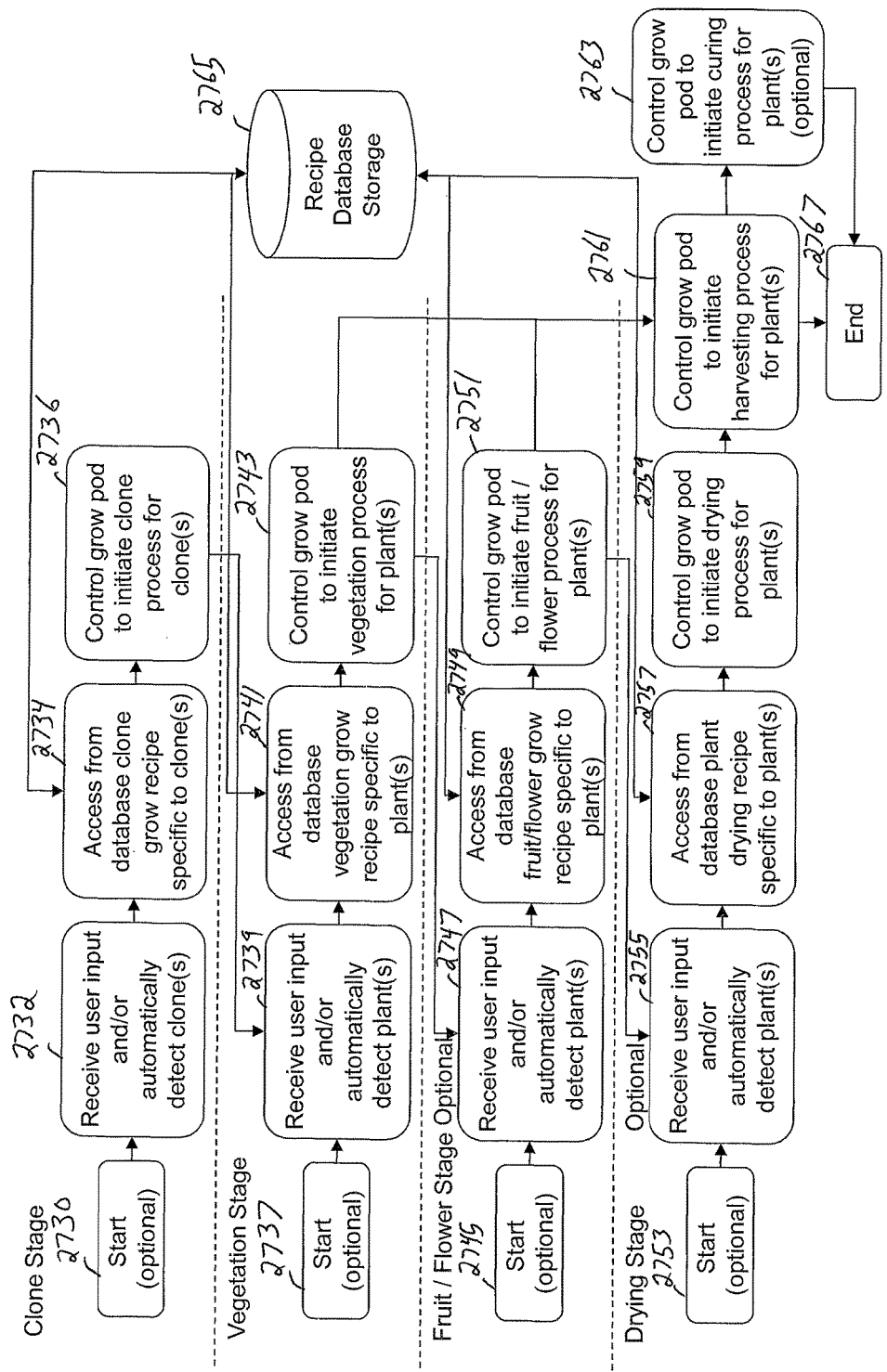

FIG. 27C illustrates an example embodiment of a process flow diagram similar to the process flow illustrated in 27B. However, the process flow illustrated in FIG. 27C illustrates an example of a plant growth system growing a plant that starts from a clone instead of a seed or seedling. The process flow illustrated in FIG. 27C may be similar to, for example, the process flow illustrated in FIG. 27A that takes the right path through block 2707 instead of the left path through blocks 2703 and 2705.

The process flow illustrated in FIG. 27C, beginning at the vegetation stage (block 2737) and ending at block 2767, is the same as the process flow illustrated in FIG. 27B. However, FIG. 27C does not include the germination or seedling stages shown at blocks 2721 through 2735 of FIG. 27B. Instead, FIG. 27C includes a clone stage depicted by blocks 2730, 2732, 2734, and 2736. The clone stage can be similar to the germination and/or seedling stages, but using different environmental parameters, such as, for example, temperature, humidity, oxygen or carbon dioxide level, and/or the like.

Drying Process

Figure 27D:
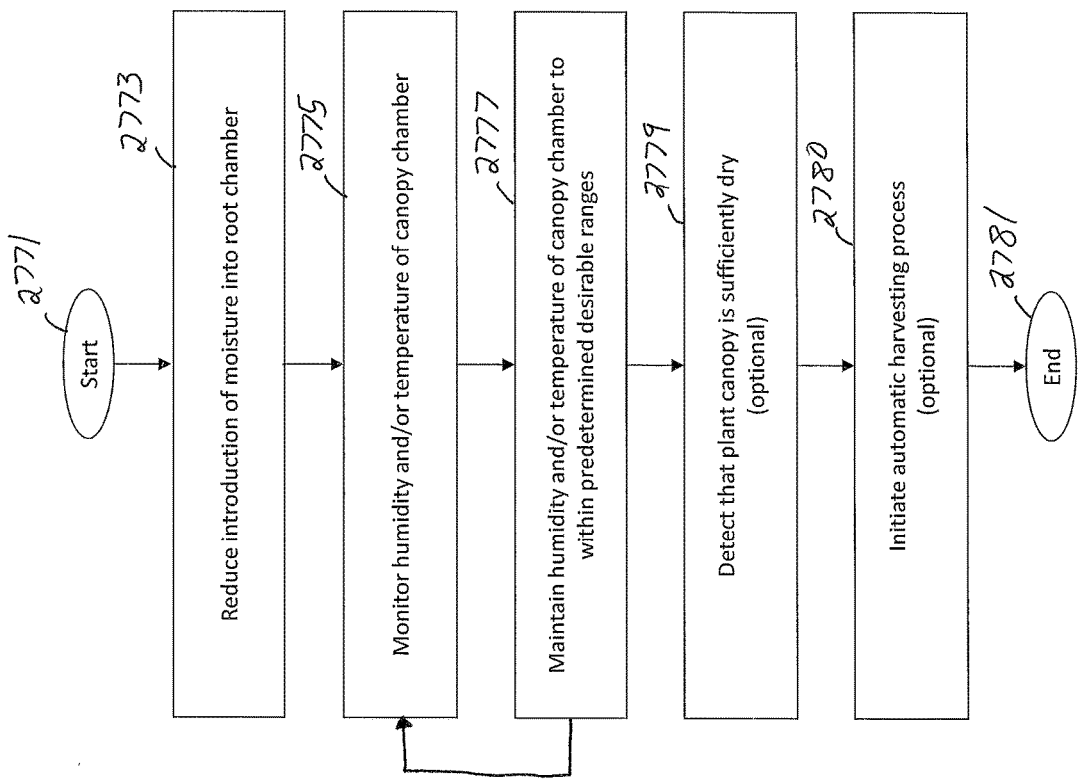

FIG. 27D illustrates an example embodiment of a drying stage process, such as the drying stage algorithm process depicted by block 2713 of FIG. 27A. The process flow illustrated in FIG. 27D may be performed by, for example, any of the plant growth systems disclosed herein. The process flow begins at block 2771. This may, for example, be when the process flow of FIG. 27A moves to block 2713 and initiates a drying stage process. At block 2773, the system reduces introduction of moisture into a root chamber. For example, because it is desirable to dry the plants, it can be desirable to reduce or in some embodiments eliminate introduction of any new moisture into the root zone, so that the roots do not suck up or absorb any new moisture. In some embodiments, the process flow further comprises extracting moisture from the root chamber, such as by using a dehumidifier. This can, for example, help to keep the root system from taking in or absorbing any moisture that was already present in the root chamber before block 2773.

At block 2775, the system is configured to monitor the humidity level and/or temperature of the environment of the canopy chamber. This may be desirable because, for example, the ideal drying process for a particular plant may occur with the plant canopy at a particular temperature or humidity level, or within a particular range of temperatures or humidity levels. In some embodiments, only one of humidity and temperature is monitored. In some embodiments, both humidity and temperature are monitored. In some embodiments, additional or alternative environmental parameters are monitored.

At block 2777, the system maintains the humidity and/or temperature and/or other environmental parameters of the canopy chamber to within predetermined desirable ranges. In some embodiments, the process of monitoring these variables and maintaining these variables to within the predetermined ranges is a continuous process that continues until block 2779, where the system detects that the plant canopy is sufficiently dry. In some embodiments, the system can be configured to automatically detect that the plant canopy is sufficiently dry, such as by determining that the plant canopy has stopped releasing moisture into the environment of the canopy chamber. In some embodiments, block 2779 is optional, such as because the system may be configured to simply continue the drying process of blocks 2775 and 2777 until manually stopped by a user, until the process has run for a predetermined amount of time, and/or the like.

In some embodiments, the process may optionally include block 2780, wherein the system initiates an automatic harvesting process. For example, the system may initiate any of the automatic harvesting techniques disclosed above. The process completes at block 2781.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. An aeroponic system for supporting efficient low-resource-usage plant growth, the aeroponic system comprising:
    a housing having a top portion and an internal cavity, the top portion comprising one or more openings for a stalk of a plant to pass therethrough, the internal cavity forming or comprising one or more root chambers for positioning therein of roots of the plant, the internal cavity is substantially sealed from an external environment and is configured to provide a controlled environment that can optimize plant growth efficiency;
    one or more sealing members coupled to the one or more openings, each sealing member configured to substantially conform to the stalk of the plant and to substantially isolate a canopy of the plant from the one or more root chambers;
    one or more root chamber sensors configured to detect at least one of oxygen, carbon dioxide, relatively humidity, or temperature within the one or more root chambers;
    one or more nutrient storage reservoirs for storage of plant nutrients;
    one or more pressurized air sources;
    one or more air-assisted nozzles configured to be fluidly coupled to the one or more nutrient storage reservoirs and the one or more pressurized air sources, the one or more air-assisted nozzles configured to introduce atomized nutrient solution into the one or more root chambers;
    a temperature control system coupled to the housing and configured to control a temperature of the one or more root chambers without introducing outside air into the internal cavity, the temperature control system comprising at least one of a thermoelectric device or a tubing system on or embedded within a wall enclosing the internal cavity, wherein the thermoelectric device is configured to selectively heat or cool the one or more root chambers based on a direction of electrical current passing through the thermoelectric device, wherein the tubing system is configured to selectively heat or cool the one or more root chambers based on a fluid passing through the tubing system; and
    a control system operably coupled to at least the temperature control system and the one or more air-assisted nozzles, the control system configured to:
        access in an electronic database desired parameter ranges associated with at least one of oxygen, carbon dioxide, relatively humidity, or temperature within the one or more root chambers; and
        control the temperature control apparatus and the one or more air-assisted nozzles to maintain environmental parameters associated with the one or more root chambers within the desired parameter ranges.

2. The aeroponic system of claim 1, further comprising:
    one or more canopy sensors configured to detect at least one of oxygen, carbon dioxide, relatively humidity, light intensity, light spectrum, or temperature within a canopy environment separated from the one or more root chambers by the one or more sealing members.

3. The aeroponic system of claim 1, wherein the one or more openings comprises two or more openings each positioned to have a separate plant stalk extend into a same canopy environment.

4. The aeroponic system of claim 1, wherein the one or more pressurized air sources comprises at least one air compressor.

5. The aeroponic system of claim 1, wherein at least a portion of the control system is located external to the housing and accessible via a computer network.

6. The aeroponic system of claim 1, wherein the control system is further configured to communicate with an external system via a computer network to adjust one or more of the desired parameter ranges.

7. The aeroponic system of claim 1, wherein the control system is further configured to determine a present stage of plant growth and control the temperature control apparatus and the one or more air-assisted nozzles to maintain environmental parameters associated with the one or more root chambers within different parameter ranges for different stages of plant growth.

8. The aeroponic system of claim 1, further comprising one or more cameras positioned to image one or more plants being grown by the aeroponic system.

9. The aeroponic system of claim 8, wherein at least one of the one or more cameras comprises an infrared camera.

10. The aeroponic system of claim 8, wherein at least one of the one or more cameras comprises a night vision camera positioned to image the roots of the plant within the one or more root chambers.

11. The aeroponic system of claim 8, wherein at least one of the one or more cameras is positioned to image the canopy of the plant.

12. The aeroponic system of claim 2, further comprising one or more light sources configured to direct light into the canopy environment.

13. The aeroponic system of claim 1, further comprising one or more light sources configured to direct light into the one or more root chambers.

14. The aeroponic system of claim 2, wherein the control system is further configured to, responsive to an indication that a plant grown in the aeroponic system should be dried:
    reduce introduction of moisture into the one or more root chambers;
    monitor a temperature of the canopy environment;
    maintain the temperature of the canopy environment to within a predetermined drying temperature range;
    monitor a relative humidity level of the canopy environment;
    maintain the relative humidity level of the canopy environment to within a predetermined drying humidity level range; and detect when the canopy of the plant is no longer introducing moisture into the canopy environment.

15. The aeroponic system of claim 1, where the control system is further configured to adjust nutrient delivery into the one or more root zones by the one or more air-assisted nozzles in response to analyzing data from the one or more root chamber sensors.

16. An aeroponic system for supporting efficient low-resource-usage plant growth, the aeroponic system comprising:
a base structure comprising:
a root chamber for positioning therein of roots of a plant, the root chamber configured to provide a sealed controlled environment that can optimize plant growth efficiency;
a sealing member positioned to environmentally isolate the root chamber from an environment external to the root chamber,
wherein the sealing member is configured to substantially conform to a stalk of the plant;
an air-assisted nozzle configured to be fluidly coupled to a nutrient storage reservoir and a pressurized air source to introduce atomized nutrient solution into the root chamber;
a temperature control system configured to control a temperature of the root chamber without introducing outside air into the root chamber, the temperature control system comprising at least one of a thermoelectric device or a tubing system on or embedded within a wall enclosing the root chamber, wherein the thermoelectric device is configured to selectively heat or cool the root chamber based on a direction of electrical current passing through the thermoelectric device, wherein the tubing system is configured to selectively heat or cool the root chamber based on a fluid passing through the tubing system; and
a plurality of sensors configured to detect at least one of oxygen, carbon dioxide, relatively humidity, or temperature within the root chamber; and
a control system operably coupled to the temperature control system and the air-assisted nozzle, the control system configured to:
access in an electronic database desired parameter ranges associated with at least one of oxygen, carbon dioxide, relatively humidity, or temperature within the root chamber; and
control the temperature control apparatus and the air-assisted nozzle to maintain environmental parameters associated with the root chamber within the desired parameter ranges.

17. The aeroponic system of claim 16, further comprising one or more additional sealing members each positioned to have a separate plant stalk pass therethrough.

18. The aeroponic system of claim 16, further comprising one or more additional root chambers each configured to have roots of a separate plant positioned therein.

19. The aeroponic system of claim 16, wherein the base structure comprises the control system.

20. The aeroponic system of claim 16, wherein at least a portion of the control system is located external to the base structure and accessible via a computer network.

* * * * *